(12) United States Patent
Bhagavatula et al.

(10) Patent No.: US 9,529,155 B2
(45) Date of Patent: Dec. 27, 2016

(54) GRADIENT INDEX (GRIN) LENS CHIPS AND ASSOCIATED SMALL FORM FACTOR OPTICAL ARRAYS FOR OPTICAL CONNECTIONS, RELATED FIBER OPTIC CONNECTORS

(71) Applicants: Venkata Adiseshaiah Bhagavatula, Big Flats, NY (US); George Davis Treichler, Hammondsport, NY (US); Kevin Andrew Vasilakos, Corning, NY (US)

(72) Inventors: Venkata Adiseshaiah Bhagavatula, Big Flats, NY (US); George Davis Treichler, Hammondsport, NY (US); Kevin Andrew Vasilakos, Corning, NY (US)

(73) Assignee: CORNING OPTICAL COMMUNICATIONS LLC, Hickory, NC (US)

(*) Notice: Subject to any disclaimer, the term of this patent is extended or adjusted under 35 U.S.C. 154(b) by 660 days.

(21) Appl. No.: 13/687,516

(22) Filed: Nov. 28, 2012

(65) Prior Publication Data
US 2014/0147078 A1    May 29, 2014

(51) Int. Cl.
*G02B 6/32* (2006.01)
*G02B 6/38* (2006.01)
(Continued)

(52) U.S. Cl.
CPC ............... *G02B 6/32* (2013.01); *G02B 6/3885* (2013.01); *G02B 6/322* (2013.01); *G02B 6/325* (2013.01);
(Continued)

(58) Field of Classification Search
CPC .......... G02B 6/32; G02B 6/322; G02B 6/325; G02B 6/42; G02B 6/4201; G02B 6/4204; G02B 6/3807; G02B 6/3831
(Continued)

(56) References Cited

U.S. PATENT DOCUMENTS

| 4,348,795 A | 9/1982 | Deunhouwer et al. ......... 29/411 |
| 5,384,874 A | 1/1995 | Hirai et al. ..................... 385/34 |

(Continued)

OTHER PUBLICATIONS

Chanclou, P., Kaczmarek, C., Mouzer, G., Gautreau, O., Thual, M., & Grosso, P. "Design and demonstration of a multicore single-mode fiber coupled lens device," *Optics Communications*, 233, 2004, pp. 333-339.

(Continued)

*Primary Examiner* — Kaveh C Kianni
*Assistant Examiner* — Guy Anderson

(57) ABSTRACT

Gradient index (GRIN) lens chips and associated small form factor optical arrays for optical connections, and related fiber optic connectors are disclosed. By aligning GRIN lenses within a GRIN lens chip, a more precise and reliable alignment may be achieved with respect to optical fibers than if a single conventional ferrule is utilized to align and secure both GRIN lenses and optical fibers. The GRIN lens chip may include a GRIN lens received and thereby aligned within a groove disposed between a fiber end and a terminal end of a GRIN lens holder body. The optical fibers may also be received and thereby aligned within a groove of a ferrule body. In this manner, when the GRIN lens chip containing the GRIN lenses is aligned with a ferrule body containing the optical fibers, then the GRIN lenses may be precisely located relative to the optical fibers.

33 Claims, 35 Drawing Sheets

(51) Int. Cl.
*G02B 6/42* (2006.01)
*G02B 6/36* (2006.01)

(52) U.S. Cl.
CPC .......... *G02B 6/3652* (2013.01); *G02B 6/3807* (2013.01); *G02B 6/3831* (2013.01); *G02B 6/42* (2013.01)

(58) Field of Classification Search
USPC ............................ 385/14–15, 31, 33–34, 79
See application file for complete search history.

(56) References Cited

U.S. PATENT DOCUMENTS

| | | | |
|---|---|---|---|
| 5,815,621 A | 9/1998 | Sakai et al. | 385/80 |
| 5,850,493 A | 12/1998 | Cheng | 385/34 |
| 6,704,147 B2 | 3/2004 | Fukuzawa et al. | 359/652 |
| 7,374,714 B2 | 5/2008 | Bullesfeld et al. | 264/479 |
| 7,406,243 B2 | 7/2008 | Takeuchi et al. | 385/137 |
| 7,543,999 B2* | 6/2009 | Winter et al. | 385/93 |
| 7,603,008 B2 | 10/2009 | Matsumura et al. | 385/35 |
| 8,651,749 B2* | 2/2014 | Dainese Jnior et al. | 385/74 |
| 8,702,318 B2* | 4/2014 | Isenhour et al. | 385/61 |
| 8,781,273 B2* | 7/2014 | Benjamin et al. | 385/33 |
| 2003/0174998 A1 | 9/2003 | Shevchuk | 385/137 |
| 2006/0072883 A1* | 4/2006 | Kilian et al. | 385/93 |
| 2008/0166094 A1 | 7/2008 | Bookbinder et al. | |
| 2009/0169163 A1 | 7/2009 | Abbott, III et al. | |
| 2011/0026882 A1 | 2/2011 | Budd et al. | 385/52 |
| 2011/0229083 A1* | 9/2011 | Dainese Jnior et al. | 385/74 |
| 2011/0255825 A1* | 10/2011 | Ko | G02B 6/3817 385/15 |
| 2012/0125803 A1* | 5/2012 | Chang et al. | 206/525 |
| 2012/0189252 A1* | 7/2012 | Bhagavatula et al. | 385/79 |
| 2013/0114924 A1* | 5/2013 | Loh et al. | 385/14 |
| 2014/0185986 A1 | 7/2014 | Costello, III et al. | |

OTHER PUBLICATIONS

Cooper, P. R., Leach, J. S., Harding, A. B., & Matthews, M. A. "A fibre optic connector suitable for use in a rugged environment," *Optic and Laser Technology*, 14(2), 1982, pp. 87-91.

Cusworth, S. D. & Senior, J. M. "Angular tilt misalignment loss at a GRIN rod lens coupler," *Applied Optics*, 25(11), 1986, pp. 1775-1779.

CVI Melles Griot, "Optical Components: Spherical Lenses," Sections 4.66-4.69, 4 pages; Retrieved on Feb. 17, 2014 from http://fp.optics.arizona.edu/Nofziger/OPTI%20202L/MG%20Gradient-Index_lenses.pdf.

Emkey, W. L. & Jack, C. A. "Analysis and Evaluation of Graded-Index Fiber-Lenses," *Journal of Lightwave Technology*, LT-5(9), 1987, pp. 1156-1164.

Gilsdorf, R. W. & Palais, J. C. "Single-mode fiber coupling efficiency with graded-index rod lenses," *Applied Optics*, 33(16), 1994, pp. 3340-3345.

Palais, J. C. "Fiber coupling using graded-index rod lenses," *Applied Optics*, 19(2), 1980, pp. 2011-2018.

Senior, J. M., Cusworth, S. D., Burrow, N. G., & Muirhead, A. D. "Misalignment losses at multimode graded-index fiber splices and GRIN rod lens couplers," *Applied Optics*, 24(7), 1985, pp. 977-983.

Tomlinson, W. J. "Applications of GRIN-rod lenses in optical fiber communication systems," *Applied Optics*, 19(7), 1980, pp. 1127-1138.

* cited by examiner

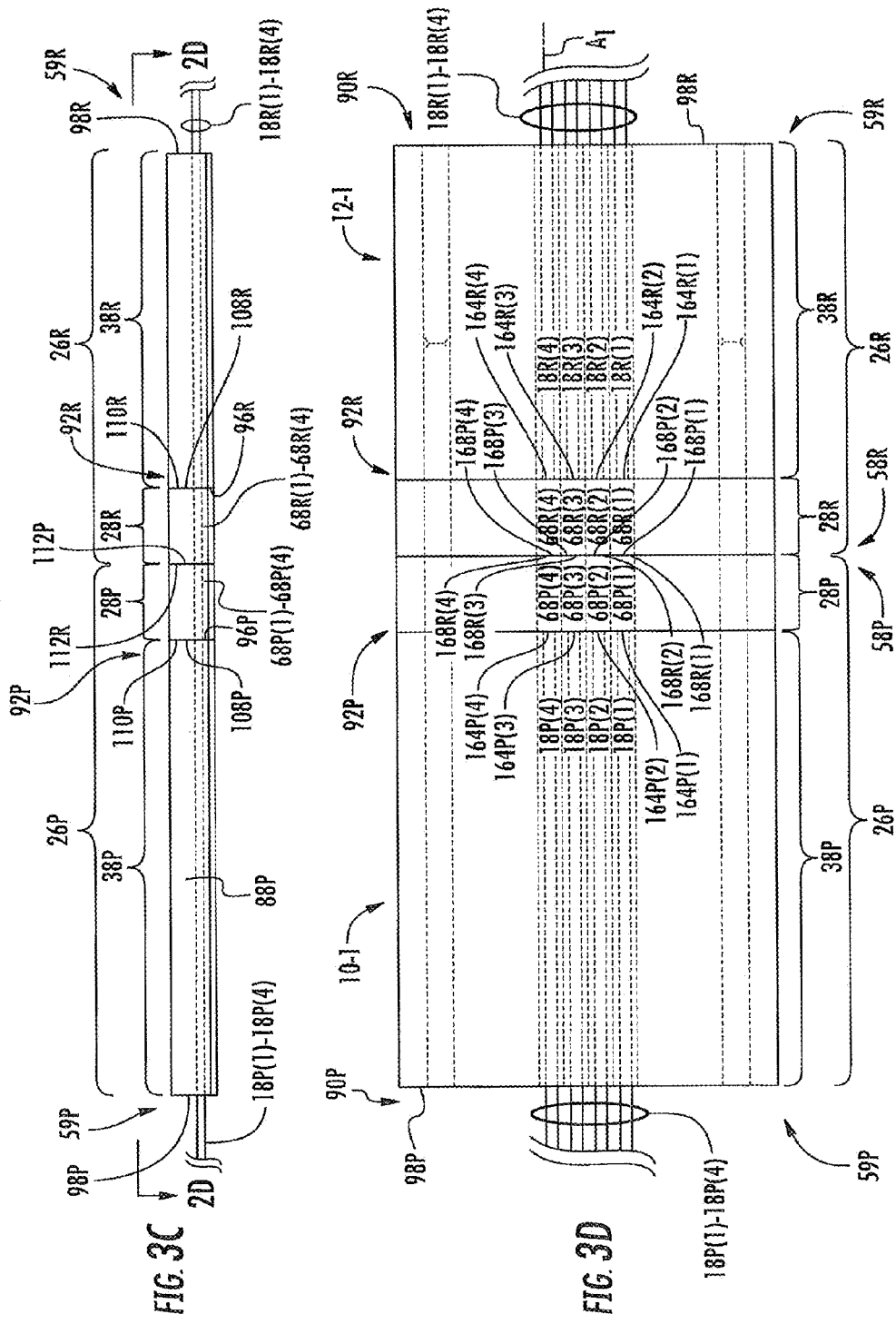

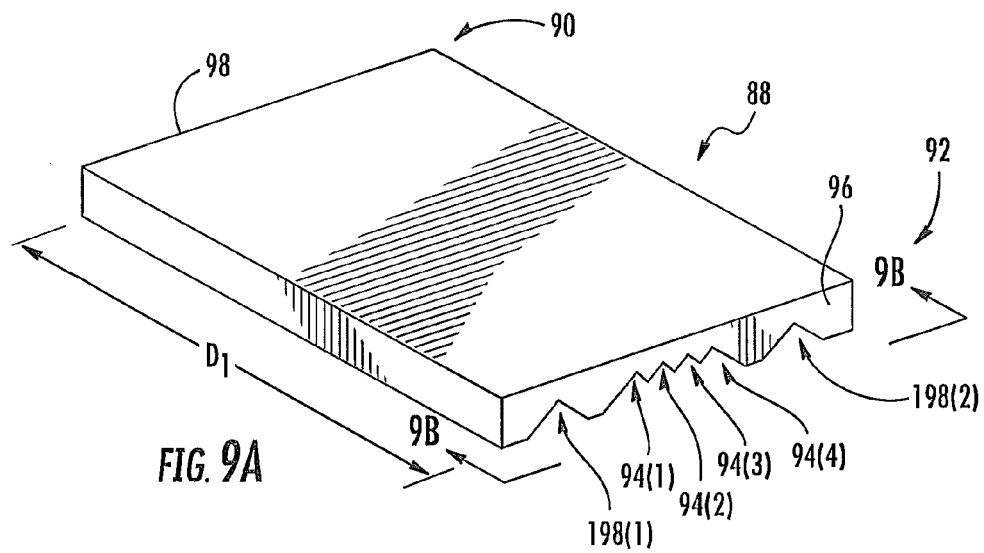
FIG. 9A
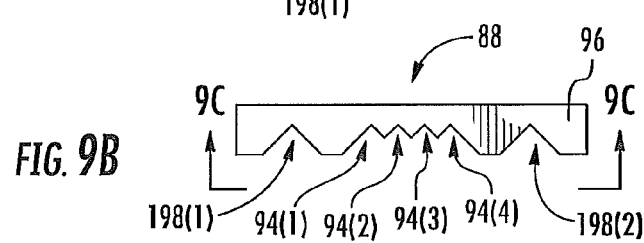
FIG. 9B
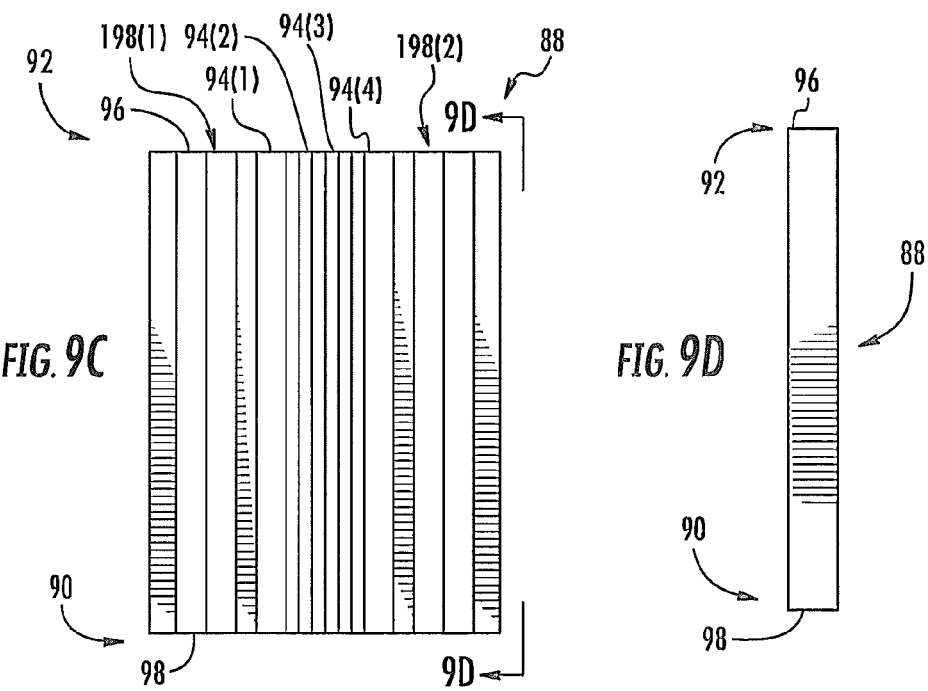
FIG. 9C
FIG. 9D

GRADIENT INDEX (GRIN) LENS CHIPS AND ASSOCIATED SMALL FORM FACTOR OPTICAL ARRAYS FOR OPTICAL CONNECTIONS, RELATED FIBER OPTIC CONNECTORS

BACKGROUND

1. Field of the Disclosure

The technology of the disclosure relates to optical interfaces in fiber optic connector assemblies for establishing fiber optic connections.

2. Technical Background

Benefits of optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support optical fiber interconnections.

Optical fibers may also be used to connect optical devices to the fiber optic networks. In applications for optical devices where high bandwidth and electrical coupling is desired, hybrid fiber optic cables may be employed. Hybrid fiber optic cables include one or more optical fibers capable of transporting optical signals optically at high bandwidths. Hybrid cables may also include one or more electrical conductors capable of carrying electrical signals, such as power as an example. These hybrid cables may be employed in devices, such as user devices used by consumers, to provide optical and electrical signal connectivity.

It is common to provide a flat end-faced multi-fiber ferrule to more easily facilitate multiple optical fiber connections between the fiber optic connector including the ferrule and another optical device, for example, another fiber optic connector or optical fiber. In this regard, it is important that the fiber optic connector be designed to allow end faces of the optical fibers disposed in the ferrule to be placed into contact or closely spaced with respect to the other optical device for light transfer. If an air gap is disposed between the optical fiber held in the ferrule and the other optical device, the end of the optical fiber is cleaved (e.g., laser-cleaved) and polished into a curved form to allow it to act as a lens in an effort to reduce optical attenuation. However, spherical aberrations can occur when the end face of the optical fiber is cleaved and polished into a curved form thereby introducing further optical losses.

Gradient index (GRIN) lenses offer an alternative to polishing curvatures onto ends of optical fibers to form lenses. GRIN lenses focus light through a precisely controlled radial variation of the lens material's index of refraction from the optical axis, typically at the center axis, to the edge of the lens. The internal structure of this index gradient can dramatically reduce the need for tightly controlled surface curvatures and results in a simple, compact lens. This allows a GRIN lens with flat surfaces to collimate light emitted from an optical fiber or to focus an incident beam into an optical fiber. The GRIN lens can be provided in the form of a glass rod that is disposed in a lens holder as part of a fiber optic connector. The flat surfaces of a GRIN lens allow easy bonding or fusing of one end to an optical fiber disposed inside the fiber optic connector with the other end of the GRIN lens disposed on the ferrule end face. The flat surface on the end face of a GRIN lens can reduce aberrations, because the end faces can be polished to be planar or substantially planar to the end face of the ferrule. The flat surface of the GRIN lens allows for easy cleaning of end faces of the GRIN lens. It is important that the GRIN lens be placed and secured in alignment with the desired angular accuracy to avoid or reduce coupling loss.

It is common for each GRIN lens of a plug or receptacle to be placed and secured in optical connectors by a ferrule, which also directly secures the optical fiber to which the GRIN lenses are attached. However, the GRIN lenses may be challenging to position precisely within the ferrule without specialized and expensive equipment because GRIN lenses may be relatively small, for example, no more than one (1) millimeter in length. If the GRIN lens is imprecisely positioned within the ferrule, then the ferrule including the GRIN lens may have to be discarded, resulting in additional manufacturing expense as both the GRIN lens and combination ferrule assembly may have to be replaced.

Moreover, adding additional features to the ferrule to more precisely position the GRIN lenses makes the ferrule prohibitively expensive to build for consumer markets and increases the size of the optical connector to accommodate the ferrule. The allowable size of optical connectors of the plug and receptacle are limited given the trend for user devices having smaller sizes to enable mobility and having commensurately small interconnecting interfaces.

New approaches are needed for the design of fiber optic connectors, including GRIN lenses, to more reliably and efficiently align the GRIN lenses of plugs to optical fibers leading up to the plugs and complementary GRIN lenses on receptacles. The new approaches may also be compatible for hybrid optical connectors establishing electrical coupling and optical connections for optical devices.

SUMMARY OF THE DETAILED DESCRIPTION

Embodiments disclosed herein include gradient index (GRIN) lens chips and associated small form factor optical arrays for optical connections, and related fiber optic connectors. By aligning GRIN lenses within a GRIN lens chip, a more precise and reliable alignment may be achieved with respect to optical fibers than if a single conventional ferrule is utilized to align and secure both GRIN lenses and optical fibers. The GRIN lens chip may include a GRIN lens received and thereby aligned within a groove disposed between a fiber end and a terminal end of a GRIN lens holder body. The optical fibers may also be received and thereby aligned within a groove of a ferrule body. In this manner, when the GRIN lens chip containing the GRIN lenses is aligned with a ferrule body containing the optical fibers, then the GRIN lenses may be precisely located relative to the optical fibers.

In this regard in one embodiment, a gradient index (GRIN) lens chip is provided. The GRIN lens chip may include a GRIN lens holder body comprising a fiber mating surface at a fiber end and a terminal mating surface at a terminal end opposite the fiber end. The fiber mating surface may be disposed a longitudinal distance away from the terminal mating surface. The longitudinal distance may be measured parallel to an optical axis. The GRIN lens chip may also include at least one GRIN lens comprising a first end, a second end opposite the first end, a first end face disposed at the first end, and a second end face disposed at the second end. The GRIN lens chip may also include at least one GRIN groove disposed between the fiber end and the terminal end of the GRIN lens holder body and the at least one GRIN groove may receive the at least one GRIN lens. The first end face of the at least one GRIN lens may be disposed adjacent the fiber mating surface, and the second end face of the at least one GRIN lens may be disposed adjacent the terminal mating surface. In this manner, multiple GRIN lenses may be efficiently aligned to each other with the GRIN lens holder body.

In another embodiment, an optical sub-system for establishing an optical connection is provided. The optical sub-system may include a ferrule assembly. The ferrule assembly may include a ferrule body comprising a forward end, a rearward end opposite the forward end, a ferrule mating surface disposed the forward end, and a rearward ferrule surface disposed at the rearward end. The ferrule mating surface may be disposed a longitudinal distance away from the rearward ferrule surface. The longitudinal distance may be measured parallel to an optical axis. The ferrule assembly may also include at least one fiber groove disposed between the forward end and the rearward end. The ferrule assembly may also include at least one optical fiber received within the at least one fiber groove. The optical sub-system may include a GRIN lens chip. The GRIN lens chip may include a GRIN lens holder body comprising a fiber mating surface at a fiber end and a terminal mating surface at a terminal end opposite the fiber end. The fiber mating surface may be disposed a second longitudinal distance away from the terminal mating surface. The second longitudinal distance may be measured parallel to an optical axis. The GRIN lens chip may also include at least one GRIN lens optically connected with the at least one optical fiber. Each of the at least one GRIN lens may comprise a first end, a second end opposite the first end, a first end face disposed at the first end, and a second end face disposed at the second end. The GRIN lens chip may also include at least one GRIN groove disposed between the fiber end and the terminal end of the GRIN lens holder body. The at least one GRIN groove may receive the at least one GRIN lens. The first end face of the at least one GRIN lens may be disposed adjacent the fiber mating surface, and the second end face of the at least one GRIN lens may be disposed adjacent the terminal mating surface. In this manner, the at least one GRIN lens may be precisely aligned to the at least one optical fiber.

In another embodiment, an optical connection is provided. The optical connection may include a plug, and a receptacle optically connected to the plug. Each of the plug and the receptacle may include one of a plurality of optical sub-systems. Each of the plurality of optical sub-systems may comprise a ferrule assembly including a ferrule body having a ferrule mating surface at a forward end and a rearward ferrule surface at a rearward end opposite the forward end along an optical axis. The ferrule assembly may also include at least one fiber groove disposed between the forward end and the rearward end. The ferrule assembly may also include at least one optical fiber received within the at least one fiber groove. Each of the plurality of optical sub-systems may also include a GRIN lens chip having a GRIN lens holder body including a fiber mating surface at a fiber end and a terminal mating surface at a terminal end opposite the fiber end along the optical axis. The GRIN lens chip may also include at least one GRIN lens optically connected with the at least one optical fiber. Each of the at least one GRIN lens may have a first end face disposed at a first end of the at least one GRIN lens, and a second end face may be disposed at a second end of the at least one GRIN lens. The GRIN lens chip may also include at least one GRIN groove disposed between the fiber end and the terminal end of the GRIN lens holder body. The at least one GRIN groove may receive the at least one GRIN lens. The first end face of the at least one GRIN lens may be disposed adjacent the fiber mating surface. The second end face of the at least one GRIN lens may be disposed adjacent the terminal mating surface. The second end face of the at least one GRIN lens of the plug may be optically connected to the second end face of the at least one GRIN lens of the receptacle. In this manner, the optical connection may be established with minimum optical attenuation.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIGS. 3B, 3C, and 3D are a perspective view, side view, and a top view, respectively, of an optical connection made by the optical sub-system of the plug and the optical sub-system of the receptacle to illustrate an optical connection of the sub-systems when the plug is engaged with the receptacle;

FIGS. 9A-9D are a perspective view, a front view, a bottom view, and a right side view, respectively, of the ferrule body of FIGS. 8A and 8B of the plug to illustrate the at least one fiber groove without the at least one optical fiber, and the ferrule body of the receptacle of FIG. 2A may be identical thereto and accordingly the "R" and "P" are removed from the reference characters to indicate the ferrule body is not specific to the plug or the receptacle;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include gradient index (GRIN) lens chips and associated small form factor optical arrays for optical connections, and related fiber optic connectors. By aligning GRIN lenses within a GRIN lens chip, a more precise and reliable alignment may be achieved with respect to optical fibers than if a single conventional ferrule is utilized to align and secure both GRIN lenses and optical fibers. The GRIN lens chip may include a GRIN lens received and thereby aligned within a groove disposed between a fiber end and a terminal end of a GRIN lens holder body. The optical fibers may also be received and thereby aligned within a groove of a ferrule body. In this manner, when the GRIN lens chip containing the GRIN lenses is aligned with a ferrule body containing the optical fibers, then the GRIN lenses may be precisely located relative to the optical fibers.

Figure 1:
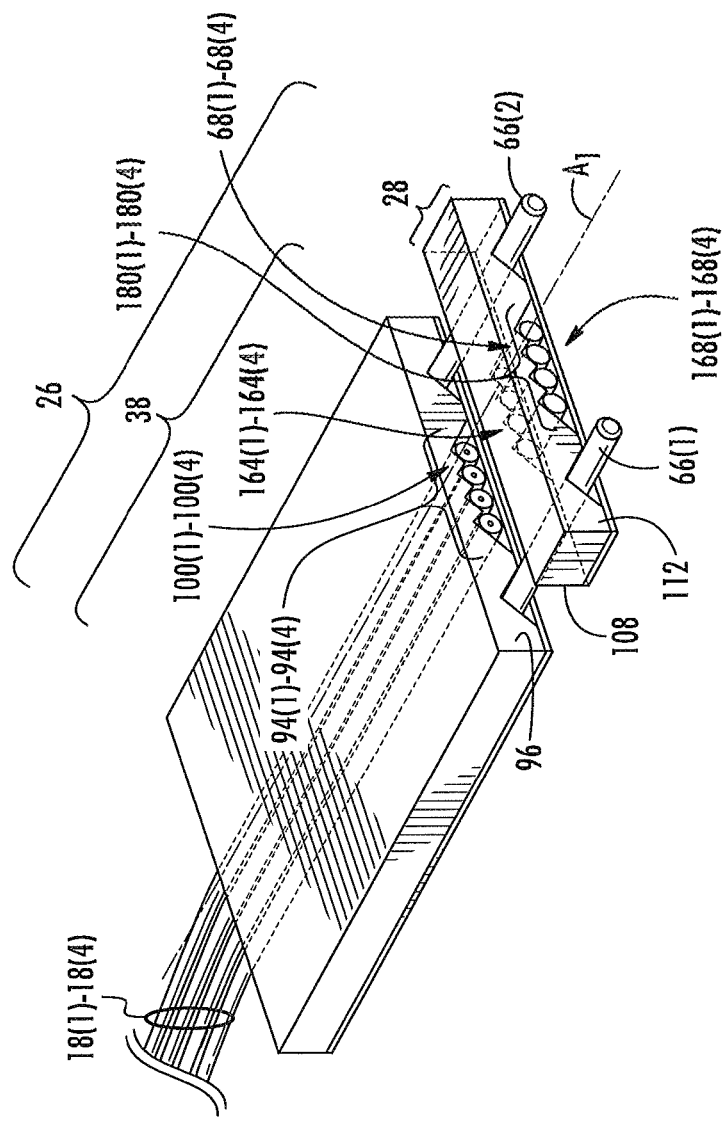
FIG. 1 is a perspective view of an exemplary optical sub-system comprising a gradient index (GRIN) lens chip and a ferrule assembly to illustrate optical connections between at least one optical fiber received by the ferrule assembly and at least one GRIN lens as part of the GRIN lens chip.

In this regard, FIG. 1 is a perspective view of an exemplary optical sub-system 26 comprising a GRIN lens chip 28 and a ferrule assembly 38 aligned with respect to an optical axis $A_1$ by at least one alignment pin 66(1), 66(2). The ferrule assembly 38 may utilize at least one fiber groove 94(1)-94(4) to precisely position end portions 100(1)-100(4) of optical fibers 18(1)-18(4) adjacent to a ferrule mating surface 96. The GRIN lens chip 28 may include at least one GRIN lens 68(1)-68(4) with at least one first end face 164(1)-164(4) and at least one second end face 168(1)-168(4), respectively. The GRIN lenses 68(1)-68(4) may focus optical signals to and from the end portions 100(1)-100(4) of the optical fibers 18(1)-18(4) in a manner to facilitate an optical connection with another optical sub-system, for example, as similarly discussed later in FIG. 3A. The first end faces 164(1)-164(4) may be disposed adjacent to a fiber mating surface 108 of the GRIN lens chip 28 and the second end faces 168(1)-168(4) may be disposed adjacent to a terminal mating surface 112. In this way, when the fiber mating surface 108 of the GRIN lens chip 28 may abut against the ferrule mating surface 96 of the ferrule assembly 38, then the first end faces 164(1)-164(4) may be precisely positioned along the optical axis $A_1$ relative to the end portions 100(1)-100(4) of the optical fibers 18(1)-18(4) to reduce optical attenuation. The second end faces 168(1)-168(4) may be available for optical connection with another optical sub-system (as discussed above) which may be aligned to the GRIN lens chip 28 with use of the alignment pins 66(1), 66(2) and the terminal mating surface 112. The optical sub-system 26, and related embodiments, may be used in plugs and receptacles to form optical connections.

Figure 2A:
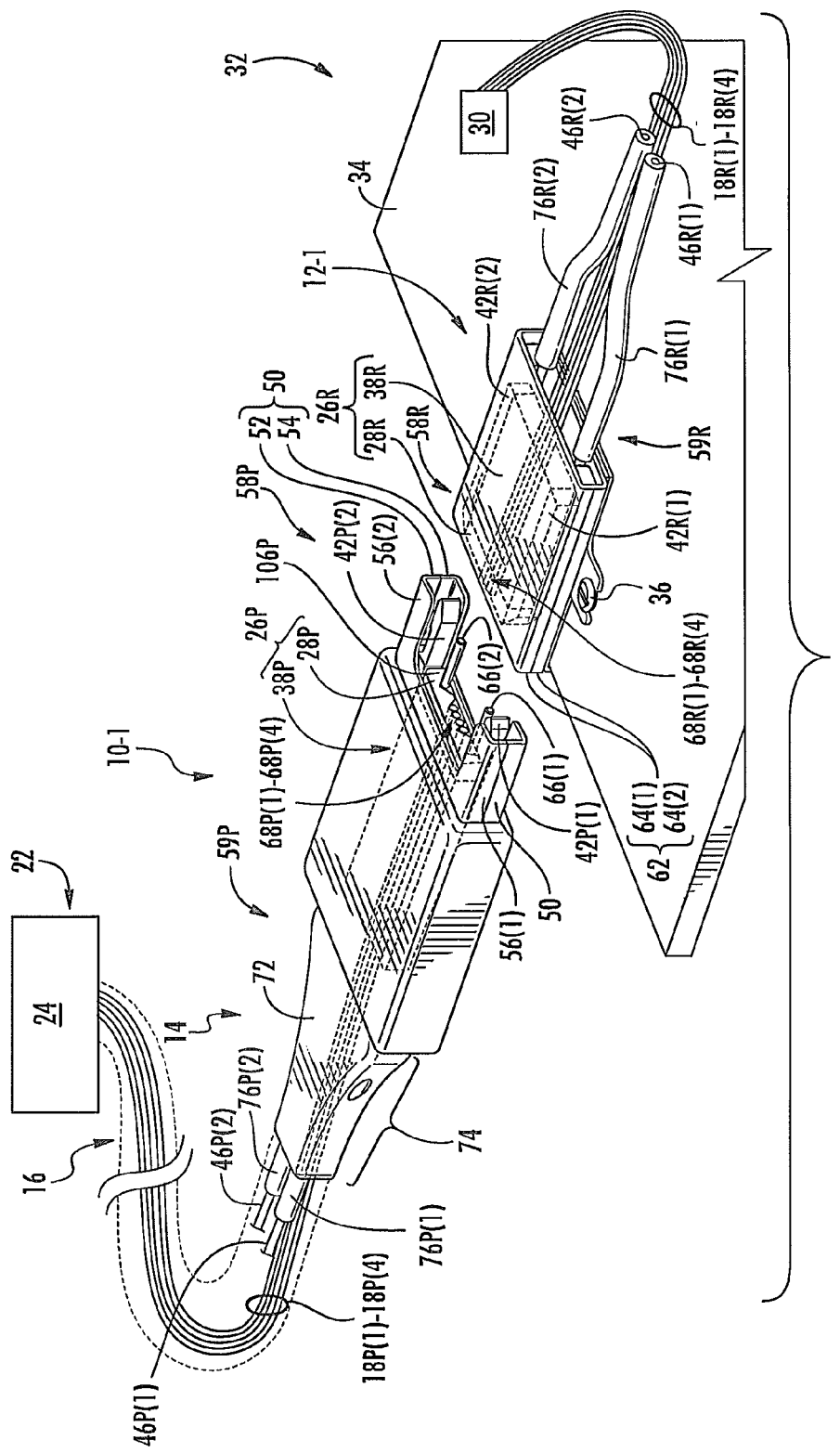
FIG. 2A is a perspective view of a plug detached from a receptacle mounted on a circuit board and configured to establish an optical connection with the plug to illustrate locations of an optical sub-system of the plug and an optical sub-system of the receptacle.

For example, FIG. 2A is a perspective view of a plug 10-1 detached from a receptacle 12-1 configured to optically connect with the plug 10-1. The optical connection may allow optical signals to be exchanged between the plug 10-1 and the receptacle 12-1.

As discussed in greater detail below, the plug 10-1 and the receptacle 12-1 include GRIN lens chips 28P, 28R, respectively. The GRIN lens chips 28P, 28R may have similar features and "P" and "R", normally designating "plug" or "receptacle," respectively, may be included in the reference characters for simplicity when discussing common features. Each GRIN lens chip 28 may include at least one GRIN lens 68(1)-68(4) aligned and received in a GRIN lens holder body 106 as opposed to being aligned and received by a ferrule assembly 38. The GRIN lens holder body 106 facilitates alignment by including a fiber mating surface 108 adjacent to a first end face 164(1)-164(4) of the GRIN lenses 68(1)-68(4) and a terminal mating surface 112 adjacent to a second end face 168(1)-168(4) of the GRIN lenses 68(1)-68(4). When the GRIN lenses 68(1)-68(4) are aligned to the fiber mating surface 108 and to the terminal mating surface 112, then the GRIN lenses 68(1)-68(4) may be more easily aligned to optical fibers 18(1)-18(4) within a ferrule assembly 38 and thereby optical attenuation reduced.

Figure 14:
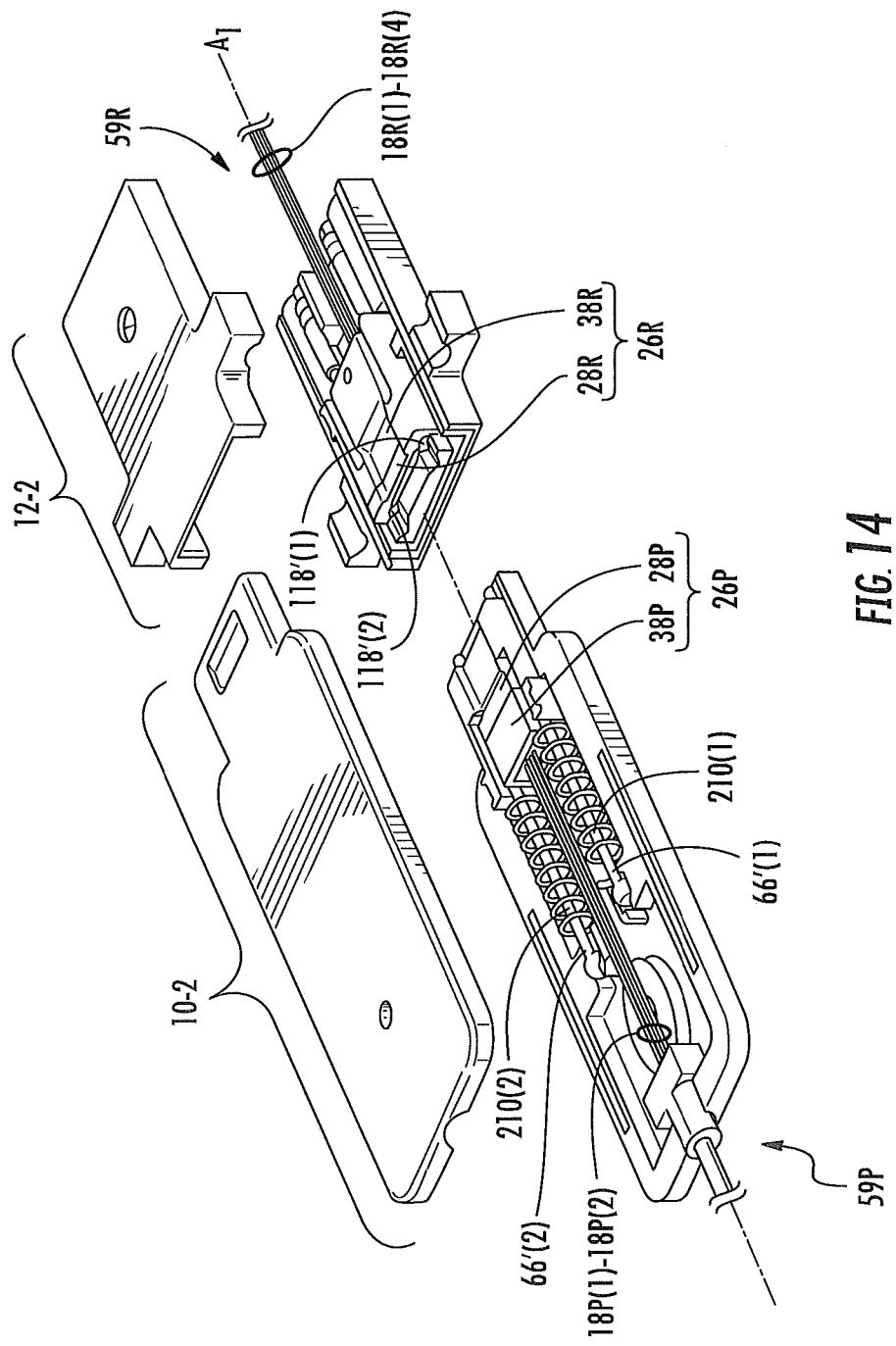
FIG. 14 is an exploded perspective view of another example of a plug and a receptacle wherein the optical sub-system of the plug may be spring loaded and movable in contrast to the optical sub-systems of FIG. 2A.
Figure 15:
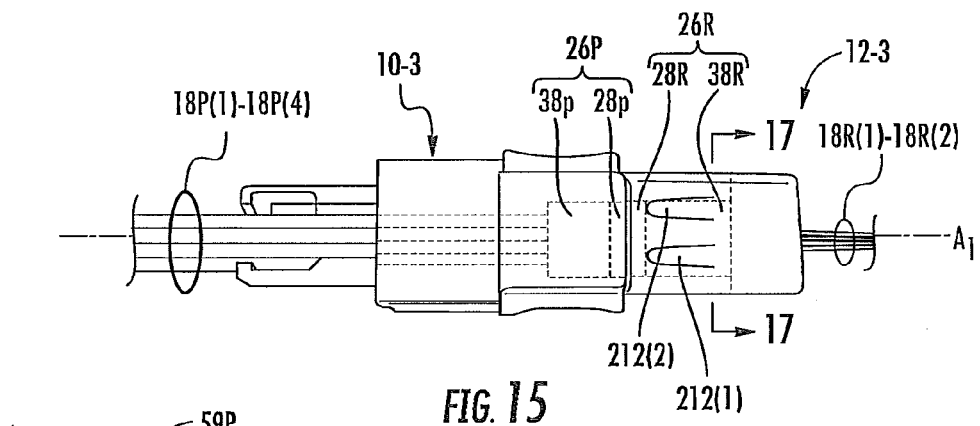
FIG. 15 is a top view of yet another example of a plug and a receptacle wherein an optical sub-system may be pushed by a lateral spring of the receptacle to achieve alignment.

In this disclosure, details of the GRIN lens chips 28P, 28R will be discussed relative to optical sub-systems 26P, 26R as part of an optical connection 160 (FIG. 3B) formed by engaging a plug 10-1 and a receptacle 12-1. First, features of the plug 10-1 and the receptacle 12-1 will be introduced relative to FIGS. 2A-2B to provide a context for where the GRIN lens chip 28P, 28R may be utilized. Next, features of optical sub-system 26P, 26R of the plug 10-1 and the receptacle 12-1, respectively, will be introduced relative to FIGS. 3A-4 so that alignment of the GRIN lens chips 28P, 28R within the optical sub-systems 26P, 26R may be understood relative to ferrule assemblies 38P, 38R of the plug 10-1 and the receptacle 12-1. Then, details of the GRIN lens chip 28 are discussed with respect to FIGS. 5A-6D. The details of the ferrule assemblies 38P, 38R which optically connect to the GRIN lens chips 28P, 28R are then discussed with respect to FIGS. 7A-8D. Details of the housings of the plug 10-1 and receptacle 12-1 are discussed in FIGS. 12A and 12B. A different example of electrical connectivity is discussed in detail with respect to FIG. 13. Next, FIG. 14 discusses a different embodiment of a plug 10-2 and a receptacle 12-2 where optical sub-systems of the plug 10-2 is movable and spring-loaded, unlike the plug 10-1 of FIG. 2A. FIG. 15 discusses yet another embodiment of a plug 10-3 and a receptacle 12-3 where an optical sub-system 26P of the plug 10-3 may be pushed by a lateral spring within the receptacle 12-3 to achieve alignment with an optical sub-system 26R of the receptacle 12-3. Next, methods of creating a GRIN lens chip 28 are introduced relative to FIG. 18 through FIG. 40.

Before discussing the GRIN lens chips 28P, 28R in detail, the components of the plug 10-1 and the receptacle 12-1 are discussed with regard to FIGS. 2A-4. With reference back to FIG. 2A, the plug 10-1 may be part of a connectorized cable 14. The connectorized cable 14 may include the plug 10-1 and a fiber optic cable 16, which may include at least one optical fiber 18P(1)-18P(4). The optical fibers 18P(1)-18P(4) may allow optical signals to be exchanged between a first optical device 22 and the plug 10-1. The first optical device 22 may be, for example, an electro-optic device 24 which may be part of an information network (not shown). The plug 10-1 includes an optical sub-system 26P comprising a GRIN lens chip 28P. The GRIN lens chip 28P includes the GRIN lenses 68P(1)-68P(4) disposed in the GRIN lens holder body 106P and offer an alternative to polishing curvatures onto ends of optical fibers 18P(1)-18P(4) to form lenses. The GRIN lenses 68P(1)-68P(4) focus light through a precisely controlled radial variation of the lens material's index of refraction from the optical axis to the edge of the lens. The internal structure of this index gradient can dramatically reduce the need for tightly controlled surface curvatures and results in a simple, compact lens. The index gradient allows the GRIN lenses 68P(1)-68P(4) with flat surfaces to collimate light emitted from the optical fibers 18P(1)-18P(4) or to focus an incident beam into the optical fibers 18P(1)-18P(4). In this embodiment of the GRIN lens chip 28P, as will be described in more detail below, the GRIN lenses 68P(1)-68P(4) may be provided in the form of glass rods that are disposed in the GRIN lens holder body 106P. In this manner, the GRIN lens chip 28P may be used to form an optical connection with GRIN lenses 68R(1)-68R(4) as part of a GRIN lens chip 28R of an optical sub-system 26R of a receptacle 12-1, as will be discussed in greater detail below.

The optical connection between the plug 10-1 and the receptacle 12-1 may be used to optically connect the first optical device 22 with a second optical device 30. The second optical device 30 may be, for example, a mobile device 32 including a printed circuit board 34. The receptacle 12-1 may be attached to the printed circuit board 34 using at least one fastener 36. It is also noted that the fastener 36 may be, for example, a screw, a cohesive, or an adhesive.

The optical sub-system 26P of the plug 10-1 includes the GRIN lens chip 28P and may also include a ferrule assembly 38P. The ferrule assembly 38P may be configured to precisely align the optical fibers 18P(1)-18P(4) with the GRIN lenses 68P(1)-68P(4) of the GRIN lens chip 28P. Moreover, the optical sub-system 26R of the receptacle 12-1 may include the GRIN lens chip 28R and a ferrule assembly 38R to precisely align the optical fibers 18R(1)-18R(4) to the GRIN lenses 68R(1)-68R(4) of the GRIN lens chip 28R of the receptacle 12-1. The optical fibers 18R(1)-18R(4) may be optically connected to the second optical device 30. In this manner, when the GRIN lens chip 28P of the plug 10-1 may be optically connected to the GRIN lens chip 28R of the receptacle 12-1, then the first optical device 22 may be optically connected to the second optical device 30.

With continuing reference to FIG. 2A, the plug 10-1 may also include at least one plug interlocking electrode 42P(1), 42P(2) which may electrically couple to at least one receptacle interlocking electrode 42R(1), 42R(2) of the receptacle 12-1. In this manner, the plug 10-1 may be electrically coupled to the receptacle 12-1 and thereby electrical signals, such as power as an example, may travel between the plug 10-1 and the receptacle 12-1.

The plug interlocking electrodes 42P(1), 42P(2) may be coupled to at least one plug-side conductor 46P(1), 46P(2) of the fiber optic cable 16, which may be electrically coupled to the first optical device 22. In this manner, the receptacle 12-1 may be electrically coupled to the first optical device 22 when the plug 10-1 may be engaged with the receptacle 12-1. Correspondingly, the receptacle interlocking electrodes 42R(1), 42R(2) may be electrically coupled to at least one receptacle-side conductors 46R(1), 46R(2), which may be electrically coupled to the second optical device 30. In this way, the first optical device 22 may be electrically coupled to the second optical device 30 when the plug 10-1 may be engaged with the receptacle 12-1. In this manner, the plug 10-1 and the receptacle 12-1 may together provide optical and electrical signal connectivity.

Figure 2B:
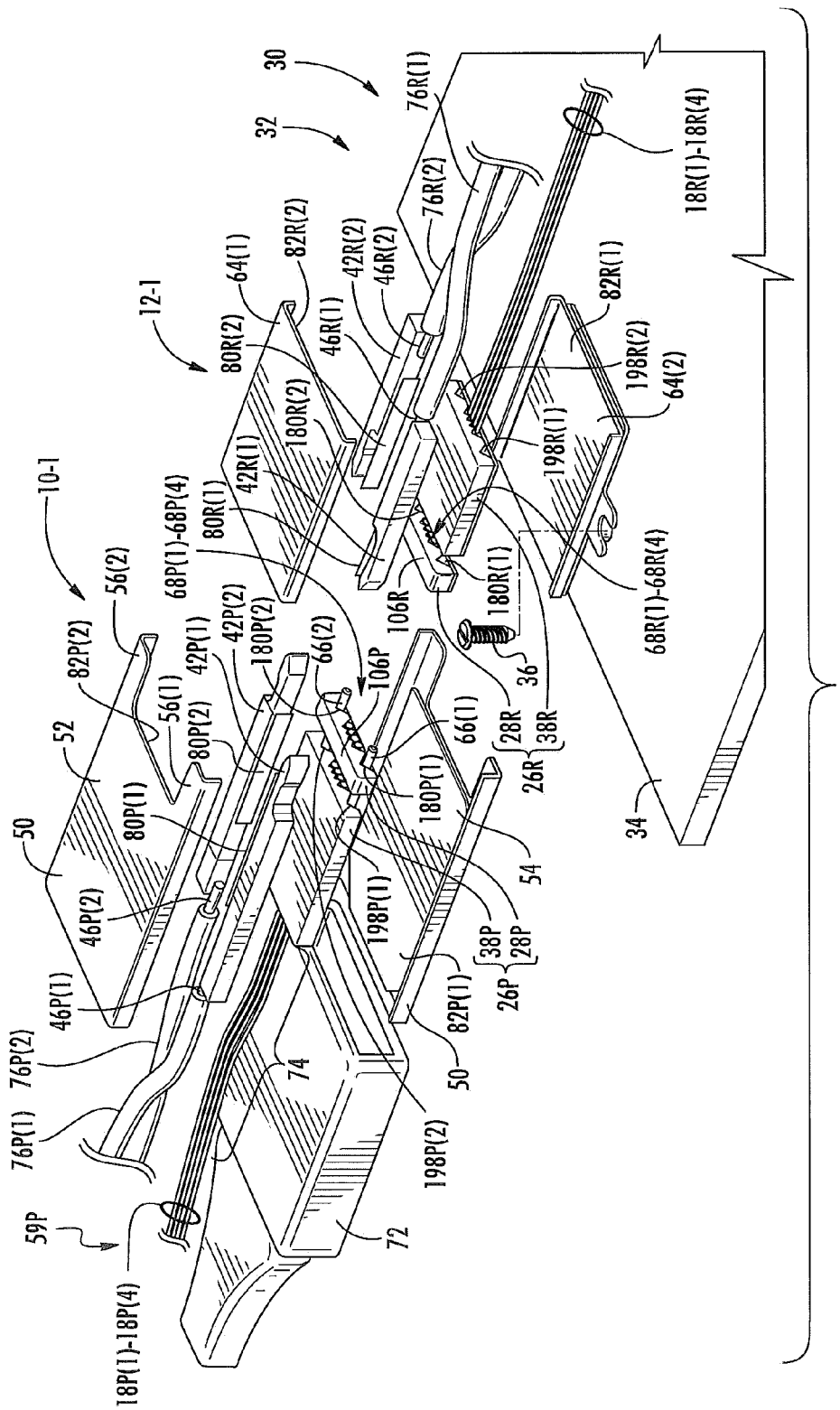
FIG. 2B is an exploded perspective view of the receptacle and the plug of FIG. 2A to illustrate a position of a GRIN lens chip of the receptacle and a GRIN lens chip of the plug.

With reference to FIGS. 2A and 2B, the plug 10-1 may include a plug outer housing 50 which may at least partially surround the optical sub-system 26P of the plug 10-1. The plug outer housing 50 may comprise a first plug housing 52 and a second plug housing 54. The plug outer housing 50 may also comprise at least one protrusion 56(1), 56(2) extending parallel to an optical axis $A_1$ of the plug 10-1 and extending from a front end 58P of the plug 10-1 in a direction away from a rear end 59P of the plug 10-1. The protrusions 56(1), 56(2) may align the plug 10-1 during engagement with the receptacle 12-1 by communicating with a receptacle housing 62, which may comprise at least one receptacle housing portion 64(1), 64(2). The receptacle housing portions 64(1), 64(2) may be mechanically connected using conventional means, for example, welds (not shown) to create the receptacle housing 62. It is also possible that the receptacle housing be formed with one component piece (not shown) or more than two (2) of the receptacle housing portions 64(1), 64(2).

The plug 10-1 may also comprise at least one alignment pin 66(1), 66(2) extending from the optical sub-system 26P and extending in a direction away from the rear end 59P of the plug 10-1. The alignment pins 66(1), 66(2) may be configured to communicate with the optical sub-system 26R of the receptacle 12-1 in order to align the optical sub-system 26P of the plug 10-1 with the optical sub-system 26R of the receptacle 12-1. The alignment pins 66(1), 66(2) may be configured to extend to the rear end 59R of the receptacle 12-1, or far enough through the optical sub-system 26R of the receptacle 12-1 to align the optical sub-system 26R with the optical sub-system 26R. It is noted that in the preferred embodiment, the alignment pins 66(1), 66(2) may extend from the ferrule assembly 38P and through the alignment grooves 118P(1), 118P(2) of the GRIN lens chip 28P which may be attached to the ferrule assembly 38P as part of the plug 10-1. During the process to align the plug 10-1 with the receptacle 12-1 as part of making an optical connection 160 (discussed below), the alignment pins 66(1), 66(2) may be inserted through or substantially through the GRIN groove 118R(1), 118R(2) and the at least one alignment ferrule groove 198R(1), 198R(2) in order to align the optical sub-systems 26P, 26R.

In order for the alignment pins 66(1), 66(2) to extend from the optical sub-system 26P, the alignment pins 66(1), 66(2) may be secured in at least one alignment ferrule groove 198P(1), 198P(2) of the ferrule assembly 39P with, for example, epoxy. The alignment ferrule grooves 198P(1), 198P(2) may be precisely placed and orientated with respect to the GRIN grooves 180P(1)-180P(4) of the GRIN lens chip 28P and the fiber grooves 94P(1)-94P(4) of the ferrule assembly 38P and facilitate the alignment of the GRIN lens chip 28P to the ferrule assembly 38P and also facilitate the alignment between the optical sub-systems 26P, 26R of the plug 10-1 and the receptacle 12-1, respectively. In this manner, optical attenuation may be reduced by precisely aligning the GRIN lenses 68P(1)-68P(4) of the GRIN lens chip 28P of the optical sub-system 26P of the plug 10-1 with at least one GRIN lens 68R(1)-68R(4) of the GRIN lens chip 28R of the optical sub-system 26R of the receptacle 12-1.

With continuing reference to FIGS. 2A and 2B, the plug 10-1 may include a stress-relief boot 72 disposed at least partially around a portion of the plug outer housing 50. The stress-relief boot 72 may protect the plug outer housing 50 containing the optical sub-system 26P which may be precisely aligned and vulnerable to damage. The stress-relief boot 72 may also extend from the rear end 59P of the plug 10-1 to surround a portion 74 of the optical fibers 18P(1)-18P(4) to prevent damaging sharp bends from forming in the optical fibers 18P(1)-18P(4) which may cause optical attenuation.

As shown in FIG. 2B, the plug-side conductors 46P(1), 46P(2) and the receptacle-side conductor 46R(1), 46R(2)

may be at least partially surrounded by plug-side outer jackets 76P(1), 76P(2) and receptacle-side outer jackets 76R(1), 76R(2), respectively. The receptacle-side outer jackets 76R(1), 76R(2) may electrically isolate the receptacle-side conductor 46R(1), 46R(2) from each other to prevent electrical shorting. The plug-side outer jackets 76P(1), 76P(2) may electrically isolate the plug-side conductors 46P(1), 46P(2), respectively, to prevent electrical shorting.

Moreover, the plug 10-1 may also include at least one plug-side dielectric plate 80P(1), 80P(2) disposed between the optical sub-system 26P and the plug interlocking electrodes 42P(1), 42P(2). The plug-side dielectric plates 80P(1), 80P(2) may also prevent electrical shorting between the plug interlocking electrodes 42P(1), 42P(2). The plug outer housing 50 may also include at least one plug-side dielectric coating 82P(1), 82P(2) to prevent electrical shorting between the plug interlocking electrodes 42P(1), 42P(2).

Similarly, the receptacle 12-1 may also include at least one receptacle-side dielectric plate 80R(1), 80R(2) disposed between the optical sub-system 26R and the receptacle interlocking electrodes 42R(1), 42R(2). The receptacle-side dielectric plates 80R(1), 80R(2) may also prevent electrical shorting between the receptacle interlocking electrodes 42R(1), 42R(2). The receptacle housing 60 may also include at least one receptacle-side dielectric coating 82R(1), 82R(2) to prevent electrical shorting between the receptacle interlocking electrodes 42R(1), 42R(2). The plug-side dielectric plates 80P(1), 80P(2), and the receptacle-side dielectric plates 80R(1), 80R(2) may comprise, for example, a thermoplastic, dielectric UV or two-part epoxy or any suitable dielectric film. The plug-side dielectric coating 82P(1), 82P(2) and the receptacle-side dielectric coating 82R(1), 82R(2) may comprise, for example, a thermoplastic, dielectric UV or two-part epoxy or any suitable dielectric film.

Figure 3A:
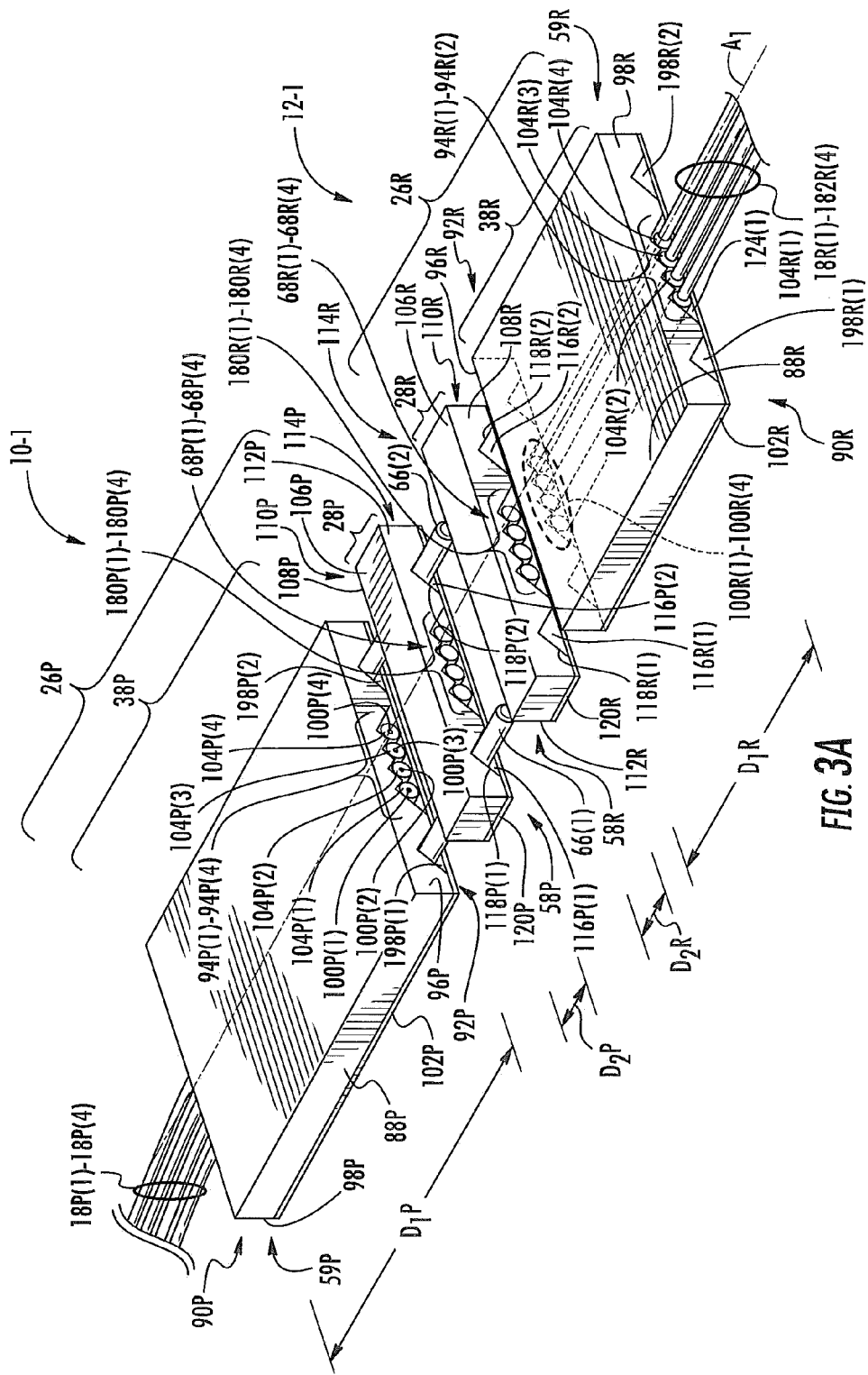
FIG. 3A is a perspective view of the optical sub-system of the plug of FIG. 2A partially disassembled and aligned along an optical axis with the optical sub-system of the receptacle of FIG. 2A, which is also partially disassembled to illustrate the GRIN lens chip of the plug and the GRIN lens chip of the receptacle.

Now that the major components of the plug 10-1 and the receptacle 12-1 have been introduced, details of the optical sub-system 26P, 26R are now discussed. In this regard, FIG. 3A depicts the optical sub-system 26P of the plug 10-1 aligned and detached along the optical axis $A_1$ with the optical sub-system 26R of the receptacle 12-1. The optical sub-system 26P, 26R may provide optical connectivity between the plug 10-1 and the receptacle 12-1. As briefly mentioned earlier, the optical sub-system 26P of the plug 10-1 may comprise the ferrule assembly 38P and the GRIN lens chip 28P. The ferrule assembly 38P may be discussed first.

In this embodiment, the ferrule assembly 38P includes a ferrule body 88P which may precisely guide the optical fibers 18P(1)-18P(4) from a rearward end 90P of the ferrule assembly 38P at the rear end 59P of the plug 10-1 to the GRIN lenses 68P(1)-68P(4) at the front end 58P of the plug 10-1. The ferrule body 88P may include a forward end 92P, a rearward end 90P opposite the forward end 92P along the optical axis $A_1$, a ferrule mating surface 96P disposed at the forward end 92P, and a rearward ferrule surface 98P disposed at the rearward end 90P. The rearward ferrule surface 98P may be disposed a longitudinal distance $D_1P$ from the ferrule mating surface 96P, where the distance $D_1P$ may be measured parallel to the optical axis $A_1$. The longitudinal distance $D_1P$ may be, for example, between four (4) millimeters and nine (9) millimeters. At least one fiber groove 94P(1)-94P(4) may be disposed between the forward end 92P and the rearward end 90P of the ferrule body 88P. The optical fibers 18P(1)-18P(4) may be disposed within the fiber grooves 94P(1)-94P(4) to guide at least one end portion 100P(1)-100P(4) of the optical fibers 18P(1)-18P(4) to be co-planar or substantially co-planar with the ferrule mating surface 96P of the ferrule assembly 38P. The co-planar or substantially co-planar arrangement facilitates alignment with the GRIN lens chip 28P. It is noted that the optical fibers 18P(1)-18P(4) may be secured within the fiber grooves 94P(1)-94P(4) with, for example, epoxy to ensure that the optical fibers 18P(1)-18P(4) remain static with respect to the fiber grooves 94P(1)-94P(4) and thereby reduce an opportunity for optical attenuation.

The ferrule assembly 38P may include a ferrule cover plate 102P secured to the ferrule body 88P. The optical fibers 18P(1)-18P(4) may be disposed between the ferrule cover plate 102P and the ferrule body 88P. In this way, the optical fibers 18P(1)-18P(4) may be further secured within the fiber grooves 94P(1)-94P(4). The ferrule cover plate 102P may be made of a strong rigid material, for example, plastic or metal.

With continued reference to FIG. 3A, the optical sub-system 26P may include at least one capillary tube 104P(1)-104P(4), which may also be referred to as at least one "protective tube." The capillary tubes 104P(1)-104P(4) may be disposed between the optical fibers 18P(1)-18P(4) and the ferrule body 88P. The capillary tubes 104P(1)-104P(4) may include precise inner diameters and outer diameters. The inner diameter of the capillary tubes 104P(1)-104P(4) may correspond to a diameter of the end portions 100P(1)-100P(4) of the optical fibers 18P(1)-18P(4) and thereby be configured to allow the end portions 100P(1)-100P(4) to be inserted therein. The outer diameter of the capillary tubes 104P(1)-104P(4) may correspond to a diameter D (FIG. 5F) of the GRIN lenses 68P(1)-68P(4) of the GRIN lens chip 28P. The dimensional accuracy and nominally equal outer diameters of the capillary tubes 104P(1)-104P(4) and GRIN lenses 68P(1)-68P(4), and nominally equal dimensions of the fiber grooves 94P(1)-94P(4) and the GRIN grooves 180P(1)-180P(4) facilitate precise alignment of the optical fibers 18P(1)-18P(4) and the GRIN lenses 68P(1)-68P(4). The capillary tubes 104P(1)-104P(4) may be used to protect the optical fibers 18P(1)-18P(4) while disposed within the fiber grooves 94P(1)-94P(4). The capillary tubes 104P(1)-104P(4) may be made from glass tubes redrawn to precise final dimensions using conventional fiber redraw processes. The capillary tubes 104P(1)-104P(4) may also comprise a strong semi-flexible material, which may, for example, be a thermoplastic. The capillary tubes 104P(1)-104P(4) may also be used to increase the effective diameter of the optical fibers 18P(1)-18P(4) so as to align the capillary tubes 104P(1)-104P(4) within the fiber grooves 94P(1)-94P(4). In this manner, a standard size of the fiber grooves 94P(1)-94P(4) may be used for multiple types of optical fibers 18P(1)-18P(4) including those with different diameters.

The optical sub-system 26P may also include at least one alignment pin 66(1), 66(2) protruding from the ferrule mating surface 96P of the ferrule body 88P. The alignment pins 66(1), 66(2) may align the plug 10-1 with the receptacle 12-1 along the optical axis $A_1$. The alignment pins 66(1), 66(4) may be placed in the alignment ferrule grooves 198P(1), 198P(2). The alignment ferrule grooves 198P(1), 198P(2) may be precisely located with respect to the fiber grooves 94P(1)-94P(4) and incorporated in the ferrule body 88P. The fiber grooves 94P(1)-94P(4) and alignment ferrule grooves 198P(1), 198P(2) may be incorporated in the ferrule body 88P using a precise mold that may be reusable. In this manner, the ferrule body 88P may be made using low cost, batch processing techniques.

With continuing reference to FIG. 3A, the optical sub-system 26P of the plug 10-1 may also include the GRIN lens chip 28P. The GRIN lens chip 28P may include a GRIN lens holder body 106P comprising a fiber mating surface 108P at a fiber end 110P and a terminal mating surface 112P at a terminal end 114P opposite the fiber end 110P. The fiber mating surface 108P may be disposed a longitudinal distance $D_2P$ away from the terminal mating surface 112P. The longitudinal distance $D_2P$ may be measured parallel to the optical axis $A_1$ and may be, for example, between four (4) millimeters and nine (9) millimeters. The longitudinal distance $D_2P$ may be the same as the length $L_{GL}$ (FIG. 5F) of the GRIN lenses 68P(1)-68P(4) which may be optically connected with the optical fibers 18P(1)-18P(4). In this manner, the GRIN lenses 68P(1)-68P(4) may be precisely located along the optical axis $A_1$ with respect to the GRIN lens holder body 106P.

The GRIN lenses 68P(1)-68P(4) may be optically connected with the optical fibers 18P(1)-18P(4) and may be secured together with an optical adhesive. In this way, the ferrule assembly 38P and the GRIN lens chip 28P remain attached and aligned during engagement and disengagement of the plug 10-1 with the receptacle 12-1.

The GRIN lens chip 28P of the plug 10-1 may further include at least one alignment orifice 116P(1), 116P(2) extending from the fiber mating surface 108P to the terminal mating surface 112P of the GRIN lens holder body 106P. The alignment orifices 116P(1), 116P(2) may be formed by at least one alignment groove 118P(1), 118P(2) of the GRIN lens holder body 106P and a cover plate 120P. The alignment grooves 118P(1), 118P(2) may be precisely placed and orientated with respect to the GRIN grooves 180P(1)-180P(4) to facilitate the alignment of the GRIN lens chip 28P to the ferrule assembly 38P and to also facilitate the alignment between the optical sub-systems 26P, 26R of the plug 10-1 and the receptacle 12-1, respectively. In this manner, the alignment pins 66(1), 66(2) may restrict the GRIN lens holder body 106P to positions along the optical axis $A_1$ relative to the ferrule assembly 38P.

Now that the optical sub-system 26P of the plug 10-1 has been described, the optical sub-system 26R of the receptacle 12-1 may now be described relative to FIGS. 3A and 3B. It is noted that the optical sub-system 26R of the receptacle 12-1 may be similar to the optical sub-system 26P of the plug 10-1 and thus common reference numbers may be used as much as possible and differences will be discussed in detail.

The optical sub-system 26R may include a ferrule assembly 38R and a GRIN lens chip 28R. The ferrule assembly 38R may precisely align the optical fibers 18R(1)-18R(4) so that the GRIN lens chip 28R may optically connect the GRIN lenses 68R(1)-68R(4) with the optical fibers 18R(1)-18R(4) and the GRIN lenses 68P(1)-68P(4) of the optical sub-system 26P of the plug 10-1. In this manner, the optical sub-system 26P of the plug 10-1 may be optically connected to the optical fibers 18R(1)-18R(4).

The ferrule assembly 38R may include a forward end 92R, a rearward end 90R opposite the forward end 92R along the optical axis $A_1$, a ferrule mating surface 96R disposed at the forward end 92R, and a rearward ferrule surface 98R disposed at the rearward end 90R. The rearward ferrule surface 98R may be disposed a longitudinal distance $D_1R$ from the ferrule mating surface 96R, where the distance $D_1R$ may be measured parallel to the optical axis $A_1$. The longitudinal distance $D_1R$ may be, for example, between four (4) millimeters and nine (9) millimeters with this longitudinal distance $D_1R$ the optical fibers 18R(1)-18R(4) may be aligned to be optically connected with the GRIN lenses 68R(1)-68R(4). The ferrule assembly 38R may include a ferrule body 88R which may precisely guide the optical fibers 18R(1)-18R(4) from the rearward end 90R at the rear end 59R of the receptacle 12-1 to the GRIN lenses 68R(1)-68R(2) at the front end 58R of the receptacle 12-1. At least one fiber groove 94R(1)-94R(4) may be disposed between the forward end 92R and the rearward end 90R. The optical fibers 18R(1)-18R(4) may be received within the fiber grooves 94R(1)-94R(4) in a manner to guide at least one end portion 100R(1)-100R(4) of the optical fibers 18R(1)-18R(4) to be coplanar or substantially coplanar with the ferrule mating surface 96R of the ferrule assembly 38R. The co-planar or substantially co-planar arrangement facilitates alignment of the optical fibers 18R(1)-18R(4) with the GRIN lenses 68R(1)-68R(4). It is noted that the optical fibers 18R(1)-18R(4) may be secured within the fiber grooves 94R(1)-94R(4) with, for example, epoxy to ensure that the optical fibers 18R(1)-18R(4) remain static with respect to the fiber grooves 94R(1)-94R(4) and thereby reduce an opportunity for optical attenuation.

The ferrule assembly 38R may include a ferrule cover plate 102R secured to the ferrule body 88R. The optical fibers 18R(1)-18R(4) may be disposed between the ferrule cover plate 102R and the ferrule body 88R. In this way, the optical fibers 18R(1)-18R(4) may be further secured within the fiber grooves 94R(1)-94R(2). The ferrule cover plate 102R may be made of a strong rigid material, for example, plastic or metal.

With continued reference to FIG. 3A, the optical sub-system 26R may include at least one capillary tube 104R(1)-104R(4), which may be referred to as at least one "protective tube." The capillary tubes 104R(1)-104R(4) may be disposed between the optical fibers 18R(1)-18R(4) and the fiber grooves 94R(1)-94R(4). The capillary tubes 104R(1)-104R(4) may include precise inner diameters and outer diameters. The inner diameter of the capillary tubes 104R(1)-104R(4) may correspond to a diameter of the end portions 100R(1)-100R(4) of the optical fibers 18R(1)-18R(4) and thereby be configured to allow the end portions 100P(1)-100P(2) to be inserted therein. The outer diameter of the capillary tubes 104R(1)-104R(4) may correspond to the diameter D (FIG. 5F) of the GRIN lenses 68R(1)-68R(4) in the GRIN lens chip 28R. The dimensional accuracy and nominally equal outer diameters of the capillary tubes 104R(1)-104R(4) and GRIN lenses 68R(1)-68R(4), and nominally equal dimensions of the fiber grooves 94R(1)-94R(4) and the GRIN grooves 180R(1)-180R(4) facilitate precise alignment of the optical fibers 18R(1)-18R(4) and the GRIN lenses 68R(1)-68R(4). The capillary tubes 104R(1)-104R(4) may be used to protect the optical fibers 18R(1)-18R(4) while disposed within the fiber grooves 94R(1)-94R(4). The capillary tubes 104R(1)-104R(4) may be made from glass tubes redrawn to precise final dimensions using conventional fiber redraw processes. The capillary tubes 104R(1)-104R(4) may also comprise a strong semi-flexible material, which may, for example, be a thermoplastic. The capillary tubes 104R(1)-104R(4) may also be used to increase the effective diameter of the optical fibers 18R(1)-18R(4) so as to align the capillary tubes 104R(1)-104R(4) within the fiber grooves 94R(1)-94R(4). In this manner, a standard size of the fiber grooves 94R(1)-94R(4) may be used for multiple types of optical fibers 18R(1)-18R(4) including those with different diameters.

With continuing reference to FIG. 3A, the optical sub-system 26R of the receptacle 12-1 may also include a GRIN lens chip 28R. The GRIN lens chip 28R may include a GRIN lens holder body 106R comprising a fiber mating surface 108R at a fiber end 110R and a terminal mating surface 112R at a terminal end 114R opposite the fiber end 110R. The fiber mating surface 108R may be disposed a longitudinal distance $D_2R$ away from the terminal mating surface 112R and may be, for example, between a half millimeter and ten (10) millimeters. The longitudinal distance $D_2R$ may be measured parallel to the optical axis $A_1$. The longitudinal distance $D_2R$ may be the same as the length $L_{GL}$ (FIG. 5F) of the GRIN lenses 68R(1)-68R(4) which may be optically connected with the optical fibers 18R(1)-18R(4). In this manner, the GRIN lenses 68R(1)-68R(4) may be more precisely located along the optical axis $A_1$ with respect to the GRIN lens holder body 106R.

The GRIN lens chip 28R may further include at least one alignment orifice 116R(1), 116R(2) extending from the fiber mating surface 108R to the terminal mating surface 112R of the GRIN lens holder body 106R. The alignment orifices 116R(1), 116R(2) may be formed by at least one alignment groove 118R(1), 118R(2) of the GRIN lens holder body 106R and a cover plate 120R. The alignment orifices 116R(1), 116R(2) may be configured to receive the alignment pins 66(1), 66(2). The alignment pins 66(1), 66(2) may restrict the GRIN lens holder body 106R to a movement (or positions) along the optical axis $A_1$ relative to the ferrule assembly 38P of the plug 10-1 from which the alignment pins 66(1), 66(2) may extend. The alignment grooves 118R(1), 118R(2) may be precisely placed and orientated with respect to the GRIN grooves 180R(1)-180R(4) and facilitate the alignment of the GRIN lens chip 28R to the ferrule assembly 38R and also facilitate the alignment between the optical sub-systems 26P, 26R of the plug 10-1 and the receptacle 12-1, respectively. In this manner, the GRIN lenses 68R(1)-68R(4) of the GRIN lens chip 28R may be aligned within the optical sub-system 26R and to the optical sub-system 26P.

Also in regards to alignment, the alignment pins 66(1), 66(2) may restrict the GRIN lens holder body 106R to positions along the optical axis $A_1$ relative to the ferrule assembly 38P. The alignment pins 66(1), 66(2) may also align the GRIN lens chip 28R with the ferrule assembly 38R of the receptacle 12-1. Once aligned, the GRIN lenses 68R(1)-68R(4) may be secured to the end portions 100R(1)-100R(4) of the optical fibers 18R(1)-18R(4) with an optical adhesive. In this way, the ferrule assembly 38R and the GRIN lens chip 28R remain attached and aligned during engagement and disengagement of the plug 10-1 with the receptacle 12-1.

Figure 3B:
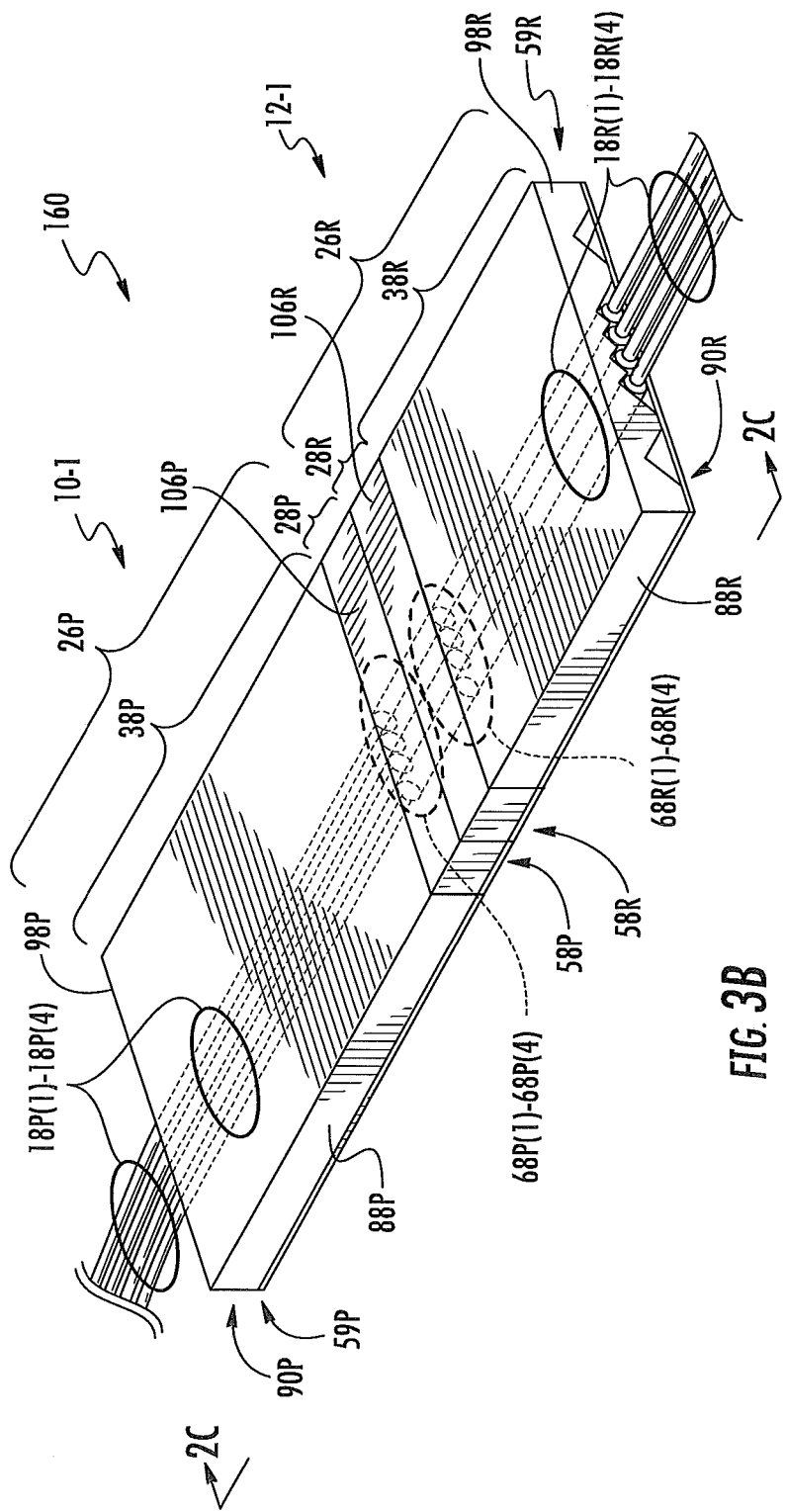

FIGS. 3B through 3D are perspective, side, and top views, respectively, of an optical connection 160 comprising the optical sub-system 26P of the plug 10-1 of FIG. 2A and the optical sub-system 26R of the receptacle 12-1 of FIG. 2A. These views illustrate optical connecting of the optical sub-systems 26P, 26R when the plug 10-1 may be engaged with the receptacle 12-1. The other parts of the plug 10-1 and the receptacle 12-1 are hidden in FIGS. 3B-3D to provide details of the optical sub-systems 26P, 26R providing optical connecting for the optical fibers 18P(1)-18P(4) and the optical fibers 18R(1)-18R(4), respectively.

As discussed above, GRIN lenses 68P(1)-68P(4) are included as part of the GRIN lens chip 28P of the optical connection 160. FIGS. 3B-5F depict the GRIN lenses 68P(1)-68P(4) of the plug 10-1 may be optically connected with the optical fibers 18P(1)-18P(4), respectively. Each of the GRIN lenses 68P(1)-68P(4) of the plug 10-1 may include a first end face 164P(1)-164P(4) disposed at a first end 166P(1)-166P(4) of the GRIN lenses 68P(1)-68P(4) and a second end face 168P(1)-168P(4) disposed at a second end 170P(1)-170P(4) of the GRIN lenses 68P(1)-68P(4). The first end face 164P(1)-164P(4) of the GRIN lenses 68P(1)-68P(4) may be disposed adjacent the fiber mating surface 108P of the GRIN lens holder body 106P and the second end face 168P(1)-168P(4) of the of the GRIN lenses 68P(1)-68P(4) may be disposed adjacent to the terminal mating surface 112P. The fiber mating surface 108P of the GRIN lens chip 28P of the plug 10-1 may abut against the ferrule mating surface 96P of the ferrule body 88P of the plug 10-1. In this manner, the GRIN lenses 68P(1)-68P(4) may be precisely aligned with the optical fibers 18P(1)-18P(4) and the first end faces 164P(1)-164P(4) and the second end faces 168P(1)-168P(4) may be easily coated with anti-reflective coatings to reduce optical attenuation.

Similarly, for the receptacle 12-1, the GRIN lenses 68R(1)-68R(4) of the receptacle 12-1 may be optically connected with the optical fibers 18R(1)-18R(4), respectively. Each of the GRIN lenses 68R(1)-68R(4) of the receptacle 12-1 may include a first end face 164R(1)-164R(4) disposed at a first end 166R(1)-166R(4) of the GRIN lenses 68R(1)-68R(4) and a second end face 168R(1)-168R(4) disposed at a second end 170R(1)-170R(4) of the GRIN lenses 68R(1)-68R(4). The first end face 164R(1)-164R(4) of the GRIN lenses 68R(1)-68R(4) may be disposed adjacent the fiber mating surface 108R of the GRIN lens holder body 106R and the second end face 168R(1)-168R(4) of the of the GRIN lenses 68R(1)-68R(4) may be disposed adjacent to the terminal mating surface 112R. The fiber mating surface 108R of the GRIN lens chip 28R of the receptacle 12-1 may abut against the ferrule mating surface 96R of the ferrule body 88R of the receptacle 12-1. In this manner, the GRIN lenses 68R(1)-68R(4) may be precisely aligned with the optical fibers 18R(1)-18R(4), and the first end faces 164R(1)-164R(4) and the second end faces 168R(1)-168R(4) may be easily coated with anti-reflective coatings to reduce optical attenuation.

The second end face 168P(1)-168P(4) of the GRIN lenses 68P(1)-68P(4) of the plug 10-1 may be optically connected to the second end face 168R(1)-168R(4) of the GRIN lenses 68R(1)-68R(4) of the receptacle 12-1. The terminal mating surface 112P of the GRIN lens chip 28P of the plug 10-1 may abut against the terminal mating surface 112R of the GRIN lens chip 28R of the receptacle 12-1.

Figure 4:
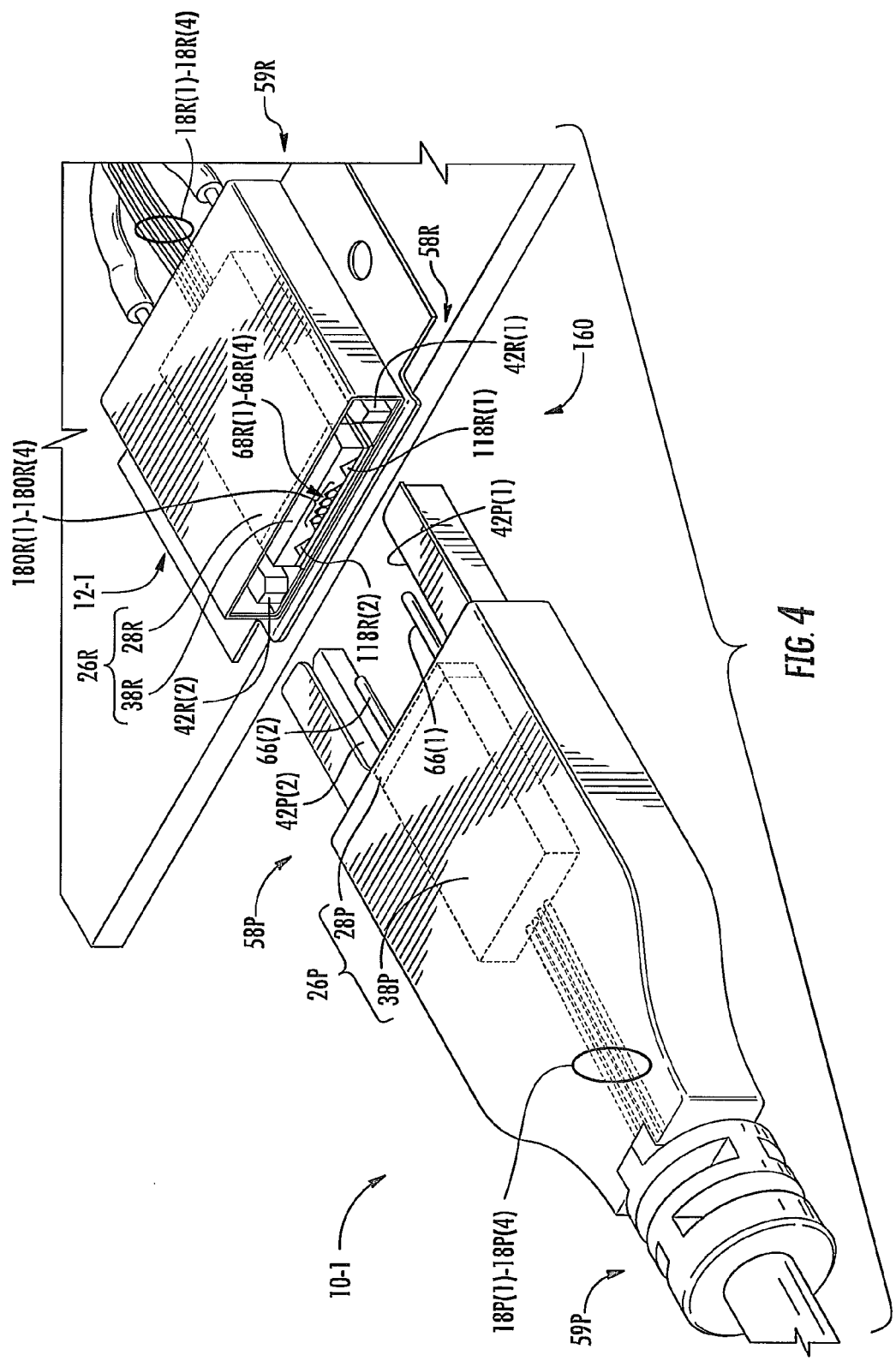
FIG. 4 is a perspective view of the plug disengaged from the receptacle of FIG. 2A to illustrate access to the GRIN lens chip of the receptacle.

Alignment of the optical sub-systems 26P, 26R makes the optical connection relationships for the optical connection 160 discussed above possible. FIG. 4 depicts the optical sub-system 26P of the plug 10-1 being engaged with the optical sub-system 26R of the receptacle 12-1 in order to establish the optical connection 160. As the plug 10-1 engages with the receptacle 12-1, the alignment pins 66(1), 66(2) may be received within at least one alignment ferrule groove 198R(1), 198R(2) of the GRIN lens chip 28R of the receptacle 12-1. The alignment ferrule grooves 198R(1), 198R(2) may be precisely placed and orientated with respect to the fiber grooves 94R(1)-94R(4) and facilitate the alignment of the GRIN lens chip 28R to the ferrule assembly 38R and also facilitate the alignment between the optical sub-systems 26P, 26R of the plug 10-1 and the receptacle 12-1, respectively. In this manner, the GRIN lenses 68P(1)-68P(4) of the plug 10-1 may be aligned to the GRIN lenses 68R(1)-68R(4) of the receptacle 12-1. This alignment is made possible because a location of the alignment pins 66(1), 66(2) relative to the GRIN lenses 68P(1)-68P(4) may be set by the alignment orifices 116P(1), 116P(2) and a location of the alignment pins 66(1), 66(1) relative to the GRIN lenses 68R(1)-68R(4) may be set by the alignment orifices 116R(1), 116R(2).

Now that the optical connection 160 has been discussed and high-level components of the plug 10-1 and receptacle 12-1 have been introduced, further details of the optical sub-system 26P of the plug 10-1 and the optical sub-system 26R of the receptacle 12-1 may now be discussed with respect to the GRIN lens chips 28P, 28R and the ferrule assemblies 38P, 38R.

FIGS. 5A-5E depict a perspective view, front view, rear view, and exploded view of the GRIN lens chip 28P of the plug 10-1. FIG. 5F is a close-up view of the GRIN lens 68(1) of FIG. 5E. FIGS. 6A-6D depict perspective view, front view, bottom view, and side view of the GRIN lens holder body 106P of the GRIN lens chip 28P of FIGS. 5A-5E. It is noted that FIGS. 5A through 6D may also represent the GRIN lens chip 28R of the receptacle 12-1, or components thereof, and so the subscript "P" and "R" designating the plug 10-1 and receptacle 12-1, respectively, are removed in FIGS. 5A-6D. Using this nomenclature convention consistent with the reference numbers discussed above, the GRIN lens chip 28 may include the GRIN lens holder body 106, the GRIN lenses 68(1)-68(4), the GRIN grooves 180(1)-180(4) and the cover plate 120 which are discussed here in order.

The GRIN lens holder body 106 secures the GRIN lenses 68(1)-68(4) within the GRIN lens chip 28. The GRIN lens holder body 106 may comprise the fiber mating surface 108 at the fiber end 110 and terminal mating surface 112 at the terminal end 114 opposite the fiber end 110. The fiber mating surface 108 and terminal mating surface 112 may be utilized to align the GRIN lens holder body 106 within the optical connection 160 (FIG. 3B). The fiber mating surface 108 of the GRIN lens holder body 106 may abut against the ferrule mating surface 96 of the ferrule assembly 38, so that the GRIN lenses 68(1)-68(2) may be precisely positioned along the optical axis $A_1$ relative to the optical fibers 18(1)-18(4) (see FIG. 3D). In this manner, optical attenuation may be reduced between the optical fibers 18(1)-18(4) and the GRIN lenses 68(1)-68(4) as alignment of the GRIN lenses 68(1)-68(2) may be provided by the fiber mating surface 108 instead of by a difficult positioning of the GRIN lenses 68(1)-68(4) within a combination ferrule assembly where both the optical fibers 18(1)-18(4) and the GRIN lenses 68(1)-68(4) may be secured and the interface between may be difficult to form with precision.

The terminal mating surface 112 of the GRIN lens holder body 106 may abut against a complementary terminal mating surface (FIG. 3D) of a complementary GRIN lens holder body, so that the GRIN lenses 68(1)-68(2) may be precisely positioned along the optical axis $A_1$ relative to the complementary GRIN lens holder body. In this way, optical attenuation may be reduced between the GRIN lenses 68P(1)-68P(4) of the plug 10-1 and the GRIN lenses 68R(1)-68R(4) of the receptacle 12-1.

With continuing reference to the GRIN lens holder body 106 of FIGS. 5A through 6D, the fiber mating surface 108 may be disposed the longitudinal distance $D_2$ away from the terminal mating surface 112. The longitudinal distance $D_2$ may be measured parallel to the optical axis $A_1$ and may be, for example, approximately one (1) millimeter to ten (10) millimeters long. The longitudinal distance $D_2$ may be the same distance as a length $L_{GL}$ of the GRIN lenses 68(1)-68(4). In this manner, the longitudinal distance $D_2$ and the length $L_{GL}$ may be formed at the same time to provide a more efficient manufacturing process.

The fiber mating surface 108 may be disposed parallel to the terminal mating surface 112. In this way, manufacturing may be simplified and the GRIN lens chip 28R may be interchangeable with the GRIN lens chip 28P. The GRIN lens chip 28 also may include mirror symmetry across a geometric plane $P_1$ (FIG. 5D) disposed orthogonal to the optical axis $A_1$. In this manner, the GRIN lens chip 28 may be used back-to-back in the plug 10-1 and the receptacle 12-1 when establishing the optical connection 160 (FIG. 3B).

The GRIN lens holder body 106 may comprise a strong, hard material, for example, metal, ceramic, glass or plastic. In this way, the GRIN lens holder body 106 may be resistant to bending and surface scratching which could cause optical attenuation by changing an interface between the GRIN lens holder body 106 and the ferrule body 88 (FIG. 9A) which may change the relationship between the GRIN lenses 68(1)-68(4) and the optical fibers 18(1)-18(4) secured thereto, respectively. Further, the strong, hard material of the GRIN lens holder body 106 may include thermal expansion characteristics similar to the GRIN lenses 68(1)-68(4) so that the GRIN lenses 68(1)-68(4) may remain secured and aligned within the GRIN grooves 180(1)-180(4) when subjected to thermal cycles.

It is also noted that the GRIN lens chip 28 may provide optional features to reduce optical attenuation. For example, the GRIN lens holder body 106 may comprise glass, ceramic and metal instead of plastic to provide more robust connectors with excellent durability and scratch resistance. In this manner, the GRIN lens chip 28 may have lower optical attenuation in consumer applications where surface scratching may be more common than in industrial applications.

There are advantages to using the GRIN lens chips 28P, 28R. First, using the GRIN lens chips 28P, 28R in the optical sub-systems 26P, 26R, respectively, results in merely three (3) optical interfaces along the optical axis $A_1$: between the optical fibers 18P(1)-18P(4) and the GRIN lenses 68P(1)-68P(4), between the GRIN lenses 68P(1)-68P(4) and the GRIN lenses 68R(1)-68R(4), and between the GRIN lenses 68R(1)-68R(4) and the optical fibers 18R(1)-18R(4). As each optical interface may be a significant source of optical attenuation because light travels between optical components which may have an air gap between, by only having the three (3) optical interfaces, the intrinsic optical attenuation may be less than other optical pathways requiring more than three (3) optical interfaces.

Another advantage to using the GRIN lens chips 28P, 28R is that they allow for modularity. The optical sub-systems 26P, 26R each may have a modular design wherein the GRIN lens holder bodies 106P, 106R, respectively, may be manufactured separately from the ferrule bodies 88P, 88R. The ferrule bodies 88P, 88R are not exposed to thousands of expected connections and related mating forces because they are shielded by the GRIN lens chips 28P, 28R. In this manner, the ferrule bodies 88P, 88R may be made of lower cost, and less durable materials than the GRIN lens holder bodies 106P, 106R, for example, polymers. The modular approach may also be compatible with consumer applications where customization and frequent upgrades may be required to be low cost and quickly completed, for example, if and when the GRIN lenses 68R(1)-68R(4) are updated.

In order to understand how the benefits of the GRIN lens chips 28P, 28R are made possible, details of the GRIN lenses 68(1)-68(4) are now introduced. With continuing reference to FIGS. 5A through 5E, the GRIN lens chip 28 may include the GRIN lenses 68(1)-68(4). The GRIN lenses 68(1)-68(4) may comprise the first end 166, and the second end 170 opposite the first end 166. The GRIN lenses 68(1)-68(4) may also include the first end face 164 disposed at the first end 166, and the second end face 168 disposed at the second end 170.

The GRIN lenses 68(1)-68(4) may be manufactured, for example, from a GRIN lens rod 222(1) (see FIG. 35) drawn from a multimode fiber core cane (not shown). The GRIN lenses 68(1)-68(4) may focus light through a precisely controlled radial decrease of the lens material's index of refraction from the optical axis $A_1$ to the edge of the lens at a radius $r_1$ from the optical axis $A_1$ (FIG. 5F). Exemplary indices of refraction may be 1.54 and 1.43 at a radius $r_1$ (FIG. 5F) of 0.25 millimeters, and other values are commercially available. The GRIN lenses 68(1)-68(4) may be, for example, a GRIN lens manufactured by Corning, Incorporated of Corning, N.Y.

The GRIN lenses 68(1)-68(4) may be, for example, a cylindrical solid shape. The length $L_{GL}$ (FIG. 5F) of the GRIN lenses 68(1)-68(4) may be, for example, between approximately one (1) millimeter to ten (10) millimeters long as measured along the optical axis $A_1$. The length $L_{GL}$ may be selected to focus a collimated beam into a point source and/or focus a point source into a collimated beam. The length $L_{GL}$ may be based on a pitch greater than 0.22 and less than 0.29, or based on a suitable multiple of the quarter pitch, such as (n*P/2+P/4), where n is an integer and may have values from 0, 1, etc. The preferred pitch may be a quarter (0.25) pitch. The length $L_{GL}$ of the GRIN lenses 68(1)-68(4) may be conventionally determined, for example, using its gradient index profile as a function of radius r1 (FIG. 5F). The gradient index profile may be for example, parabolic with respect to the radius r1. In this manner, light may be focused to a point source or collimated by passing through the GRIN lenses 68(1)-68(4).

The length $L_{GL}$ of the GRIN lenses 68(1)-68(4) may be, for example, the same as the longitudinal distance $D_2$ of the GRIN lens holder body 106. The longitudinal distance $D_2$ may be represented in FIG. 3A by either $D_2P$ or $D_2R$). In this manner, the first end face 164 of the GRIN lenses 68(1)-68(4) may be disposed adjacent to the fiber mating surface 108, and the second end face 168 of the GRIN lenses 68(1)-68(4) may be disposed adjacent the terminal mating surface 112. A maximum outer diameter of the GRIN lenses 68(1)-68(4) measured orthogonal to the optical axis $A_1$ is less than or equal to 1.5 millimeters.

Figure 5F:
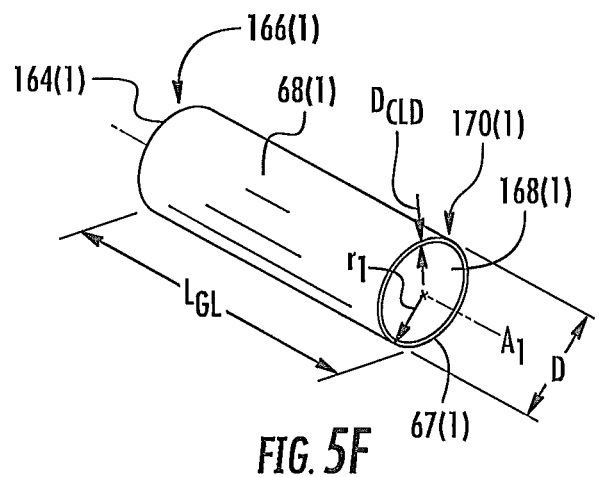
FIG. 5F is a perspective close-up view of the GRIN lens of the at least one GRIN lens of FIG. 5E to illustrate details of the GRIN lens.
Figure 5G:
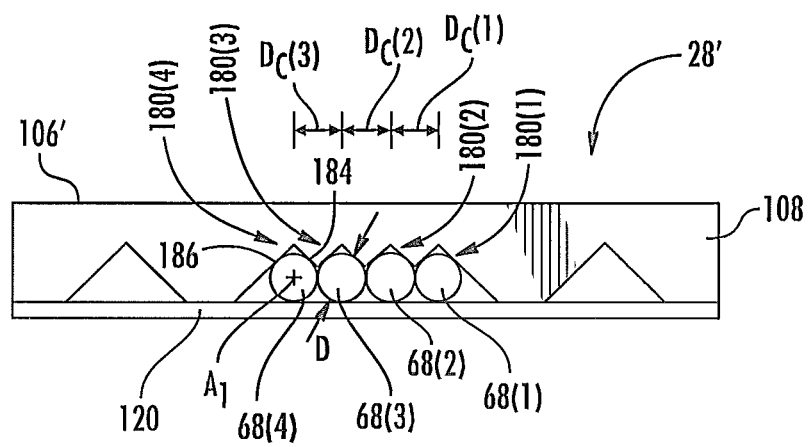
FIG. 5G is a rear view of an alternative embodiment of a GRIN lens chip to illustrate a higher density of GRIN lenses within the GRIN lens chip wherein a spacing between GRIN grooves may be the same as a diameter of the GRIN lenses.
Figure 6A:
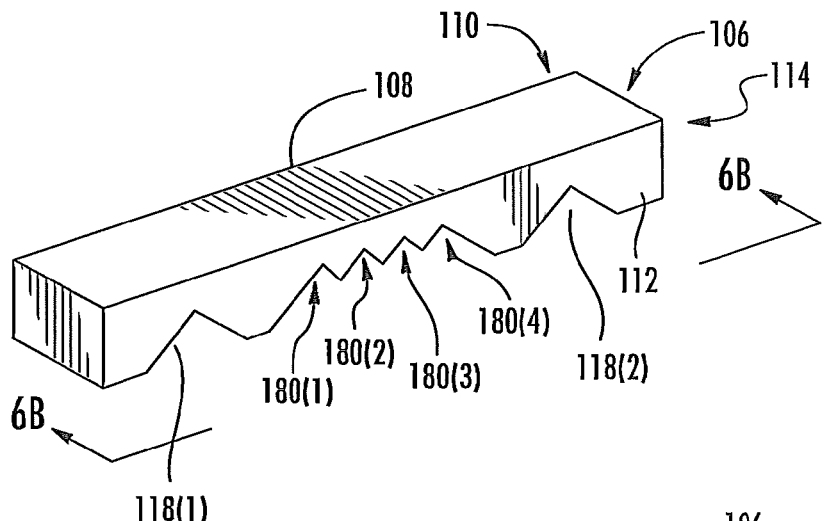
FIGS. 6A-6D are a perspective view, a front view, a bottom view, and a right side view, respectively, of the GRIN lens holder body of FIG. 5E to illustrate at least one GRIN groove configured to receive the at least one GRIN lens of FIG. 5A.
Figure 6B:
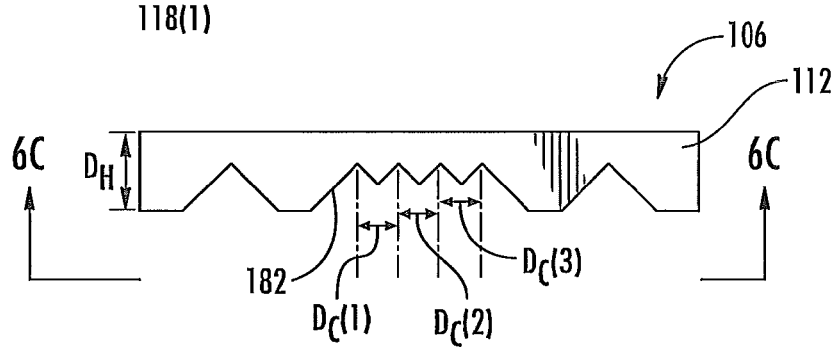
Figure 6C:
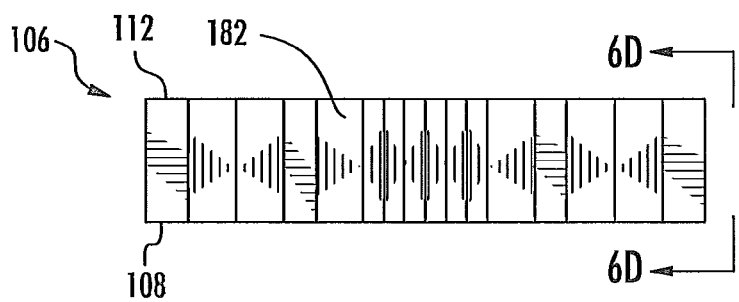
Figure 6D:
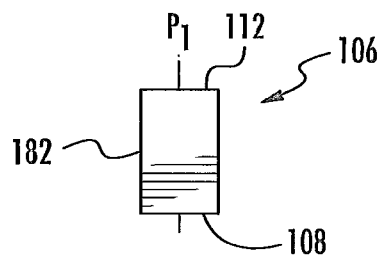
Figure 7A:
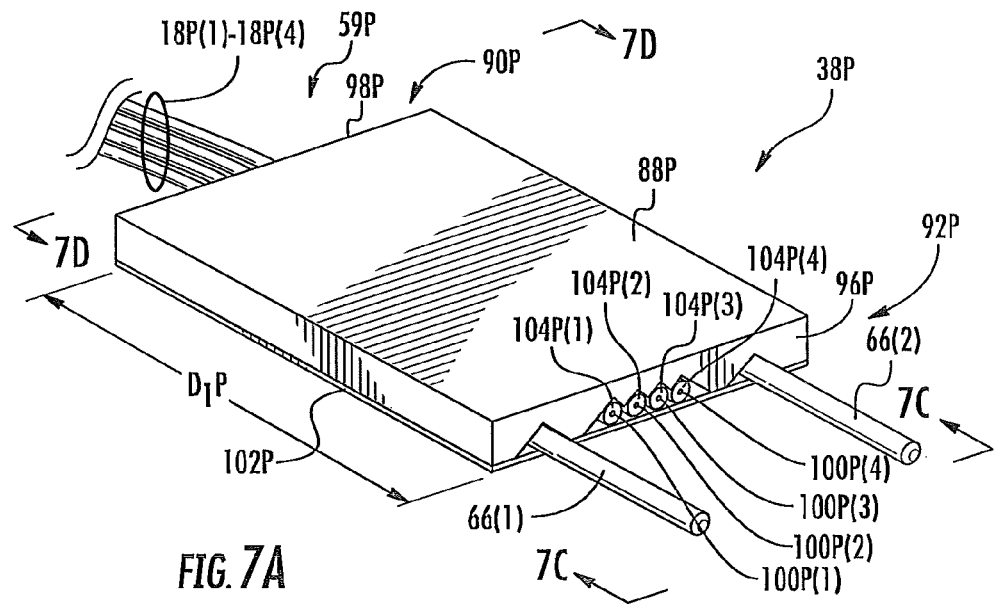
FIGS. 7A-7D are a perspective view, an exploded perspective view, a front view, and a rear view, respectively, of a ferrule assembly of the optical sub-system of the plug of FIG. 2A to illustrate at least one optical fiber received within at least one fiber groove of a ferrule body of the plug.
Figure 7B:
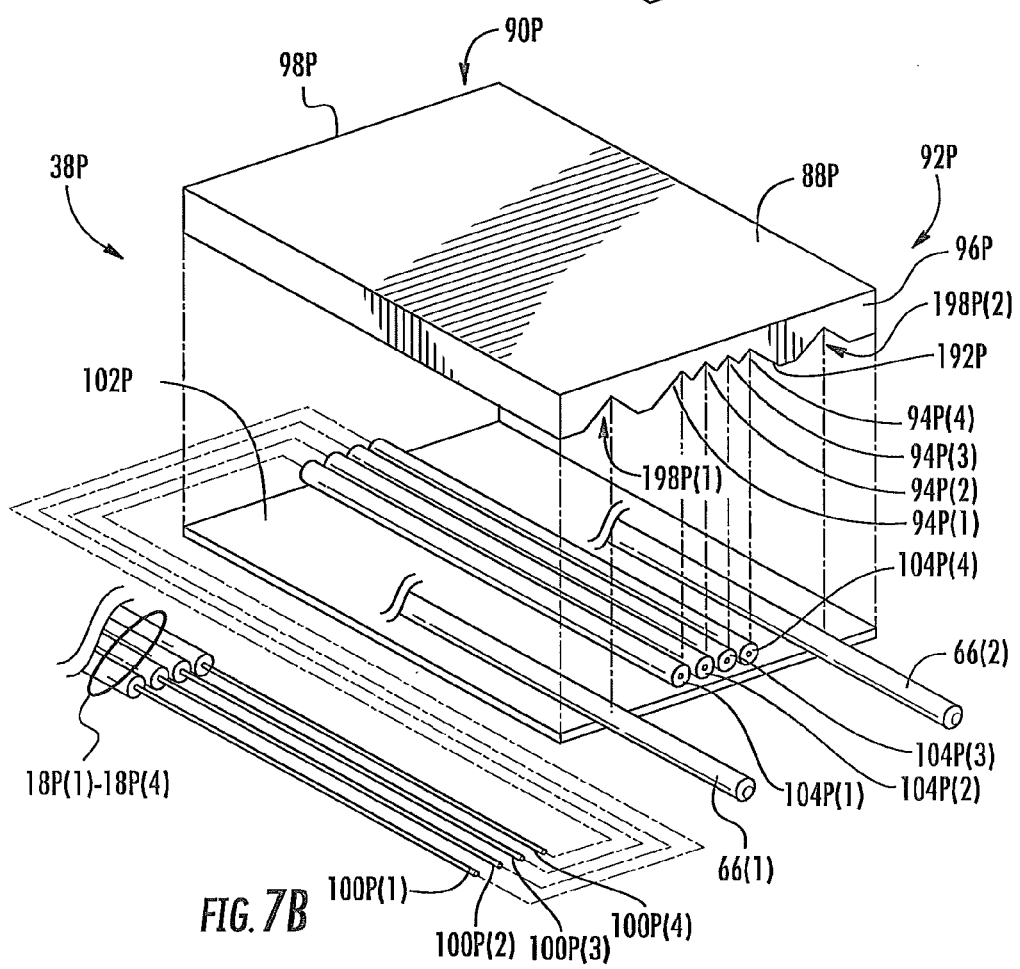
Figure 7C:
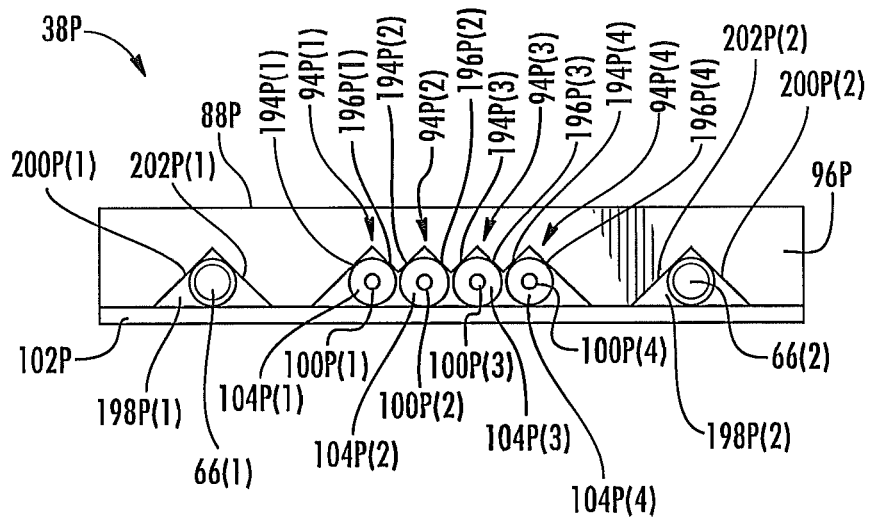
Figure 7D:
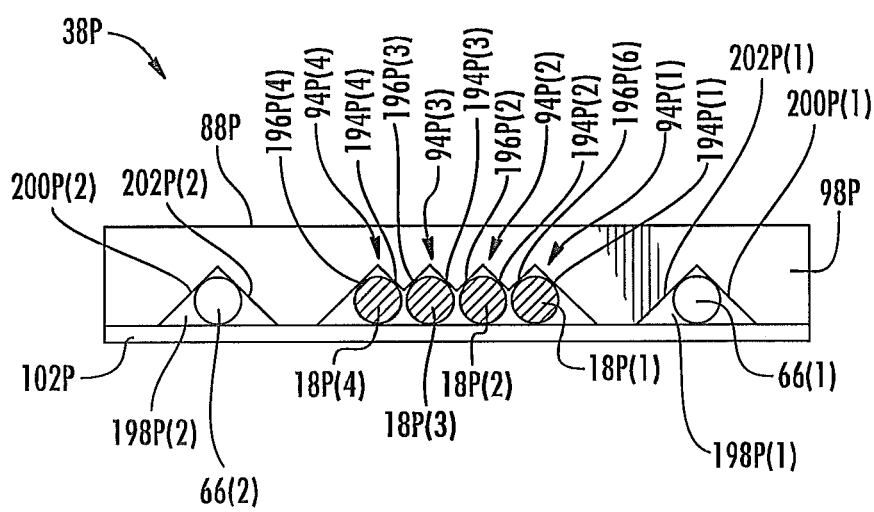

The first end face 164 of the GRIN lenses 68(1)-68(4) may be disposed planar or substantially planar with the fiber mating surface 108. The second end face 168 of the GRIN lenses 68(1)-68(4) may be disposed planar or substantially planar with the terminal mating surface 112. This may improve manufacturability by allowing the GRIN lens holder body 106 to be machined simultaneously with the GRIN lenses 68(1)-68(4). The GRIN lenses 68(1)-68(4) may, for example, be fabricated using conventional optical fiber processing techniques such as vapor deposition processes using silica-based materials. In this approach, large GRIN lens blanks (not shown) may be conventionally made in a manner similar to the manner in which high-bandwidth multimode optical fiber blanks are made. The GRIN lens blank may comprise a GRIN core and an outside cladding. The GRIN lens core may be made by appropriate doping of the GRIN lens blank during the vapor deposition process. Such GRIN lens blanks may be drawn to GRIN lenses 68(1)-68(4) having the outside diameter D (FIG. 5F). The outside diameter D (FIG. 5F) of the GRIN lenses 68(1)-68(4) may be, for example, from 125 microns to one (1) millimeter, and may be approximately equal to a center-to-center distance $D_C(1)$ (FIG. 6B) between adjacent ones of the GRIN grooves 180(1)-180(4), respectively, in the GRIN lens holder body 106. FIG. 6B depicts three (3) examples of the center-to-center distances $D_C(1)$-$D_C(3)$ between adjacent ones of GRIN grooves 180(1)-180(2), adjacent ones of GRIN grooves 180(2)-180(3), and adjacent ones of GRIN grooves 180(3)-180(4), respectively. In this manner, a density of GRIN lenses 68(1)-68(4) received by the GRIN lens holder body 106 may be increased to add optical pathways thereby optical bandwidth. To provide a higher density example, FIG. 5G depicts a rear view of an alternative embodiment of a GRIN lens chip 28' wherein an outside diameter D of the GRIN lenses 68(1)-68(4) is equal to the to a center-to-center distance $D_C(1)$ between adjacent ones of the GRIN grooves 180(1)-180(4) to provide the higher density of the GRIN lenses 68(1)-68(4). As a consequence, adjacent ones of the GRIN lenses 68(1)-68(4) abut against each other. In this manner, a GRIN lens holder body 106' may be able to accommodate additional GRIN lenses (not shown) to provide additional bandwidth.

With reference back to FIGS. 5A-5F, a precise positioning of the GRIN lenses 68(1)-68(4) within the GRIN lens holder body 106 may be significant to aligning the GRIN lenses 68(1)-68(4) within the plug 10-1 and/or receptacle 12-1. In order to provide the precise positioning, the outside diameters D of the GRIN lenses 68(1)-68(4) may be precisely manufactured and thereby utilized to obtain a precise alignment of the GRIN lenses 68(1)-68(4) within the GRIN lens holder body 106. A cladding thickness $D_{CLD}$ (FIG. 5F) of the outside cladding 67(1)-67(4) of the GRIN lenses 68(1)-68(4) may be from zero (0) to approximately one-hundred fifty (150) microns. The GRIN lenses 68(1)-68(4) may be made without a cladding to reduce a required size of the GRIN grooves 180(1)-180(4) and therefore reduce the needed thickness $D_H$ (FIG. 6B) of the GRIN lens holder body 106. Alternatively, the cladding thickness may be added up to one-hundred fifty microns thick to prevent chipping of the GRIN lenses 68(1)-68(4) during manufacturing, for example, during dicing and wire sawing processes which may be used to fabricate the GRIN lens chips 28P, 28R.

The GRIN lenses 68(1)-68(4) may also be fabricated using an ion-exchange process. In this process, the GRIN lenses 68(1)-68(4) may comprise glass with ions, for example, lithium or silver ions, added as part of the ion-exchange process or multiple ion-exchange process. In another example, the GRIN lenses 68(1)-68(4) may comprise a polymeric and/or monomeric material. As such, commonly-utilized wavelengths of light, for example, 850 nanometers or other telecommunication wavelengths in the near infrared range of 1300 nanometers to 1600 nanometers used in fiber optic technology may be efficiently transmitted through the GRIN lenses 68(1)-68(4). The GRIN lenses 68(1)-68(4) may be produced in either a continuous or batch manufacturing process, as is known in the art.

With reference to FIGS. 5A-6D, the GRIN lens chip 28 may include the GRIN grooves 180(1)-180(4) disposed between the fiber end 110 and the terminal end 114 of the GRIN lens holder body 106. The GRIN grooves 180(1)-180(4) may also receive the GRIN lenses 68(1)-68(4). The GRIN grooves 180(1)-180(4) may be, for example, formed in a V-groove shape by at least a portion of at least one contoured engagement surface 182 of the GRIN lens holder body 106. The contoured engagement surface 182 may connect the fiber mating surface 108 to the terminal mating surface 112. The each of the GRIN lenses 68(1)-68(4) may abut against the GRIN lens holder body 106 at a first point 184(1)-184(4) and a second point 186(1)-186(4). The GRIN lenses 68(1)-68(4) may be secured to the GRIN lens holder body 106 at the first point 184(1)-184(4) and the second point 186(1)-186(4) with, for example, an adhesive agent or a cohesive agent such as epoxy. In this manner, the GRIN lenses 68(1)-68(4) may be static relative to the GRIN lens holder body 106 to reduce optical attenuation.

With continuing reference to FIGS. 5A through 6D, the GRIN lens holder body 106 of the GRIN lens chip 28 may include the alignment grooves 118(1), 118(2) configured to receive the alignment pins 66(1), 66(2). The alignment grooves 118(1), 118(2) may be disposed parallel to the optical axis $A_1$. The alignment grooves 118(1), 118(2) may be, for example, formed in a V-groove shape by the contoured engagement surface 182 of the GRIN lens holder body 106. Each of the alignment pins 66(1), 66(2) may abut against the GRIN lens holder body 106 at a first alignment point 188(1), 188(2) and a second alignment point 190(1), 190(2), respectively, as shown in FIG. 5B. In this manner, the GRIN lens holder body 106 may be restricted to positions along the optical axis $A_1$ to reduce optical attenuation.

With continuing reference to FIGS. 5A through 5E, the GRIN lens chip 28 may include the cover plate 120 secured to the GRIN lens holder body 106. The cover plate 120 may be secured to the GRIN lens holder body 106 with, for example, an adhesive or cohesive. The GRIN lenses 68(1)-68(4) may be at least partially disposed between the cover plate 120 and the GRIN lens holder body 106.

Moreover, the cover plate 120 may be configured to secure the alignment pins 66(1), 66(2) within the alignment grooves 118(1), 118(2). In this manner, the alignment grooves 118(1), 118(2) and the fiber mating surface 108 may align the GRIN lenses 68(1)-68(4) to optical fibers 18(1)-18(4) of the ferrule assembly 38P of the plug 10-1 or the ferrule assembly 38R of the receptacle 12-1.

Now details of the ferrule assembly 38P of the plug 10-1 are introduced. FIGS. 7A through 7D are a perspective view, exploded view, front view, and rear view of the ferrule assembly 38P of the plug 10-1. It is noted that the ferrule assembly 38P may or may not include the alignment pins 66(1), 66(2). The ferrule assembly 38P may include the ferrule body 88P, the optical fibers 18P(1)-18P(4), the fiber grooves 94P(1)-94P(4) and the ferrule cover plate 102P which are discussed here in order.

The ferrule body 88P may secure the optical fibers 18(1)-18(4) within the ferrule assembly 38P. The ferrule body 88P may comprise the ferrule mating surface 96P at the forward end 92 and the rearward ferrule surface 98P at the rearward end 90P opposite the forward end 92P.

As discussed earlier, the fiber mating surface 108P of the GRIN lens holder body 106P may abut against the ferrule mating surface 96P of the ferrule body 88P, so that the GRIN lenses 68P(1)-68P(2) may be precisely positioned along the optical axis $A_1$ relative to the optical fibers 18P(1)-18P(4). This precise positioning may be facilitated by the alignment pins 66(1), 66(2) which are located in the alignment ferrule grooves 198P(1), 198P(2) which are precisely formed as part of the ferrule body 88P and these alignment pins 66(1), 66(2) may be received within the alignment grooves 118P(1), 118P(2) of the GRIN lens holder body 106P. In this manner, optical attenuation may be reduced between the optical fibers 18P(1)-18P(4) and the GRIN lenses 68(1)-68(4).

It is also noted that the optical fibers 18P(1)-18P(4) may extend from the rearward end 90P of the ferrule assembly 38P. In this way, the ferrule assembly 38P of the optical sub-system 26P may be optically connected to the first optical device 22.

With continuing reference to the ferrule body 88P of FIGS. 7A through 7D, the ferrule mating surface 96P may be disposed the longitudinal distance $D_1P$ away from the rearward ferrule surface 98P. The longitudinal distance $D_1P$ may be measured parallel to the optical axis $A_1$ and may be, for example, between approximately one (3) millimeter to thirty (30) millimeters long.

The ferrule body 88P may comprise a strong, hard material, for example, metal or plastic. In this way, the ferrule body 88P may be resistant to bending which could cause optical attenuation.

With continuing reference to FIGS. 7A through 7D, the ferrule assembly 38P may include the optical fibers 18P(1)-18P(4). The optical fibers 18P(1)-18P(4) may include the end portion 100P(1)-100P(4) disposed adjacent to the ferrule mating surface 96P. The end portion 100P(1), 100P(4) may be disposed planar or substantially planar with the ferrule mating surface 96P. This may reduce optical attenuation by having the ferrule mating surface 96P align the end portion 100P(1)-100P(4) along the optical axis $A_1$.

In this manner, the end portion 100P(1)-100P(4) of the optical fibers 18P(1)-18P(4) may be optically connected to the GRIN lenses 68P(1)-68P(4) of the GRIN lens chip 28. The optical fibers 18(1)-18(4) may be, for example, optical fibers manufactured by Corning, Incorporated of Corning, N.Y.

The optical fibers 18P(1)-18P(4) may, for example, comprise glass or quartz. In another example, the optical fibers 18P(1)-18P(4) may comprise a polymeric and/or monomeric material. As such, commonly-utilized wavelengths of light in fiber optic technology, for example, 850 nanometers or other telecommunication wavelengths in the near infrared range of 1300 nanometers to 1600 nanometers may be efficiently transmitted through the optical fibers 18P(1)-18P(4).

With continuing reference to FIGS. 7A through 7D, the ferrule assembly 38P may include the fiber grooves 94P(1)-94P(4) disposed between the rearward end 90P and the forward end 92P of the ferrule body 88P. The fiber grooves 94P(1)-94P(4) may also receive the optical fibers 18P(1)-18P(4). The fiber grooves 94P(1)-94P(4) may be, for example, formed in a V-groove shape by at least a portion of at least one contoured ferrule surface 192P of the ferrule body 88P. The contoured ferrule surface 192P may connect the ferrule mating surface 96P to the rearward ferrule surface 98P. The each of the optical fibers 18P(1)-18P(4) may abut against the ferrule body 88P at a first ferrule point 194P(1)-194P(4) and a second ferrule point 196(1)-196(4). The optical fibers 18P(1)-18P(4) may be secured to the ferrule body 88P at the first ferrule point 194P(1)-194P(4) and the second ferrule point 196P(1)-196P(4) with, for example, an adhesive agent or a cohesive agent such as epoxy. In this manner, the optical fibers 18(1)-18(4) may be static relative to the ferrule body 88 to reduce optical attenuation.

Figure 8A:
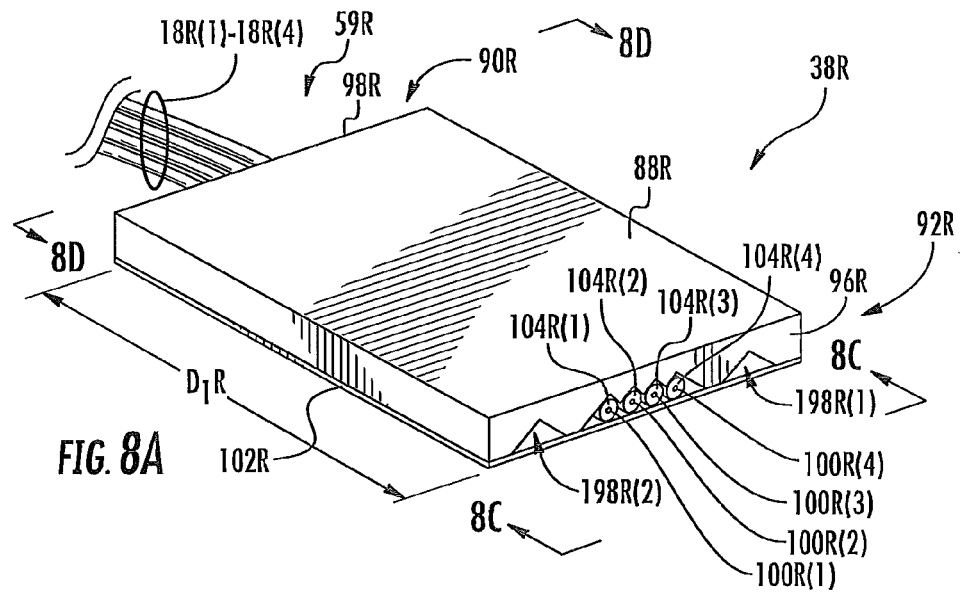
FIGS. 8A-8D are a perspective view, an exploded perspective view, a front view, and a rear view, respectively, of a ferrule assembly of the optical sub-system of the receptacle of FIG. 2A to illustrate at least one optical fiber received within at least one fiber groove of a ferrule body of the receptacle.
Figure 8B:
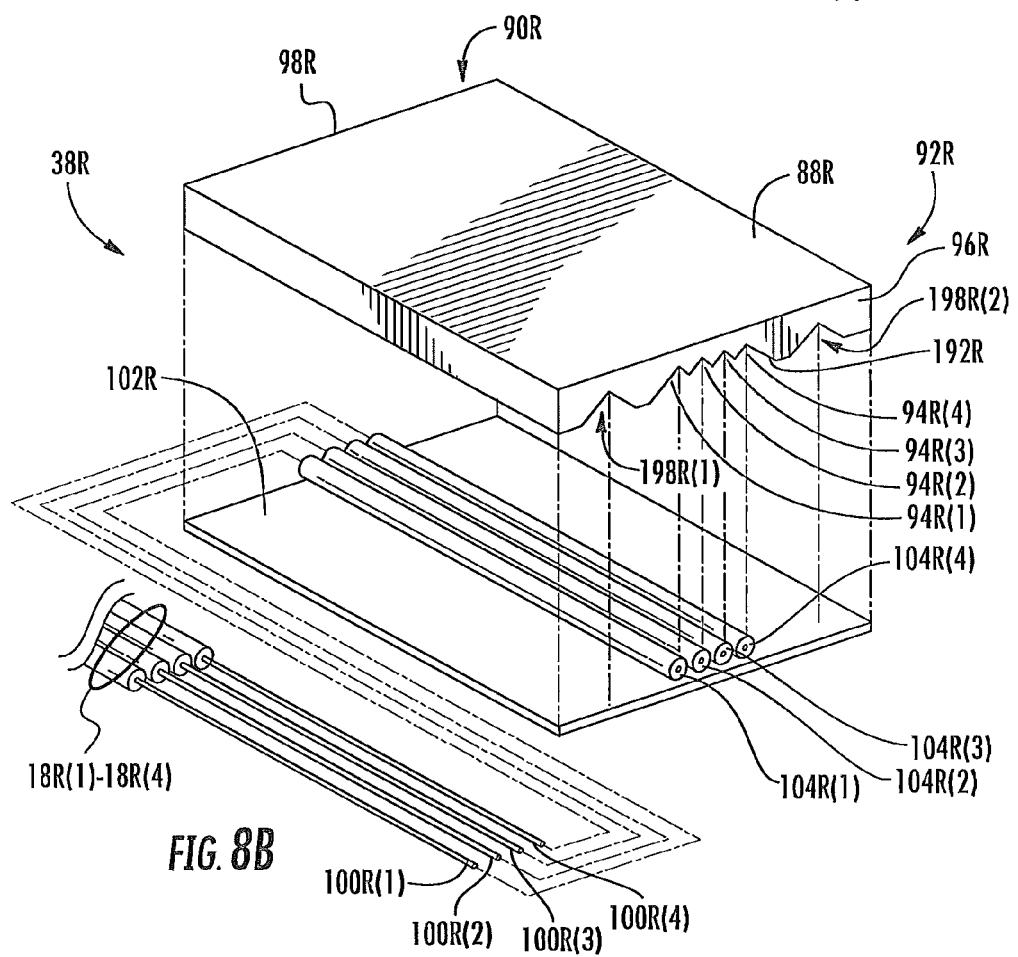
Figure 8C:
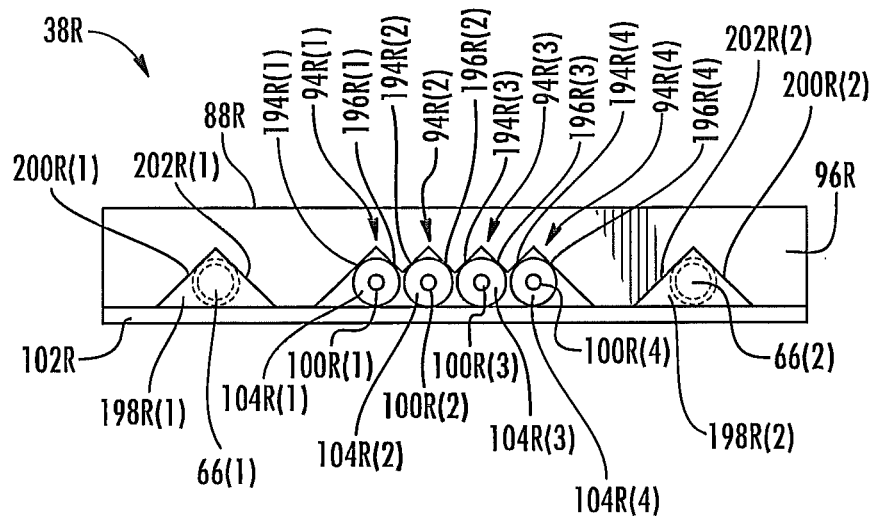
Figure 8D:
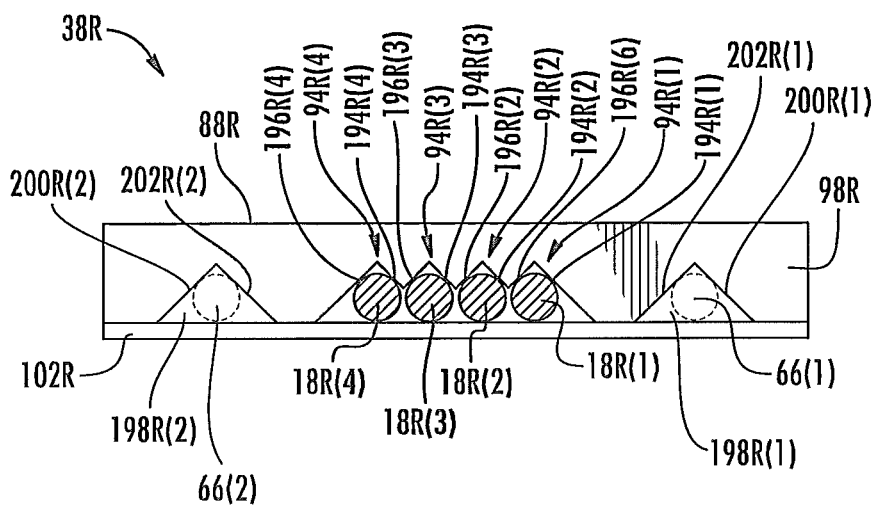

FIGS. 8A-8D depict the ferrule assembly 38R which is similar to the ferrule assembly 38P depicted in FIGS. 7A-7D. Unlike the ferrule assembly 38P of the plug 10-1, the ferrule assembly 38R may not include the alignment pins 66(1), 66(2), although it is understood that some examples of the ferrule assembly 38R may include an alignment pins 66(1), 66(2). The ferrule assembly 38R depicted in FIGS. 8A-8D include at least one alignment ferrule groove 198R(1), 198R(2), which is configured to receive the alignment pins 66(1), 66(2) extending from the plug 10-1. When received, the alignment pins 66(1), 66(2) make contact with at least one first ferrule alignment point 200R(1), 200R(2) and at least one second ferrule alignment point 202R(1), 202R(2), as shown in FIGS. 8C and 8D. In this manner, the ferrule assembly 38R of the receptacle 12-1 may be aligned to the plug 10-1. The alignment ferrule grooves 198R(1), 198R(2) in combination with alignment pins 66(1), 66(2)

may also be configured to facilitate the assembly of the GRIN lens chip 28R to the ferrule assembly 38R and may be configured to align the optical sub-system 26P to the optical sub-system 26R. Other features of the ferrule assembly 38R shown in FIGS. 8A-8D may be similar to those shown in FIGS. 7A-7D and are not discussed here to reduce redundancy.

FIGS. 9A through 9D depict that the ferrule body 88 of the ferrule assembly 38 may include at least one alignment ferrule groove 198(1), 198(2) configured to receive the alignment pins 66(1), 66(2). The reference numbers in FIGS. 9A through 9D do not designate "P" or "R" to signify that these features could apply to either the ferrule assembly 38P, 38R of the plug 10-1 or the receptacle 12-1, respectively. The alignment ferrule grooves 198(1), 198(2) may be disposed parallel to the optical axis $A_1$. The alignment ferrule grooves 198(1), 198(2) may be, for example, formed in a V-groove shape by the contoured ferrule surface 192 of the ferrule body 88. Each of the alignment pins 66(1), 66(2) may abut against the ferrule body 88 at a first ferrule alignment point 200(1), 200(2) and a second ferrule alignment point 202(1), 202(2), respectively, as shown in FIG. 8C. In this manner, the ferrule body 88 may be aligned relative to the alignment pins 66(1), 66(2) along the optical axis $A_1$ to reduce optical attenuation.

The ferrule assembly 38 may include the ferrule cover plate 102 secured to the ferrule body 88. The ferrule cover plate 102 may be secured to the ferrule body 88 with, for example, an adhesive agent or cohesive agent, such as epoxy. The optical fibers 18(1)-18(4) may be at least partially disposed between the ferrule cover plate 102 and the ferrule body 88. Moreover, the ferrule cover plate 102 may be configured to secure the alignment pins 66(1), 66(2) within the alignment ferrule grooves 198(1), 198(2).

Figure 10:
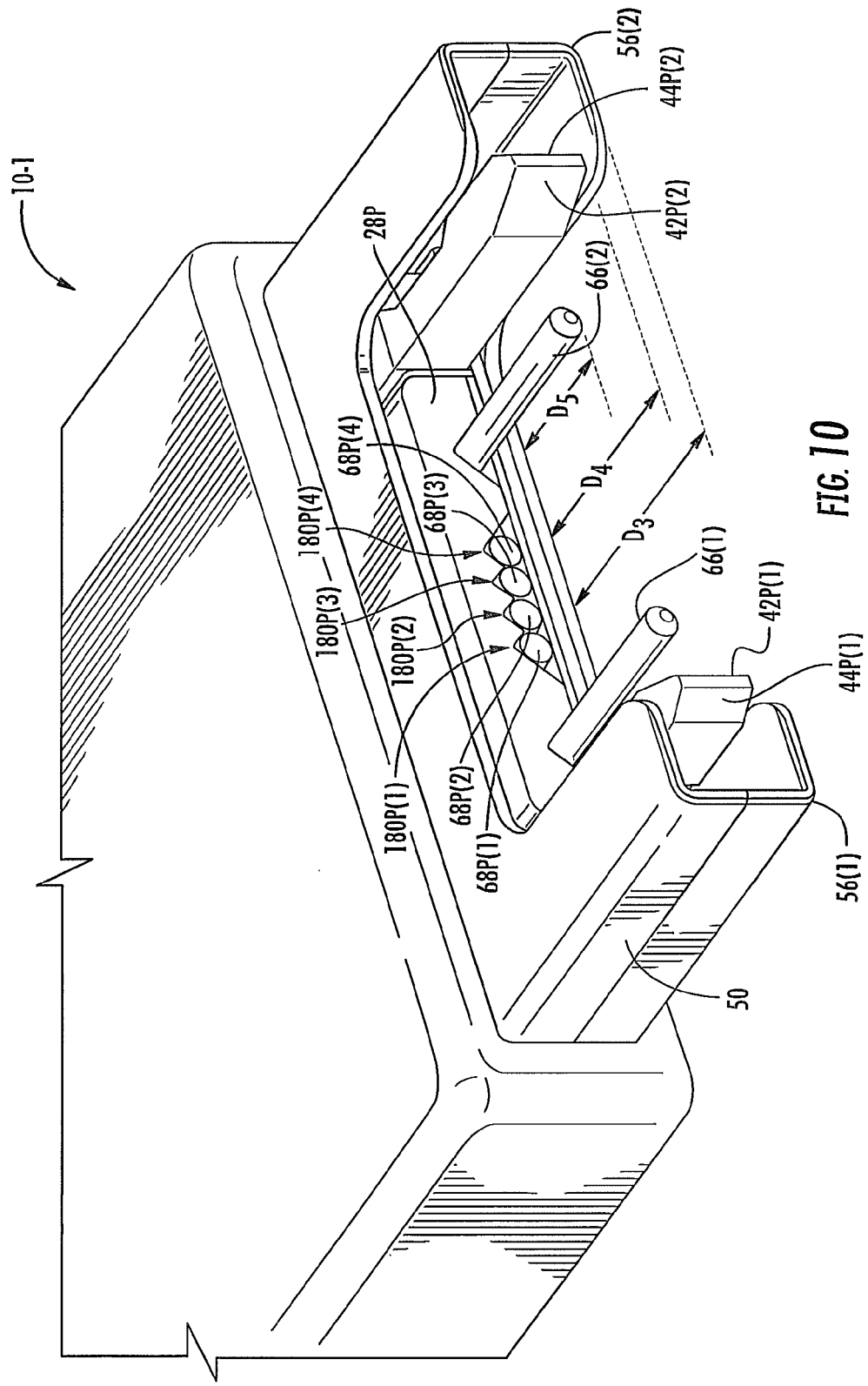
FIG. 10 is a front perspective view of the plug of FIG. 2A to illustrate a mechanical alignment system of the plug.
Figure 11:
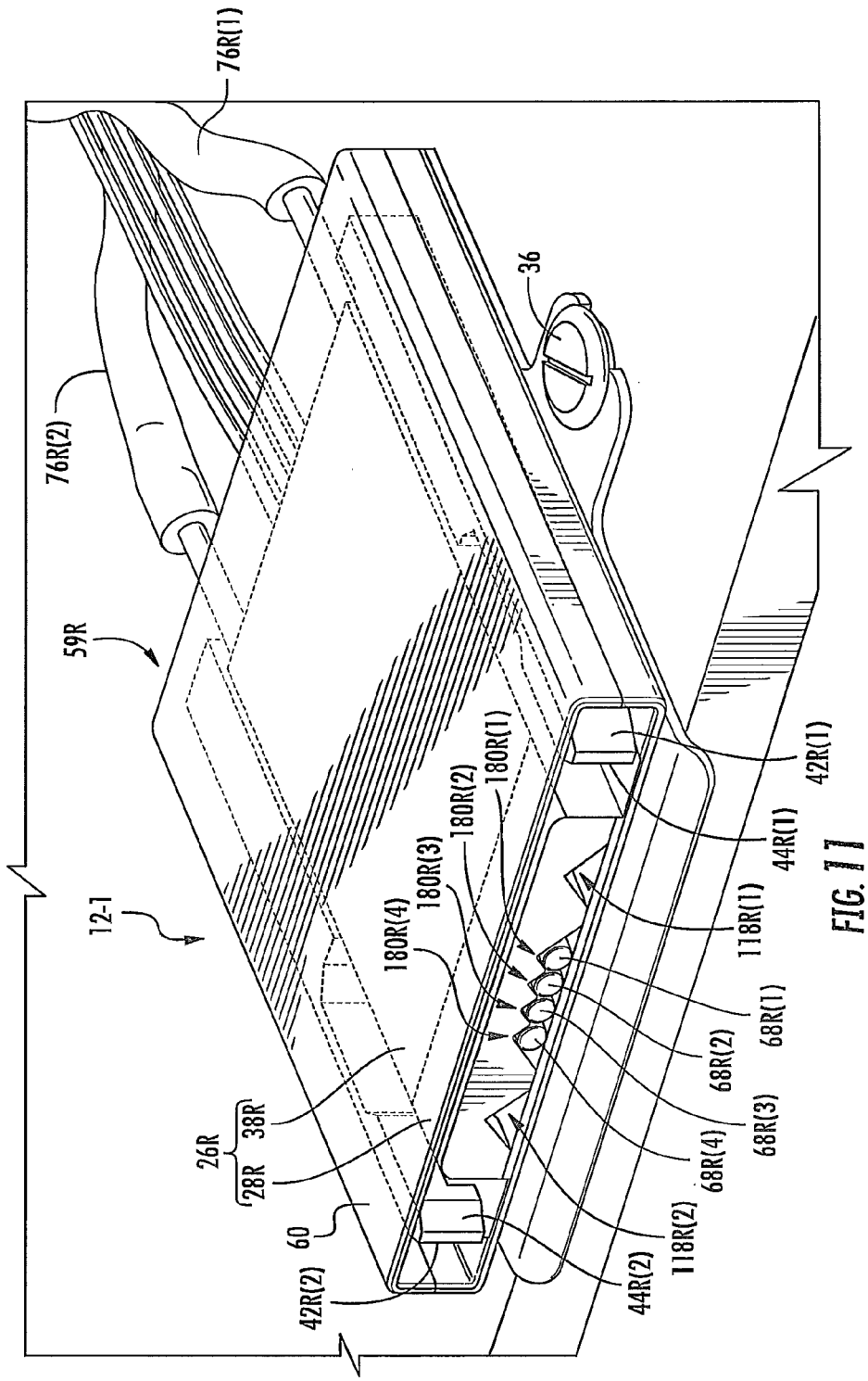
FIG. 11 is a perspective view of the receptacle of FIG. 2A to illustrate an orientation of the optical sub-system of the receptacle to a receptacle housing.

Now that the component details of the optical sub-systems 26P, 26R have been discussed, FIGS. 10 and 11 depict a mechanical alignment system of the plug 10-1 and the receptacle 12-1 configured to facilitate alignment with minimal force. The mechanical alignment system is hierarchical and includes the protrusions 56(1), 56(2) of the plug outer housing 50, the plug interlocking electrodes 42P(1), 42P(2) of the plug 10-1, and the alignment pins 66(1), 66(2), which engage sequentially when the plug 10-1 is connected with the receptacle 12-1. The protrusions 56(1), 56(2) engage with the receptacle housing 60 of the receptacle 12-1 to provide one (1) to two (2) millimeter alignment with the receptacle 12-1. The protrusions 56(1), 56(2) extend a distance $D_3$ from the GRIN lens chip 28P of the plug 10-1. The distance $D_3$ may be, for example, between two (2) and five (5) millimeters.

The plug interlocking electrodes 42P(1), 42P(2) of the plug 10-1 include at least one chamfer 44P(1), 44P(2) extending a distance $D_4$ from the GRIN lens chip 28P of the plug 10-1 to communicate with at least one chamfer 44R(1), 44R(2) of the receptacle interlocking electrodes 42R(1), 42R(2) of the receptacle 12-1 to enable coarse alignment of the plug 10-1 with the receptacle 12-1. The distance $D_4$ may be, for example, between 1.5 and 4.5 millimeters. The distance $D_4$ is less than the distance $D_3$ to encourage engagement of the plug interlocking electrodes 42P(1), 42P(2) after the alignment contribution of the protrusions 56(1), 56(2).

The alignment pins 66(1), 66(2) extend a distance $D_5$ from the GRIN lens chip 28P of the plug 10-1. The alignment pins 66(1), 66(2) communicates with the alignment grooves 118R(1)-118R(2) of the receptacle 12-1 to enable one (1) to fifteen (15) micron alignment of the GRIN lens chip 28P of the plug 10-1 with the GRIN lens chip 28R receptacle 12-1. The distance $D_5$ is less than the distance $D_4$ to encourage engagement of the alignment pins 66(1), 66(2) after the alignment contribution of the plug interlocking electrodes 42P(1), 42P(2). The distance $D_5$ may be, for example, between one (1) and four (4) millimeters. In this manner, the relationships between these distances $D_3$, $D_4$, $D_5$ reduce random stresses experienced by the alignment pins 66(1), 66(2) during the engagement of the plug 10-1 with the receptacle 12-1.

Figure 12A:
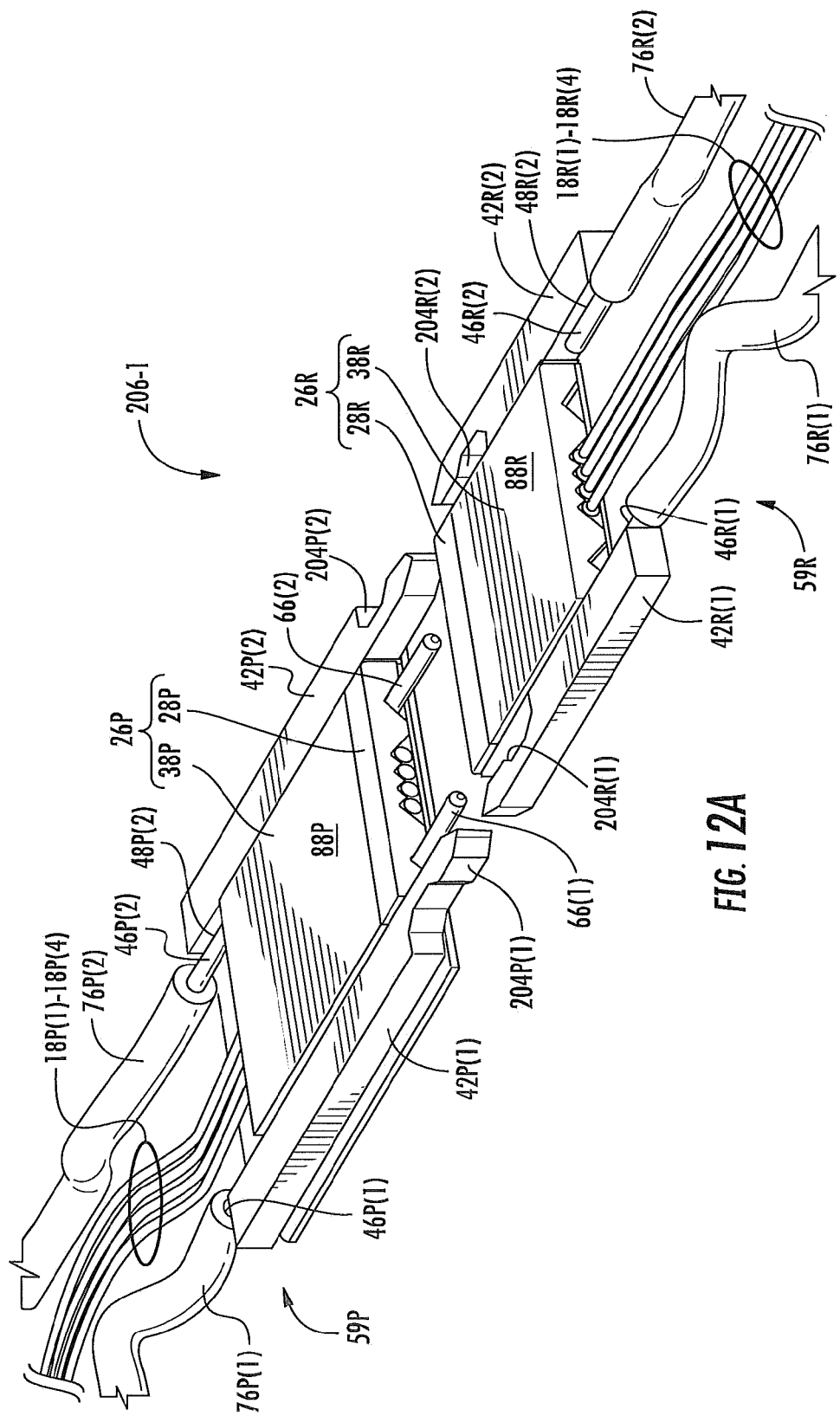
FIGS. 12A and 12B are a perspective view and a top view, respectively, of the optical sub-system of the plug and the optical sub-system of the receptacle with at least one interlocking electrode of the plug and at least one interlocking electrode of the receptacle, illustrating an electrical coupling of the receptacle and the plug relative to the optical sub-system of the plug and the optical sub-system of the receptacle.
Figure 12B:
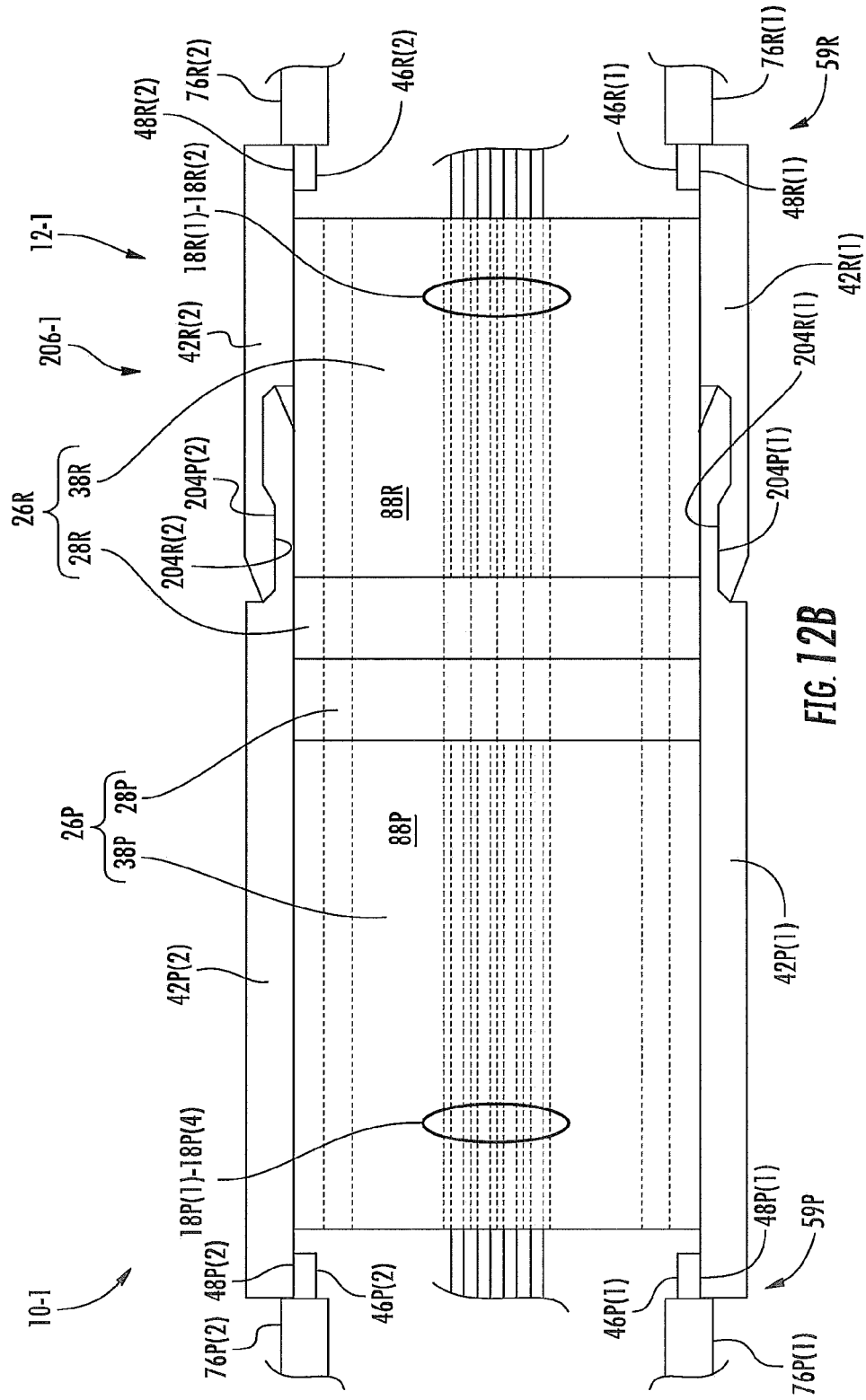

Now that the mechanical alignment system has been described in detail, an example of an electrical coupling system 206-1 may now be discussed. FIGS. 12A and 12B are a perspective view and a top view, respectively, of the optical sub-system 26P of the plug 10-1 and the optical sub-system 26R of the receptacle 12-1 with the plug interlocking electrodes 42P(1), 42P(2) of the plug 10-1 and the receptacle interlocking electrodes 42R(1), 42R(2) of the receptacle 12-1. The plug interlocking electrodes 42P(1), 42P(2) may be electrically coupled to the plug-side conductors 46P(1), 46P(2), respectively, using conventional means, for example as shown in FIG. 12B, solder 48P(1), 48P(2). The receptacle interlocking electrodes 42R(1), 42R(2) may be electrically coupled to the receptacle-side conductors 46R(1), 46R(2), respectively, using conventional means, for example as shown in FIG. 12B, solder 48R(1), 48R(2). In this manner, the receptacle-side conductors 46R(1), 46R(2) may be electrically coupled to the plug-side conductors 46P(1), 46P(2) by engaging the plug interlocking electrodes 42P(1), 42P(2) with the receptacle interlocking electrodes 42R(1), 42R(2).

In order to form this engagement, the plug interlocking electrodes 42P(1), 42P(2) may include at least one complementary surface 204P(1), 204P(2) which may reversibly engage with at least one complementary surface 204R(1), 204R(2) of the receptacle interlocking electrodes 42R(1), 42R(2) to provide electrical coupling between the plug 10-1 and the receptacle 12-1. The plug interlocking electrodes 42P(1), 42P(2) may be secured to an outside of the ferrule body 88P and the receptacle interlocking electrodes 42R(1), 42R(2) may be secured to an outside of the ferrule body 88R. In this manner the ferrule body 88P and the ferrule body 88R may be created less expensively by reducing complexity.

Figure 13:
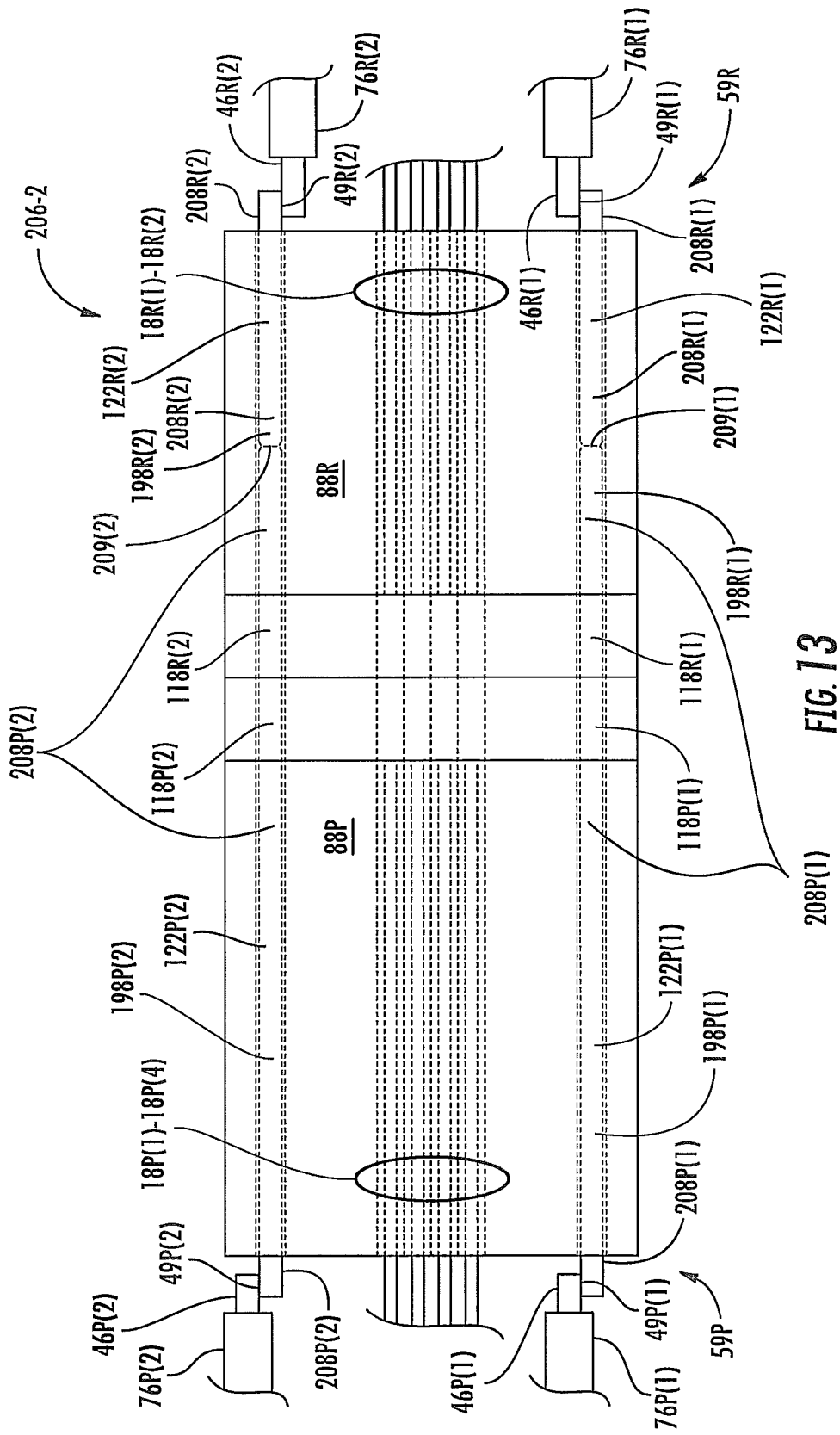
FIG. 13 is a top view of another example of an optical connection with at least one internal alignment electrode received within at least one alignment groove of a GRIN lens chip of a plug and at least one alignment groove of a GRIN lens chip of a receptacle to illustrate another example of an electrical coupling system without the alignment pins of FIG. 2A and without the interlocking electrodes of FIG. 12A.

Alternative electrical connection schemes may also be used with the plug 10-1 and the receptacle 12-1. FIG. 13 depicts another example of an electrical coupling system 206-2 including at least one internal alignment electrode 208P(1), 208P(2) and at least one internal alignment electrode 208R(1), 208R(2). The internal alignment electrodes 208P(1), 208P(2), 208R(1), 208R(2) may perform the electrical connectivity and alignment functions between the plug 10-1 and the receptacle 12-1. In this manner, the internal alignment electrodes 208P(1), 208P(2), 208R(1), 208R(2) may replace the alignment pins 66(1), 66(2), plug interlocking electrodes 42P(1), 42P(2) and the receptacle interlocking electrodes 42R(1), 42R(2).

The internal alignment electrodes 208P(1), 208P(2) may be electrically coupled to the plug-side conductors 46P(1), 46P(2), respectively, via conventional means, for example, solder 49P(1), 49P(2). The internal alignment electrodes 208R(1), 208R(2) may be electrically coupled to the receptacle-side conductors 46R(1), 46R(2), respectively, via conventional means, for example, solder 49R(1), 49R(2). In this manner, the receptacle-side conductors 46R(1), 46R(2) may be electrically coupled to the plug-side conductors 46P(1), 46P(2) by engaging the internal alignment electrodes 208P(1), 208P(2) with the internal alignment electrodes 208R(1), 208R(2) at abutment locations 209(1), 209(2).

Electrical coupling and alignment of the optical sub-systems 26P, 26R may be accomplished by routing the internal alignment electrodes 208P(1), 208P(2) through the alignment ferrule grooves 198P(1), 198P(2) of the ferrule body 88P, the alignment grooves 118P(1), 118P(2) of the GRIN lens chip 28P, and the alignment grooves 118R(1), 118R(2) of the GRIN lens chip 28R. As a result, the internal alignment electrodes 208P(1), 208P(2) may align the optical sub-systems 26P, 26R as long as the internal alignment electrodes 208P(1), 208P(2) abut against and remain parallel or substantially parallel with the contoured ferrule surface 192P of the ferrule assembly 38P, the contoured engagement surface 182P of the GRIN lens chip 28P, the contoured ferrule surface 192R of the ferrule assembly 38R, and the contoured engagement surface 182R of the GRIN lens chip 28R.

Electrical coupling may then be achieved by the internal alignment electrodes 208R(1), 208R(2) which may be routed through at least part of the alignment ferrule grooves 198R(1), 198R(2) of the ferrule body 88R. In this manner, the internal alignment electrodes 208R(1), 208R(2) may be electrically coupled to the internal alignment electrodes 208P(1), 208P(2), for example, at the abutment locations 209(1), 209(2), respectively, to complete the electrical coupling.

Now that details of the plug 10-1 and receptacle 12-1 have been discussed, several housing embodiments are disclosed next. The housing embodiment shown in FIGS. 10 and 11, may be referred to as a "fixed pin" housing concept and has the alignment pins 66(1), 66(2) secured in place to the ferrule body 88P using, for example, a thermal bond, an adhesive or cohesive. In this embodiment, the alignment pins 66(1), 66(2) and the plug interlocking electrodes 42P(1), 42P(2) may be protected from external forces by the protrusions 56(1), 56(2) which prevent any damage to the alignment pins 66(1), 66(2). Also, since the alignment pins 66(1), 66(2) and plug interlocking electrodes 42P(1), 42P(2) may be fixed, a portion of the optical fibers 18P(1)-18P(4) within the ferrule body 88P (FIG. 2A) and a portion of the plug-side conductors 46P(1), 46P(2) attached to the plug interlocking electrodes 42P(1), 42P(2) may also be fixed in place with and thereby remain static with respect to the plug 10-1 as the plug is connected to the receptacle 12-1. In this manner, kinking of the optical fibers 18P(1)-18P(4) and the plug-side conductors 46P(1), 46P(2) may be prevented and optical attenuation reduced to provide a robust and reliable connection. Further, the fixed-pin housing concept may be easily assembled given a convenient location of the alignment pins 66(1), 66(2). It is also noted that the length of the plug 10-1 is minimized as no additional alignment features between the GRIN lenses 68P(1)-68P(4) and the optical fibers 18P(1)-18P(4) are required. As indicated earlier, the stress-relief boot 72 also provides the extra protection to the core optics from external forces which can cause optical attenuation or damage.

An alternative housing embodiment will now be introduced that is different from the "fixed pin" housing embodiment discussed above. Consistent with this different housing embodiment, a plug 10-2 is introduced including the optical sub-system 26P both movable and spring-loaded along the optical axis $A_1$. FIG. 14 depicts the plug 10-2 and a receptacle 12-2 in an exploded view. Similar to the earlier embodiment, there are the optical sub-systems 26R, 26P. However, in the plug 10-2 the optical sub-system 26P including the GRIN lens chip 28P and the ferrule assembly 38P may be movable along the at least one alignment pin 66(1), 66(2) which may be parallel to the optical axis $A_1$ and the optical sub-system 26P may be spring-loaded with respect to at least one spring 210(1), 210(2). With the springs 210(1), 210(2) in an extended position, the GRIN lens chip 28P may be close to an outside edge of the plug 10-2 providing easy access for cleaning by a user without special tools. When the plug 10-2 may be inserted into receptacle 12-2 to establish an optical connection, the GRIN lens chip 28P may be pushed back into the plug 10-2 and the alignment pins 66'(1), 66'(2) may be exposed and engaged within at least one alignment grooves 118'(1), 118(2) in the receptacle 12-2 to provide precise optical alignment. In this manner, optical attenuation may be reduced as the GRIN lens chips 28P, 28R may be pushed tightly together by the springs 210(1), 210(2). This embodiment provides the advantage of having surface access to the GRIN lens chip 28P of the plug 10-2 for easy cleaning of the first end faces 164P(1)-164P(4) of the GRIN lenses 68P(1)-68P(4) and the second end faces 168P(1)-168P(4) of the GRIN lenses 68P(1)-68P(4).

Figure 16:
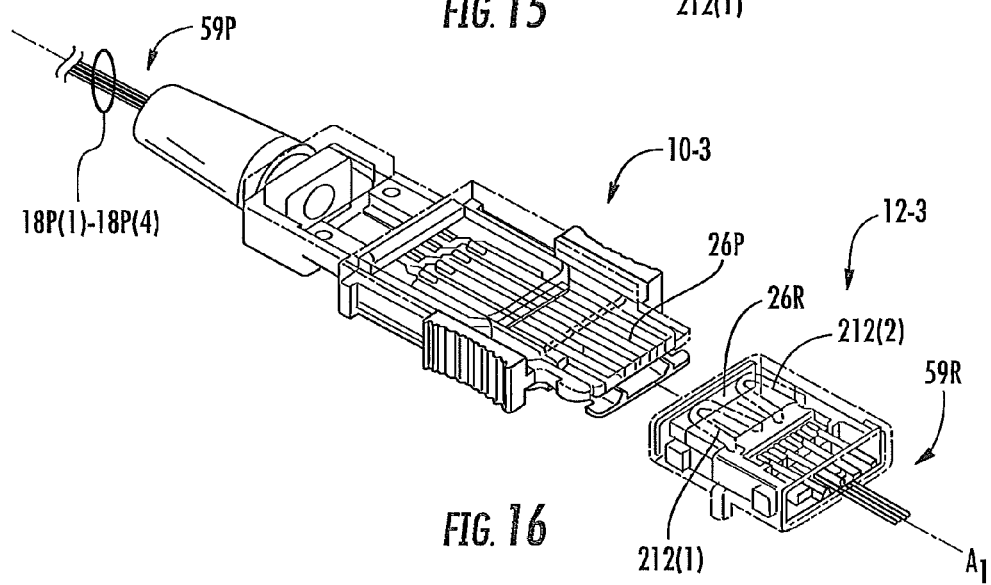
FIG. 16 is a perspective partial cutaway of the plug and receptacle of FIG. 15 in a detached condition to illustrate the lateral spring for alignment.
Figure 17:
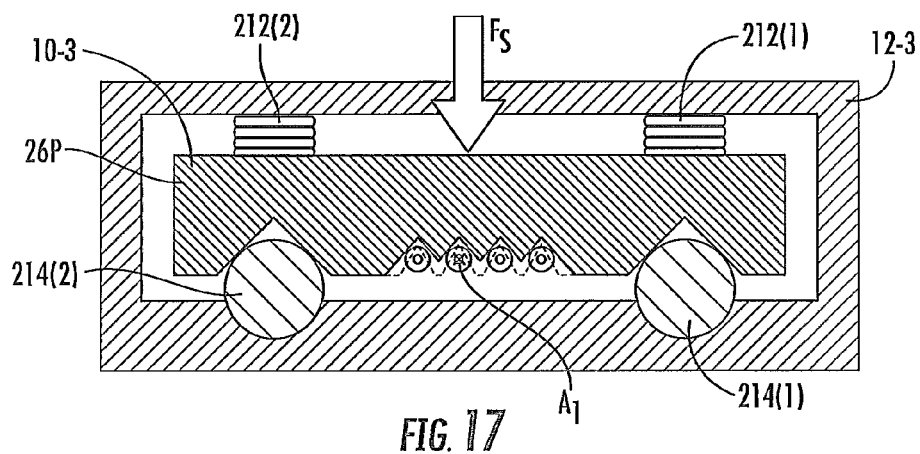
FIG. 17 is a cutaway view of the plug and the receptacle optically connected in FIG. 15 depicting the lateral spring of FIG. 16 aligning the optical sub-system of the plug within the receptacle, illustrating a location of the lateral spring relative to the optical sub-system of the plug.

Another alternative housing embodiment will now be discussed that is different from the housing embodiments discussed above wherein the optical sub-system 26P of a plug 10-3 may be pushed laterally against at least one alignment pin 214(1), 214(2) disposed within a receptacle 12-3. Specifically, FIGS. 15-17 depict a top view, a cutaway view, and a cutaway view, respectively, of the plug 10-3 and the receptacle 12-3 including the optical sub-systems 26P, 26R, respectively. At least one built-in lateral spring 212(1), 212(2) of the receptacle 12-3 may apply a spring force $F_S$ to the optical sub-system 26P of the plug 10-3 to push the optical sub-system 26P onto the alignment pins 214(1), 214(2) of the optical sub-system 26R disposed in the receptacle 12-3. The spring force $F_S$ may be orthogonal or substantially orthogonal to the optical axis $A_1$. In this embodiment, the spring force $F_S$ may be utilized to align the optical sub-systems 26P, 26R and may be generated by the built-in lateral springs 212(1), 212(2). The use of built-in lateral springs 212(1), 212(2) may reduce the cost of the assembly and may reduce the complexity. In this manner, the GRIN lenses 68P(1)-68P(4) may be efficiently aligned in the receptacle 12-3.

Figure 5A:
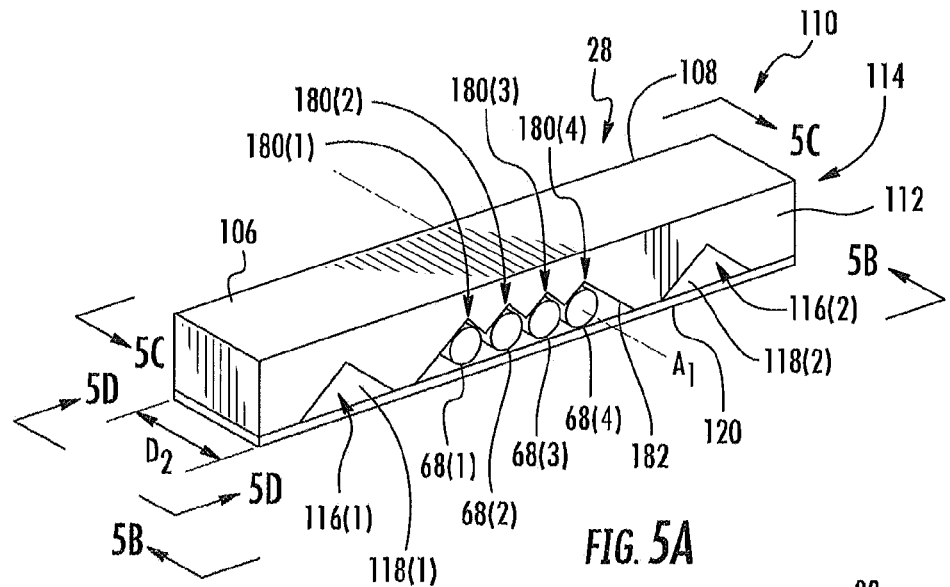
FIGS. 5A-5E are a perspective view, front view, rear view, side view, and exploded view, respectively, of the GRIN lens chip of the plug of FIG. 2A fully isolated from the plug to illustrate details of the GRIN lens chip, including a GRIN lens holder body having at least one alignment groove configured to receive at least one alignment pin and at least one GRIN groove receiving at least one GRIN lens; the GRIN lens chip of the receptacle of FIG. 2A may be identical thereto and thus the "R" or "P" are removed from the reference characters to indicate the GRIN lens chip is not specific to the plug or the receptacle.
Figure 5B:
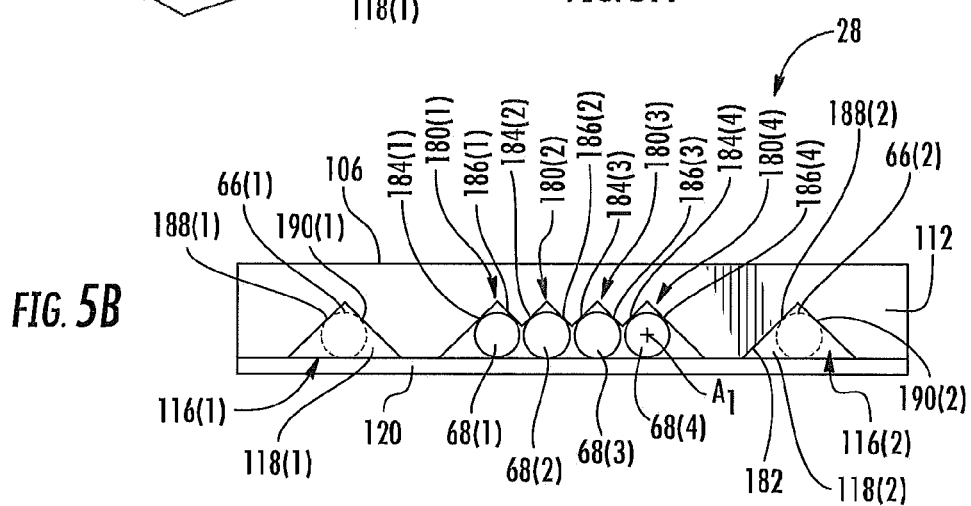
Figure 5C:
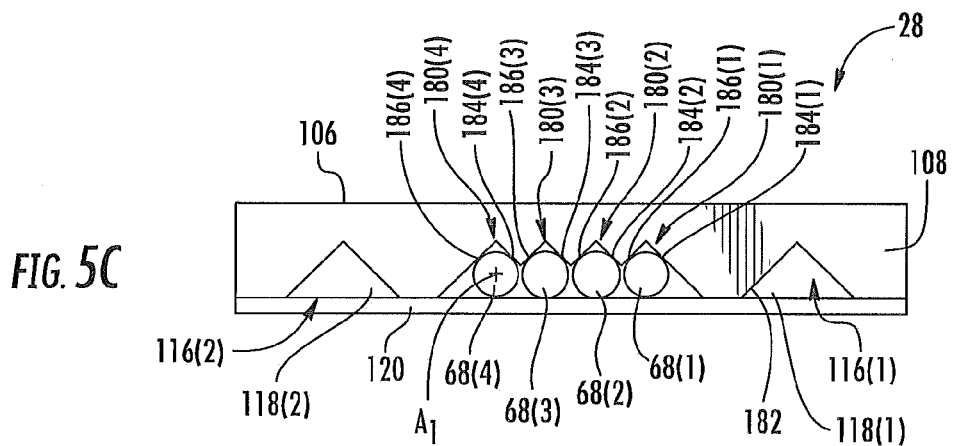
Figure 5D:
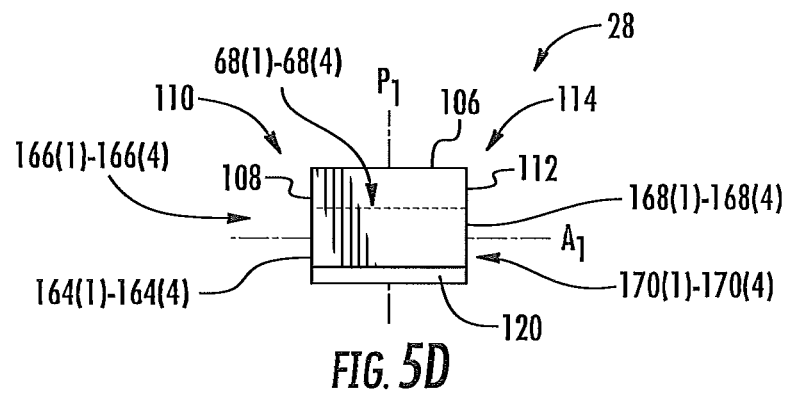
Figure 5E:
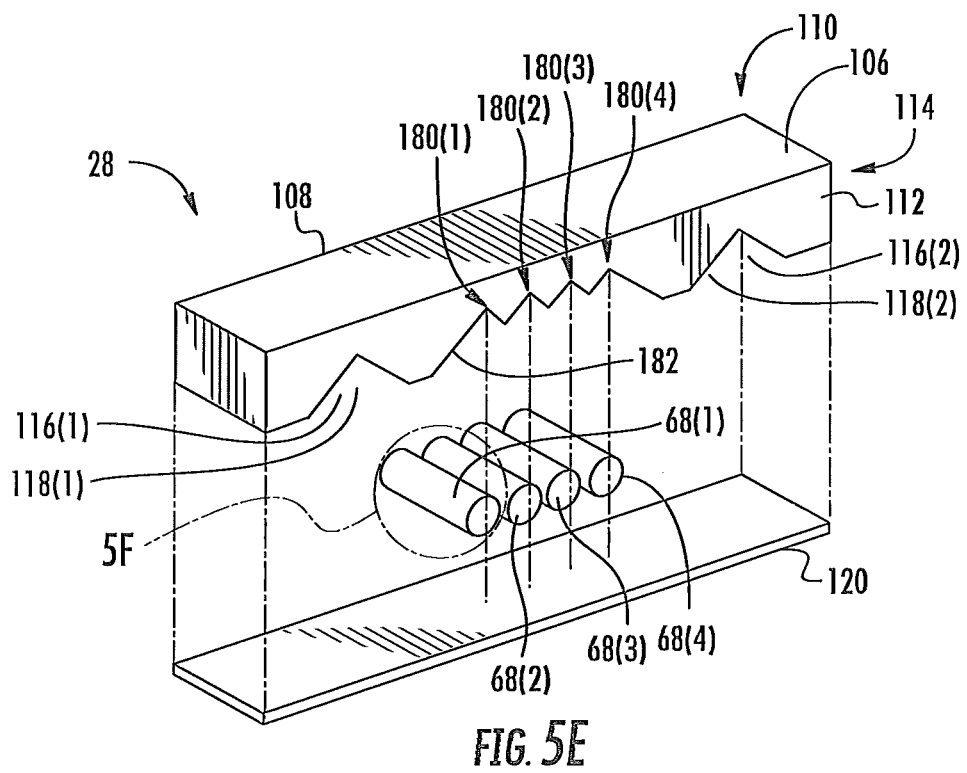
Figure 18:
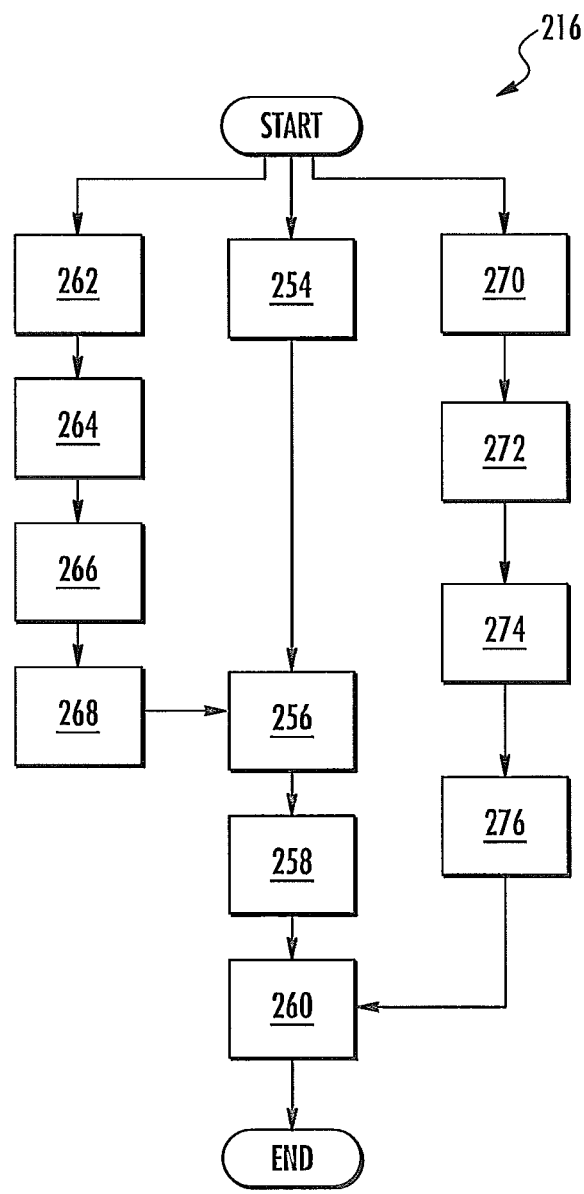
FIG. 18 is a flowchart diagram of an exemplary process of creating the GRIN lens chip of FIG. 5A.
Figure 19A:
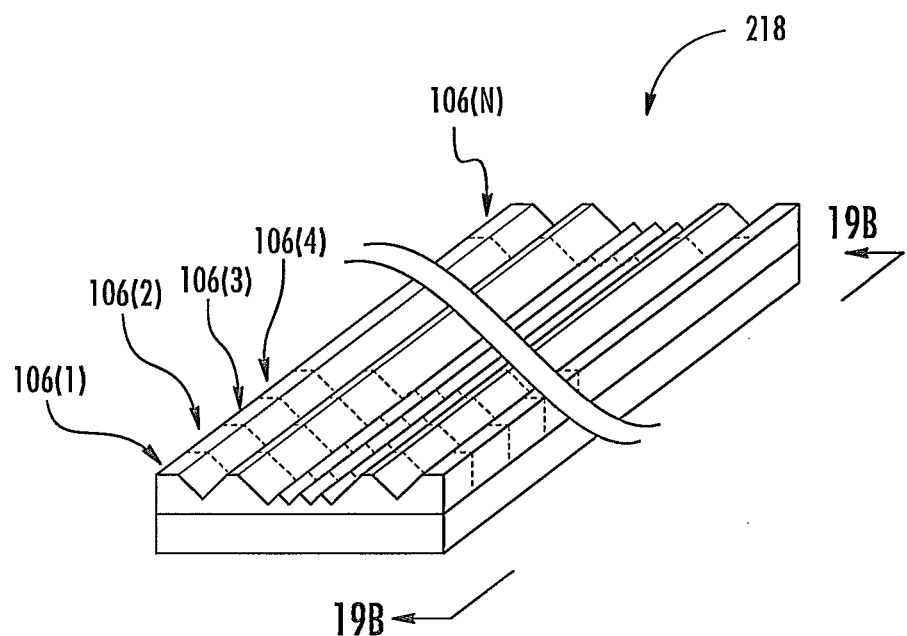
FIGS. 19A and 19B are a perspective view and a side view, respectively, of a shaped substrate to illustrate at least one GRIN lens holder body as part of the shaped substrate.
Figure 19B:
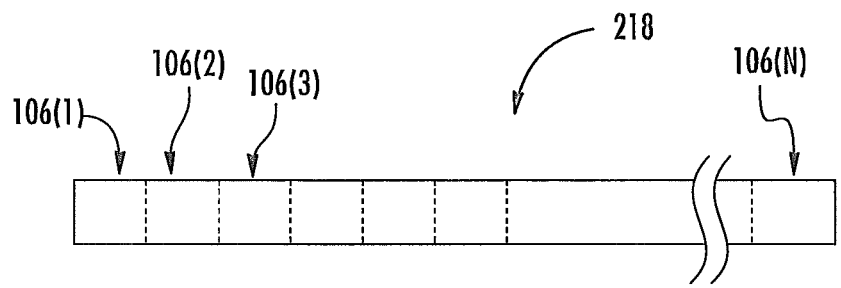

FIG. 18 is a flowchart diagram of an exemplary process 216 of creating the GRIN lens chip 28 (FIG. 5A). There may be several advantages associated with the process 216. For example, in some embodiments of the process 216, simple, reusable molds may be made with high precision for fabricating shaped substrates 218 of large size. From each of the shaped substrates 218 a large quantity, for example, more than two-hundred (200), GRIN lens holder bodies 106(1)-106(N) may be obtained using batch manufacturing techniques. Further, the process 216 may be compatible with batch processing of multiple ones of the GRIN lens holder bodies 106(1)-106(N) by low-cost, and scalable manufacturing tasks as may be discussed below. Also, the process 216 may be used with various material options for the shaped substrates 218. The process 216 will be described using the terminology and information provided above and in conjunction with FIGS. 19A through 40. As shown in FIGS. 19A and 19B, the process 216 may include providing a shaped substrate 218 including the GRIN lens holder bodies 106(1)-106(N) (block 254 in FIG. 18). As indicated above, the ferrule bodies 88P, 88R and the GRIN lens holder bodies 106P, 106R including fiber grooves 94P(1)-94P(4), 94R(1)-94R(4) and GRIN grooves 180P(1)-180P(4), 180R(1)-180R(4), respectively, and the grooves having a "V-shape" form the basis of optical alignment within the optical sub-systems 26P, 26R. This "V-shaped" groove design is preferable over other "closed hole ferrule" embodiments utilizing closed holes through an integral block of material serving as a ferrule for inserting the GRIN lenses 68(1)-68(4) and the optical fibers 18(1)-18(4) therethrough. The ferrule bodies 88P, 88R and the GRIN lens holder bodies 106P, 106R may merely require simple molds (as discussed below) which may be made very precisely compared to the relatively complex molds consistent with placing holes through a molded body. Further, the ferrule bodies 88P, 88R and the GRIN lens holder bodies 106P, 106R may be made in large sizes that can generate several hundreds of GRIN lens holder bodies 106(1)-106(N) and/or ferrule bodies 88(1)-88(N) from a single one of shaped substrate 218. With closed-hole ferrules, only one closed-hole ferrule can be made at a time as multiple components of the mold need to be assembled with sub-micron accuracy for each molding. Also, the mold "pins" associated with the fabrication of "closed hole" ferrules are very sensitive to the molding processes because of their long aspect ratio and can be distorted and worn out more easily. Also, because of the sloping side walls of the v-grooves, any dust particle etc., can slide down the walls and not cause misalignments. Also when the GRIN fibers and data fibers are inserted into the v-grooves, there is space for the excess epoxy to get expelled in to this space and allow very good contact between the fibers and the v-groove side walls for very good alignment. Also, because of the open v-groove structure, the fiber can be inserted into the v-grooves much more easily either singly or in arrays using simple jigs or automated "pick and place" machines.

Figure 20A:
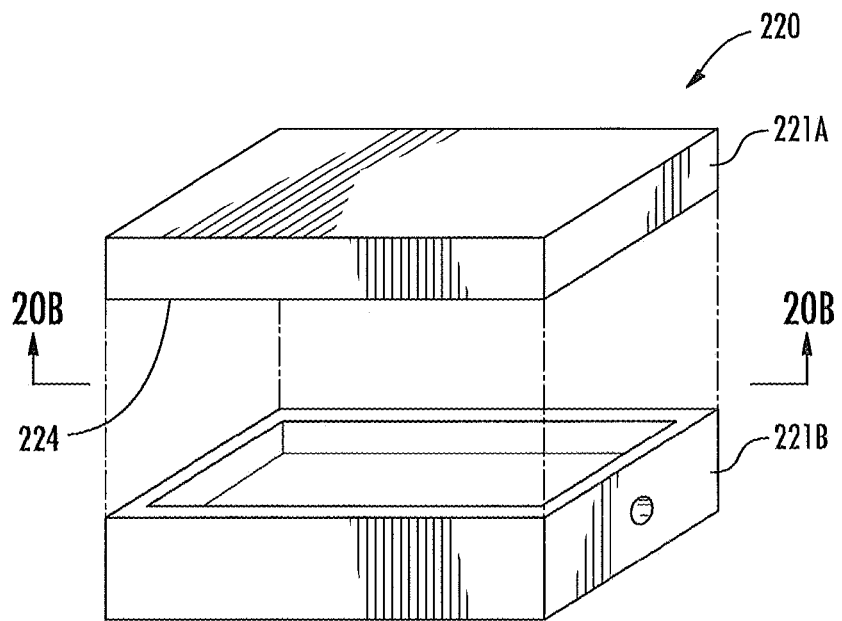
FIG. 20A is a perspective view of an exemplary manufacturing mold configured to create the shaped substrate of FIG. 19A illustrating the manufacturing mold with a mold lid removed.
Figure 20B:
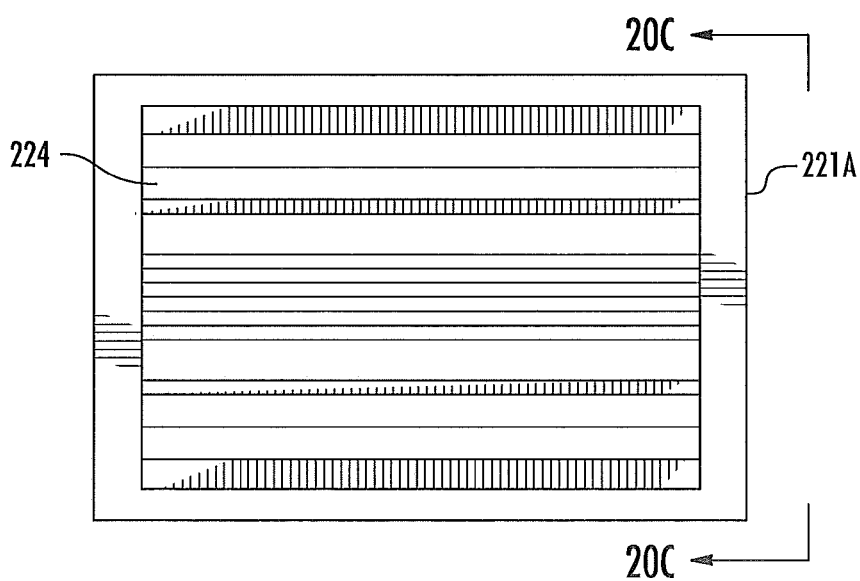
FIGS. 20B and 20C are a bottom view and a side view, respectively, of the mold lid of FIG. 20A illustrating a V-groove surface configured to form at least one GRIN groove on the shaped substrate of FIG. 19A.
Figure 20C:
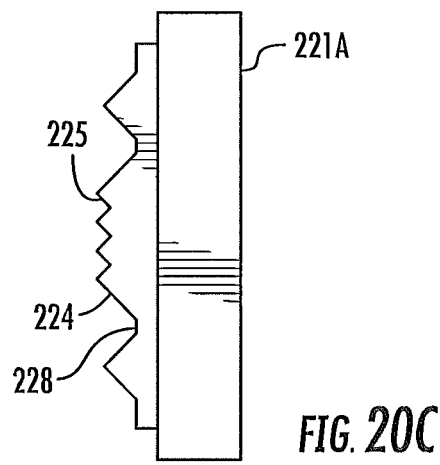
Figure 21:
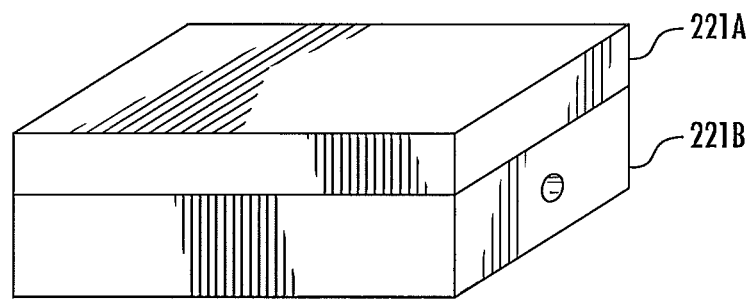
FIG. 21 is a perspective view of the manufacturing mold of FIG. 20A with the mold lid attached to illustrate the manufacturing mold ready to receive moldable material.

The providing the shaped substrate 218 may include providing a mold 220 as shown in FIG. 20A through FIG. 21. The mold 220 may include at least one of a first mold component 221A (or "lid") and a second mold component 221B. At least one of the first mold component 221A and a second mold component 221B may include a contoured surface 224 that may form the GRIN grooves 180(1)-180(4). The contoured surface 224 may also form the alignment grooves 118(1), 118(2).

Figure 22:
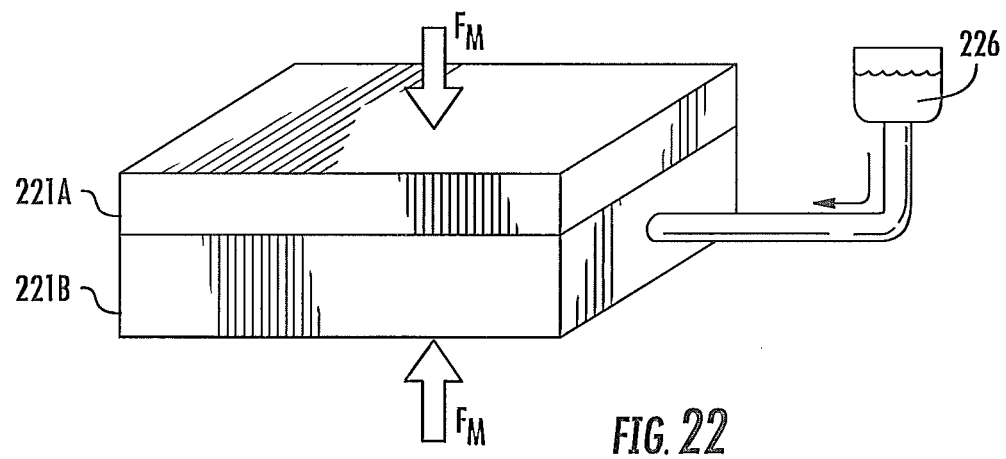
FIG. 22 is a perspective view of the manufacturing mold of FIG. 21 as the moldable material is being received.
Figure 23:
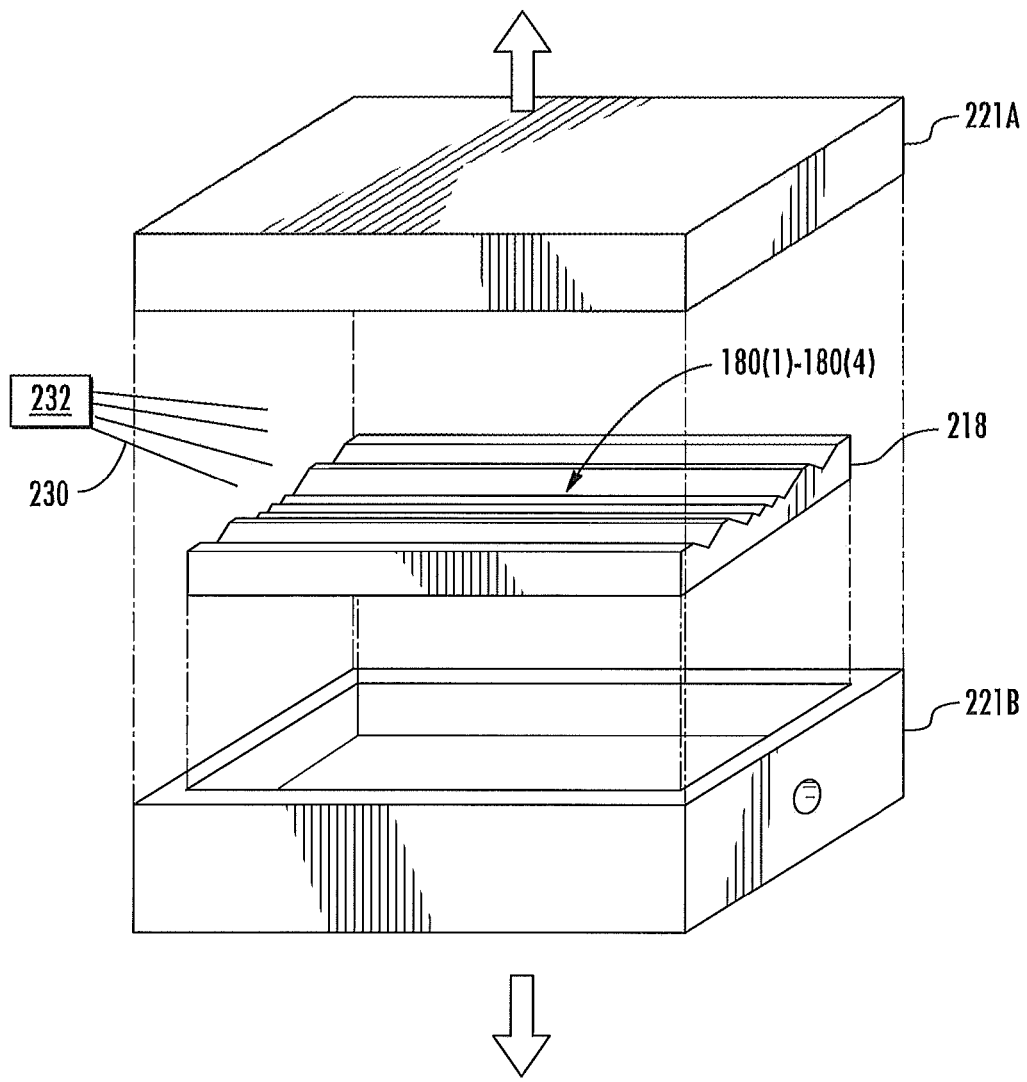
FIG. 23 is a perspective view of the shaped substrate of FIG. 19A being removed from the manufacturing mold and being irradiated by a radiation source.

As depicted in FIG. 22, the shaped substrate 218 may further comprise molding a moldable material 226 to form the shaped substrate 218 comprising the GRIN lens holder bodies 106(1)-106(N) which includes the GRIN grooves 180(1)-180(4) configured to receive the GRIN lenses 68(1)-68(4). The moldable material 226 may comprise an organic polymer. The GRIN grooves 180(1)-180(4) may each be of a V-groove shape 225 (FIG. 20C). The molding activity may further comprise forming the alignment grooves 118(1), 118(2) parallel to the GRIN grooves 180(1)-180(4). The forming the GRIN grooves 180(1)-180(4) may include applying a pressure provided by a molding force $F_M$ (FIG. 22). The molding process may include process parameters which may be optimized based on the moldable material 226, for example, a polymer, which may be used to form the shaped substrate 218. With such optimization of the process parameters, well controlled flat shaped substrates can be fabricated at low cost and in large volumes. The forming the alignment grooves 118(1), 118(2) may include forming the alignment grooves 118(1), 118(2) each with a truncated V-groove shape 228. FIG. 23 depicts that the forming the GRIN grooves 180(1)-180(4) may comprise curing the coating material with ultraviolet radiation 230 from a radiation source 232 (FIG. 20C).

Figure 24A:
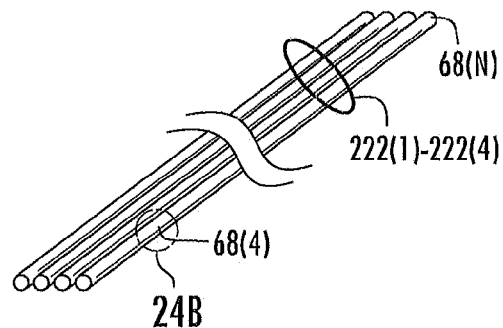
FIGS. 24A and 24B are a perspective view and a close-up perspective view, respectively, of at least one GRIN lens rod having at least one GRIN lens.
Figure 24B:
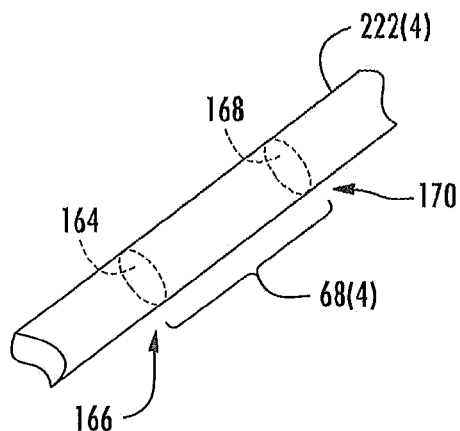

As shown in FIG. 24A, the process 216 may also include providing at least one GRIN lens rod 222(1)-222(4) (block 256 in FIG. 18). Each of the GRIN lens rods 222(1)-222(4) may include the GRIN lenses 68(1)-68(N). FIGS. 24A and 24B are a perspective view and a close-up view, respectively, of the GRIN lens rods 222(1)-222(4) having the GRIN lenses 68(1)-68(N). Each of the GRIN lenses 68(1)-68(N) having the first end face 164 disposed at the first end 166 of the GRIN lenses 68(1)-68(N) and the second end face 168 disposed at the second end 170 of the GRIN lenses 68(1)-68(N). In this way, the GRIN lenses 68(1)-68(N) may collimate light to reduce optical attenuation.

Figure 25:
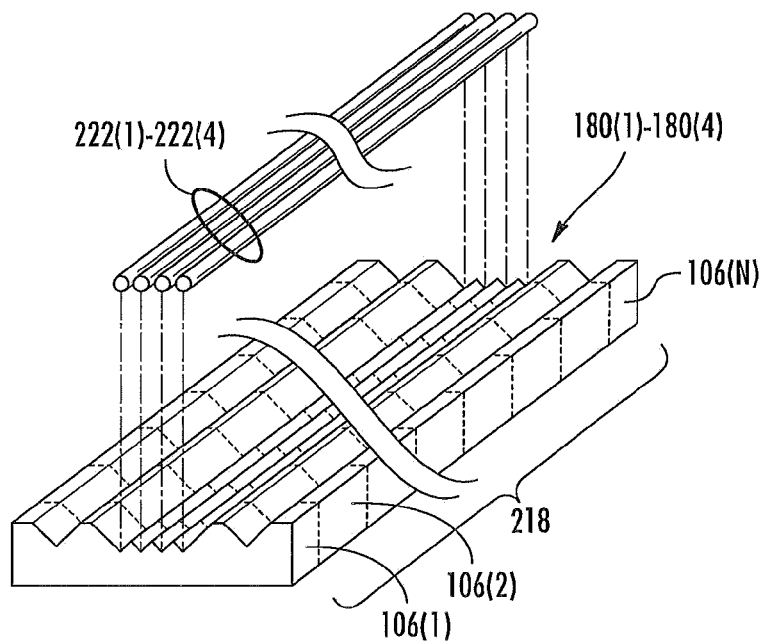
FIG. 25 is the shaped substrate of FIG. 23 receiving the at least one GRIN lens rod of FIG. 24A.

As shown in FIG. 25, the process 216 may also include receiving the GRIN lens rods 222(1)-222(4) within the GRIN grooves 180(1)-180(4) of the GRIN lens holder bodies 106(1)-106(N) of the shaped substrate 218 (block 258 in FIG. 18).

Figure 26:
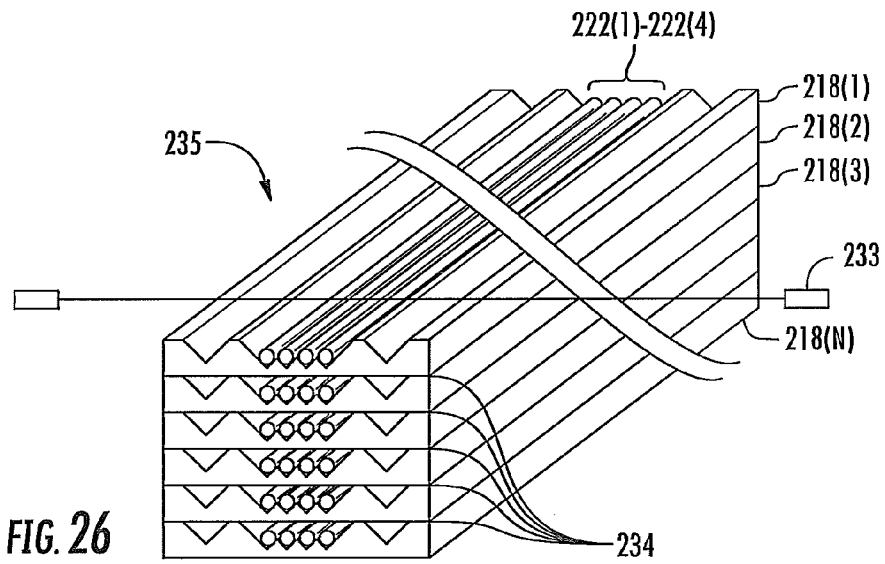
FIGS. 26 and 27 are perspective views of a GRIN lens chip wafer before and after being cut, respectively, with a diamond wire saw from the plurality of shaped substrates secured together with adhesive.
Figure 27:
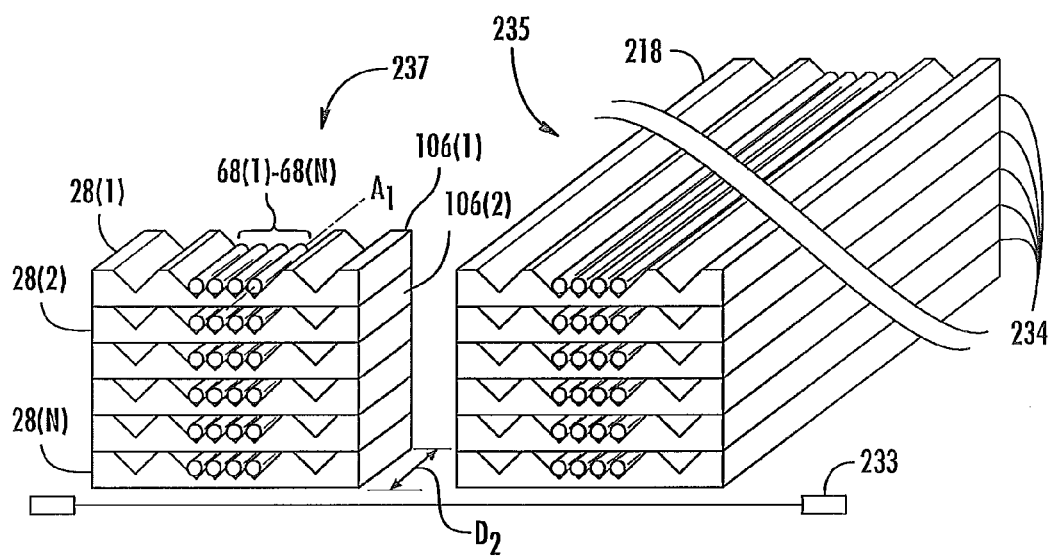
Figure 28:
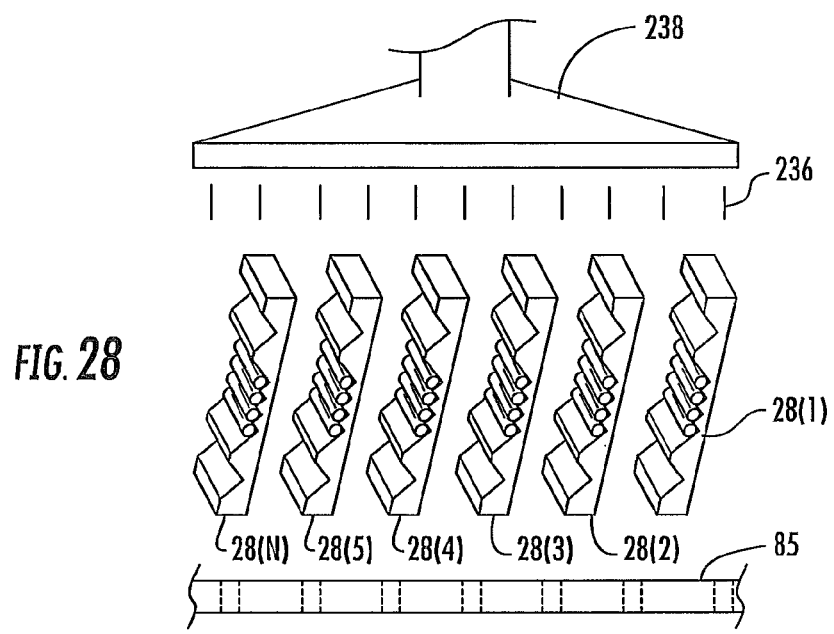
FIG. 28 is a perspective view of the at least one GRIN lens chip being freed from the GRIN lens chip wafer with a solvent.

As shown in FIGS. 26-28, the process 216 may also include freeing the GRIN lens holder bodies 106(1)-106(N) from the shaped substrate 218 and the GRIN lenses 68(1)-68(N) from the GRIN lens rods 222(1)-222(4) (block 260 in FIG. 18). With reference back to FIG. 5A, each of the GRIN lens holder bodies 106(1)-106(N) may include the fiber mating surface 108 at the fiber end 110 and the terminal mating surface 112 opposite the fiber end 110 along the optical axis $A_1$. The freeing the GRIN lens holder bodies 106(1)-106(N) from the shaped substrate 218 and the GRIN lenses 68(1)-68(N) from the GRIN lens rods 222(1)-222(4) may comprise securing each of a plurality of the shaped substrates 218(1)-218(N) together in a stacked substrate 235 (see FIG. 26). The GRIN lens holder bodies 106(1)-106(N) may be freed, for example, by cutting each of the plurality of the shaped substrates 218(1)-218(N) in the stacked substrate 235 to make a GRIN lens chip wafer 237. The GRIN lens chip wafer 237 may be cut to the same distance $D_2$ as discussed above with respect to FIG. 5A. Then, the plurality of the shaped substrates 218(1)-218(N) within the GRIN lens chip wafer 237 may be subsequently freed from each other. The cutting to make the GRIN lens chip wafer 237 may occur utilizing, for example, a diamond wire saw 233. Wire Sawing may be a preferred option for low cost high throughput because a large number of substrates may be stacked together to facilitate high throughput sawing and subsequent polishing if desired. Further, wire sawing may be utilized a variety of materials including, for example, metal, glass, ceramic, and polymers. Moreover, wire sawing provides precise dimensional and geometry control with minimal chipping and scratch marks.

Figure 29:
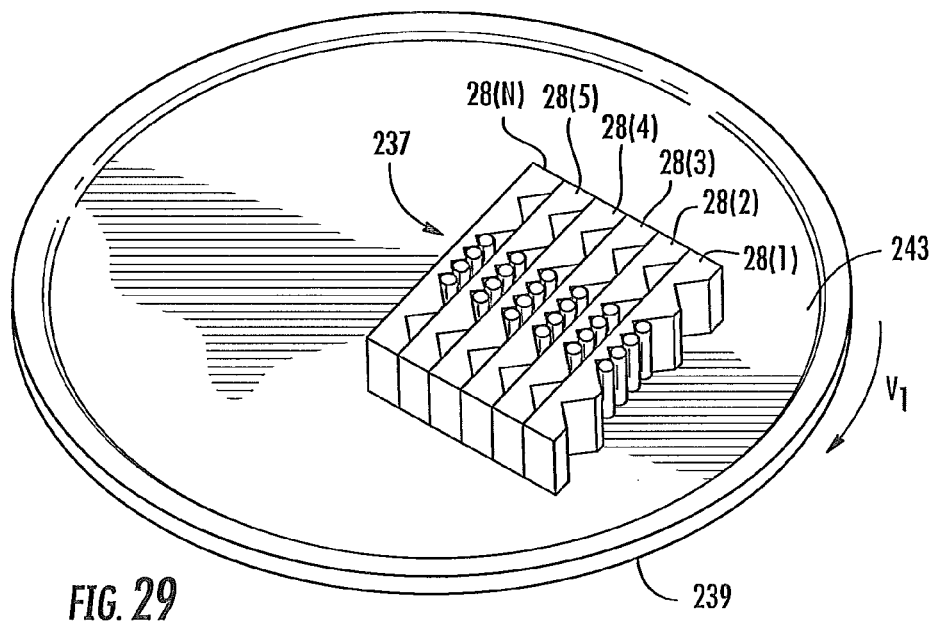
FIG. 29 is a perspective view of either a fiber end or a terminal end of the GRIN shaped wafer of FIG. 27 being polished with conventional grinding and/or lapping equipment.

The securing the plurality of the shaped substrates 218 (1)-218(N) together to make the stacked substrate 235 may comprise securing each of the plurality of the shaped substrates 218(1)-218(N) with an adhesive 234 to form the stacked substrate 235. The adhesive 234 may be water-soluble, allowing the GRIN lens holder body 106(1)-106(N) of the GRIN lens chip 28(1)-28(N) to be freed from each other as secured in the GRIN lens chip wafer 237 when, for example, exposed to water 236 or an appropriate solvent compatible with the adhesive 234, for example, from a dispersant head 238, as depicted in FIG. 28. As depicted in FIG. 29, the GRIN lens chip 28(1)-28(N) may be polished using a slurry 243 with a conventional grinding wheel 239 spinning a rotational velocity $V_1$ before being exposed to the water 236. In this manner, the GRIN lenses 68(1)-68(4) may be polished to an optical quality finish to reduce optical attenuation.

The process 216 may depend on large-scale batch processing of precise, but low-cost, large-size embodiments of the shaped substrates 218(1)-218(N) which may have received the GRIN lens rods 222(1)-222(4) as discussed above. The shaped substrates 218(1)-218(N) may be assembled into the stacked substrates 235 (also known as "3D-bricks"). These stacked substrates 235, as discussed above, may be cut or otherwise sectioned into appropriate ones of the GRIN lens chip wafers 237, as discussed above. Use of stacked substrates 235 containing as many GRIN lens holder bodies 106(1)-106(N) as possible which may have received GRIN lens rods 222(1)-222(4) before assembling the stacked substrates may be preferable. For example, using stacked substrates allows for a batch process which may create a very large number of GRIN lens chips 28(1)-28(N) within a short time. Further, the stacked substrates may be made in a low-cost manner because the alignment features of the GRIN grooves 180(1)-180(4) and the alignment grooves 118(1)-118(4) may be made with simple, precise, and relatively inexpensive molds regardless if made in a "V-groove" shape or "truncated V-groove" shape. Also, the assembly process of receiving the GRIN lens rods 222(1)-222(4) into the shaped substrates 218(1)-218(N) may require merely fifty (50) to one-hundred (100) micron placement tolerances which may be accomplished with inexpensive manufacturing jigs or pick and place equipment. The process 216 utilizes established manufacturing equipment, for example, wire sawing and capital equipment costs may be minimized. As discussed above, the process 216 creates the GRIN lens chips 28P, 28R which may be part of optical sub-systems 26P, 26R which may be modular and thereby may be more flexible to support multiple product models with differing features, for example, lower or higher cost materials for the ferrule body 88 depending upon which product has market demand.

It is also noted that the GRIN lens chips 28P, 28R may be easier to handle than individual ones of the GRIN lenses 68(1)-68(4) which may have sub-millimeter dimensions and thus may be more difficult to handle in a manufacturing environment than the GRIN lens chips 28P, 28R which may have dimensions multiple times larger than those of the GRIN lenses 68(1)-68(4) received therein. Also, the "V-groove" shape of the GRIN grooves 180(1)-180(4) may allow for a thinner dimension $D_H$ (FIG. 6B) of the GRIN lens holder body 106 than through-hole designs because the GRIN lens holder body 106 may not need to completely surround the GRIN lenses 68(1)-68(4). In this manner, smaller examples of the plug 10-1 and the receptacle 12-1 may be created.

Moreover, examples of the process 216 also may be preferred because dimensional and angular tolerances are more precise when cutting the GRIN lens wafers than when cutting individual ones of the shaped substrates 218 which are smaller and more difficult to secure in fixtures and hence manufacturing defects may be reduced.

Figure 30:
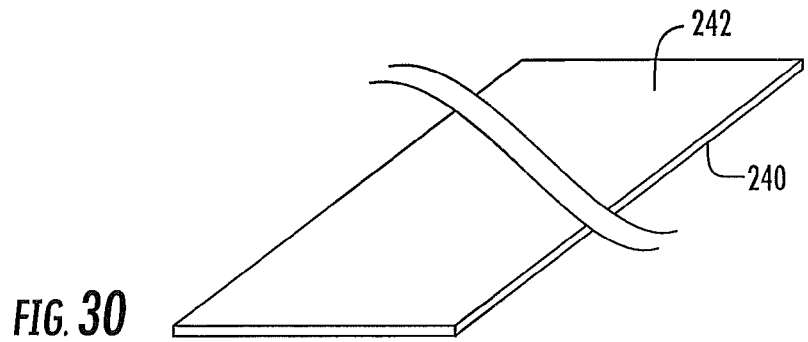
FIG. 30 is a perspective view of an unshaped substrate to illustrate a foundation of a GRIN lens chip.

As an alternative to the block 254, FIG. 30 depicts that the process 216 may include providing the shaped substrate 218 by providing an unshaped substrate 240 including a GRIN-facing surface 242 (block 262 in FIG. 18).

Figure 31:
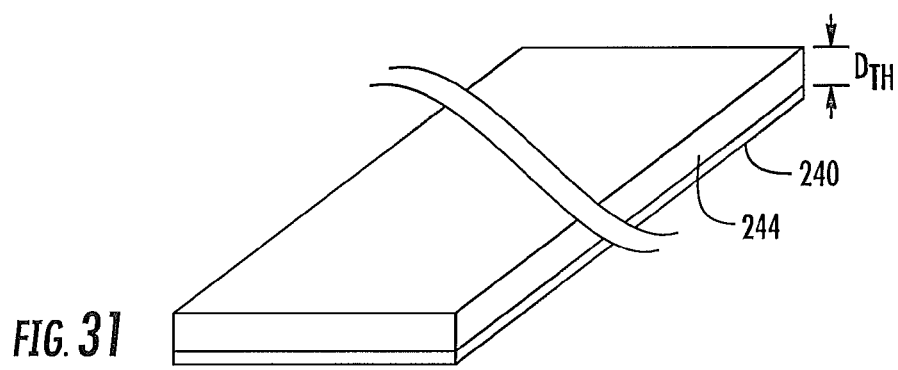
FIG. 31 is a perspective view of the unshaped substrate of FIG. 30 with a coating material applied.

FIG. 31 depicts a thickness $D_{TH}$ of a coating material 244 may be applied to the GRIN-facing surface 242 of the unshaped substrate (block 264 in FIG. 18). The coating material 244 may comprise ultraviolet (UV) curable epoxy. The thickness $D_{TH}$ may include, for example, a uniform thickness between two-hundred fifty (250) to five-hundred (500) microns depending on a depth of the GRIN grooves 180(1)-180(N). Applying the thickness $D_{TH}$ may comprise doctoring the coating material 244 upon the GRIN-facing surface 242. An embossing mold 246 may include brass and may include a contact surface 248 to form the GRIN grooves 180(1)-180(N) (block 266 in FIG. 18). The contact surface 248 of the embossing mold 246 may be formed precisely with a diamond turning surface (not shown). In this manner, the embossing mold 246 may be configured to create the GRIN grooves 180(1)-180(N) with high precision.

Figure 32:
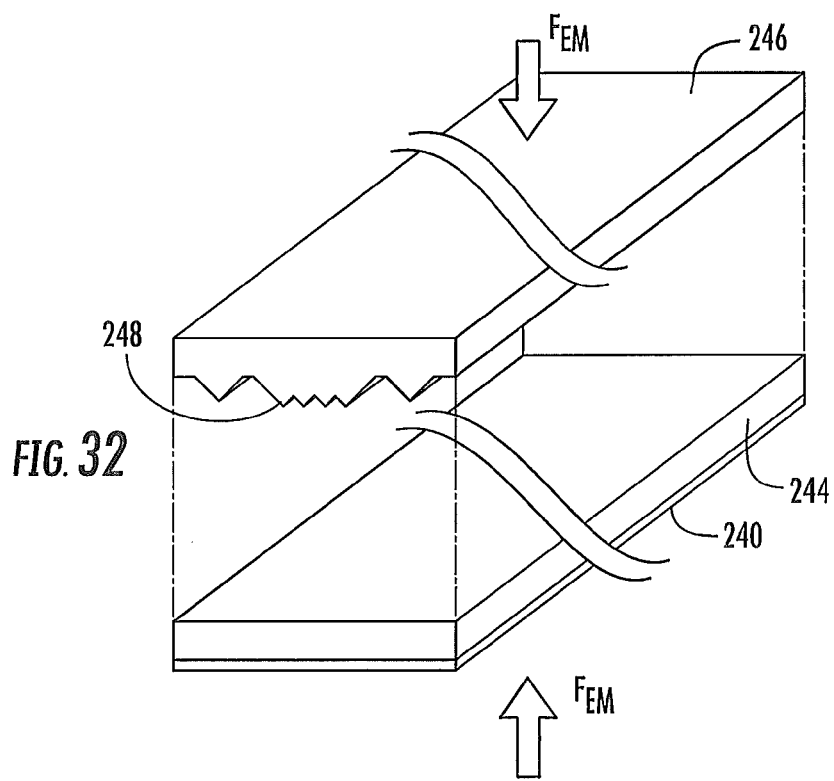
FIG. 32 is a perspective view of an embossing mold aligned with the coating material of FIG. 31.
Figure 33:
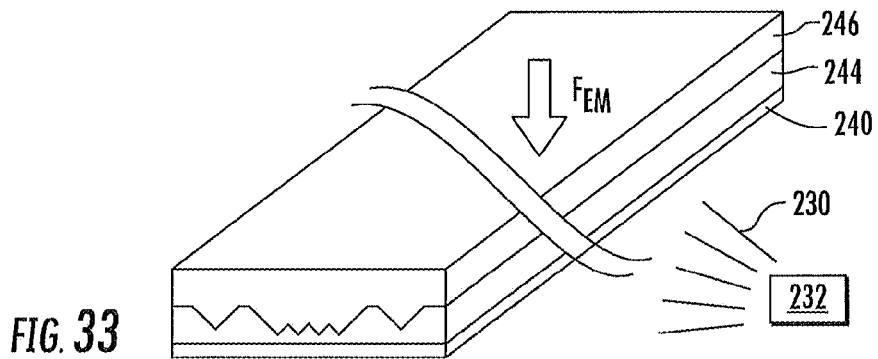
FIG. 33 is a perspective view of the embossing mold of FIG. 32 forming the at least one GRIN groove on a GRIN-facing surface of the unshaped substrate.
Figure 34:
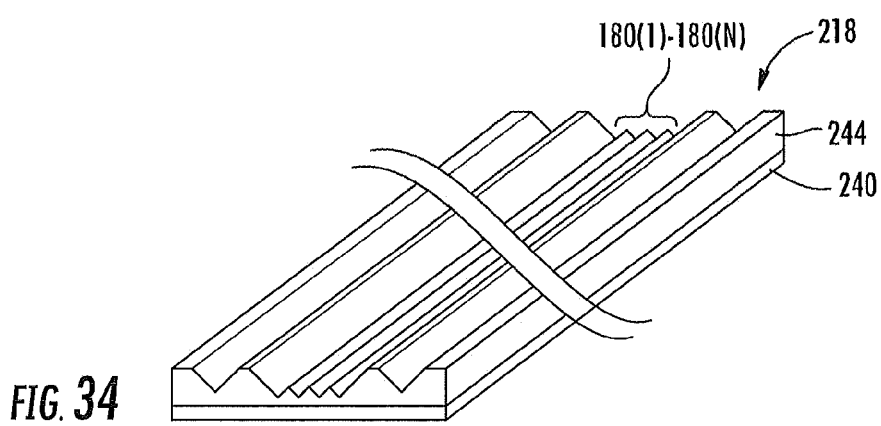
FIG. 34 is a perspective view of a shaped substrate formed when the embossing mold is removed from the GRIN-facing surface of the unshaped substrate.
Figure 35:
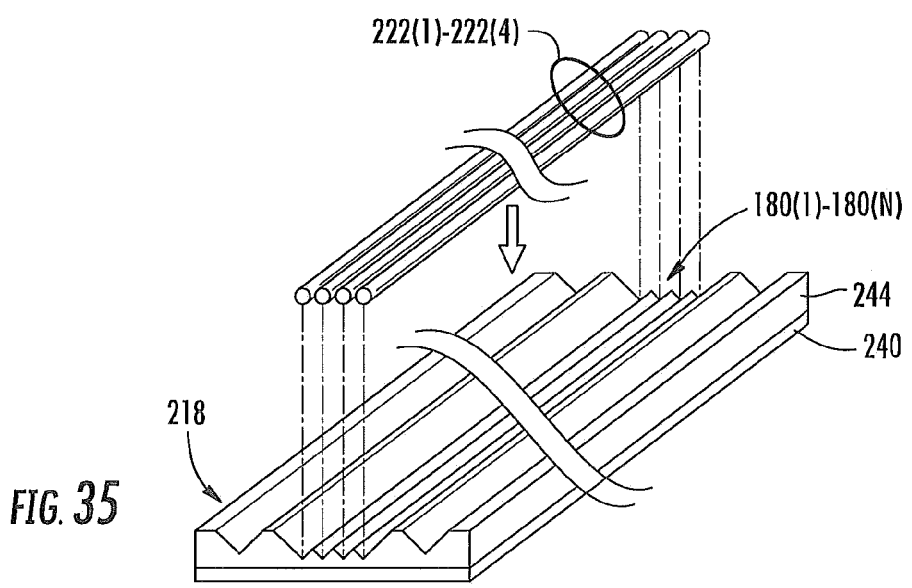
FIG. 35 is a perspective view of at least one GRIN lens rod being fused within the at least one GRIN groove of the shaped substrate.

FIGS. 32-34 depicts that the GRIN grooves 180(1)-180(N) may be formed on the GRIN-facing surface 242 of the unshaped substrate 240 by applying an embossing mold force $F_{EM}$ creating an embossing pressure applied to the coating material 244 with the contact surface 248 of the embossing mold 246 (block 268 in FIG. 18). The unshaped substrate 240 may comprise ultraviolet-transparent material, for example, glass. In this manner, the coating material 244 may be cured using ultraviolet radiation 230 transmitted through the unshaped substrate 240 and from the radiation source 232 (see FIG. 33). It is noted that once the coating material 244 may be cured the unshaped substrate 240 in combination with the coating material 244 becomes the shaped substrate 218 and the GRIN lens rods 222(1)-222(4) may be received within the GRIN grooves 180(1)-180(N) as depicted in FIG. 35.

Figure 36:
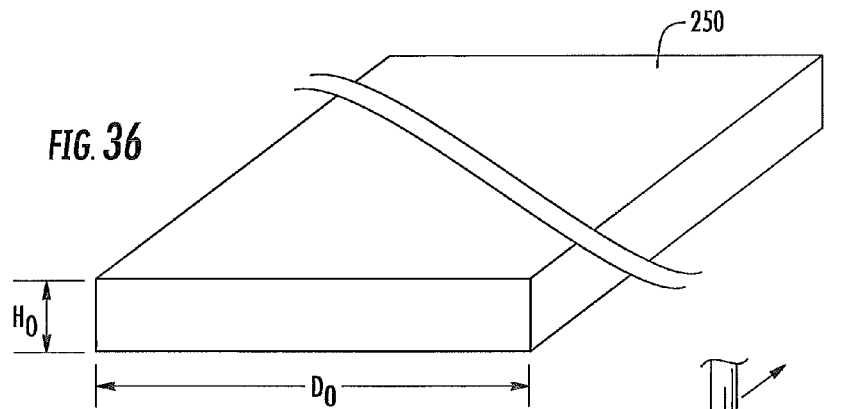
FIG. 36 is a perspective view of a redraw blank.
Figure 37:
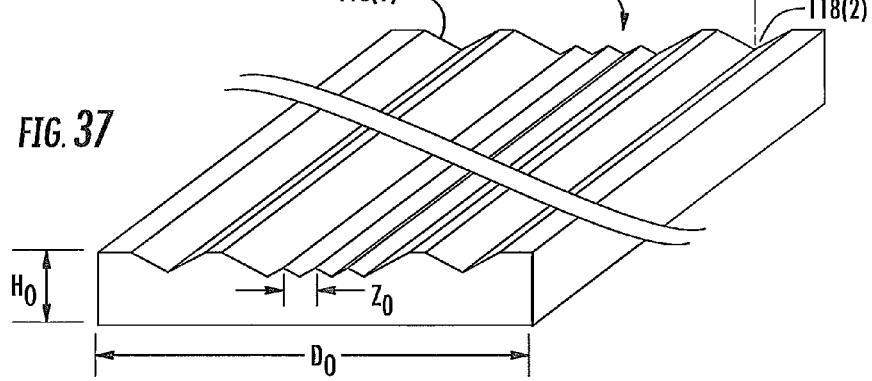
FIG. 37 is a perspective view of the redraw blank of FIG. 36 being machined in order to form at least one GRIN groove and at least one alignment groove.

As another alternative to the blocks 254-258, FIGS. 36 and 37 depict that the process 216 may include providing the shaped substrate 218 wherein a redraw blank 250 may be provided. The GRIN grooves 180(1)-180(4) and the alignment grooves 118(1), 118(2) may be created with a machine tool 252 (FIG. 37). Each of the GRIN grooves 180(1)-180(4) may include an interim latitudinal groove dimension, for example, $Z_O$, larger than a final latitudinal groove dimension $Z_1$ (block 270 in FIG. 18). A ratio of the interim latitudinal GRIN groove dimension $Z_O$ to the final latitudinal groove dimension $Z_1$ may be, for example, between five (5) and twenty (20) times, and preferably twenty (20) times. The redraw blank 250 may comprise, for example, silica or Pyrex which may be configured to be drawn.

Figure 38:
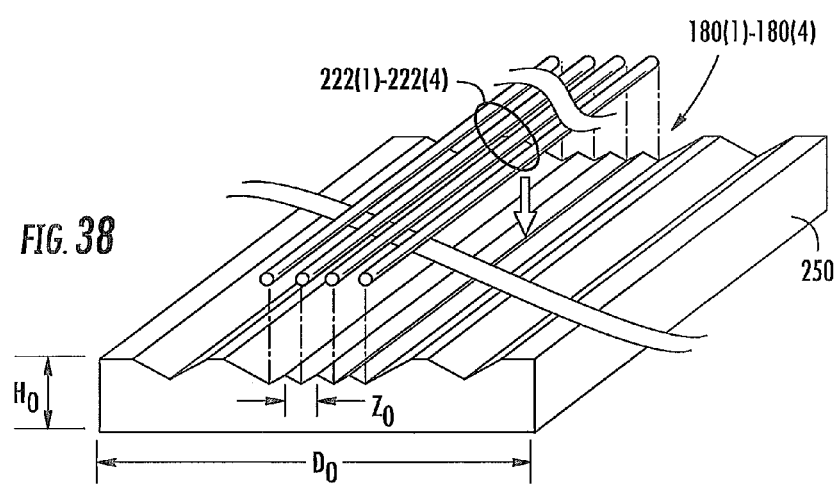
FIG. 38 is a perspective view of the redraw blank of FIG. 37 with at least one GRIN lens rod received by and fused within the at least one GRIN groove of FIG. 37.
Figure 39:
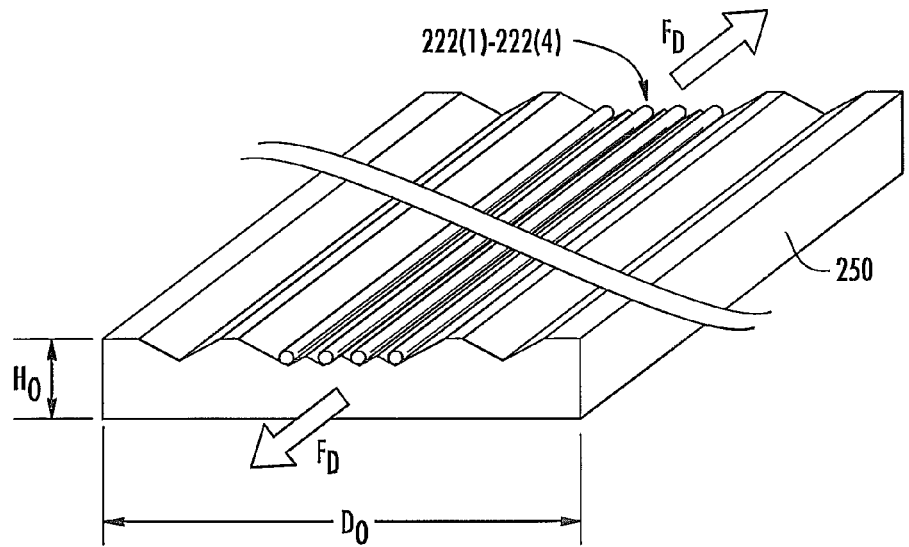
FIG. 39 is a perspective view of the redraw blank of FIG. 38 and at least one GRIN lens rod beginning a drawing process.

FIG. 38 shows that the GRIN lens rods 222(1)-222(N) may also be provided, wherein each of the GRIN lens rods 222(1)-222(N) includes an interim latitudinal GRIN lens dimension larger than a final latitudinal GRIN lens dimension (block 272 in FIG. 18). The GRIN lens rods 222(1)-222(N) may be fused within each of the GRIN grooves 180(1)-180(4) of the redraw blank 250 prior to drawing either the GRIN lens rods 222(1)-222(N) or the redraw blank 250. FIG. 39 depicts that the GRIN lens rods 222(1)-222(N) and the redraw blank 250 may be drawn simultaneously (block 274 in FIG. 18).

Figure 40:
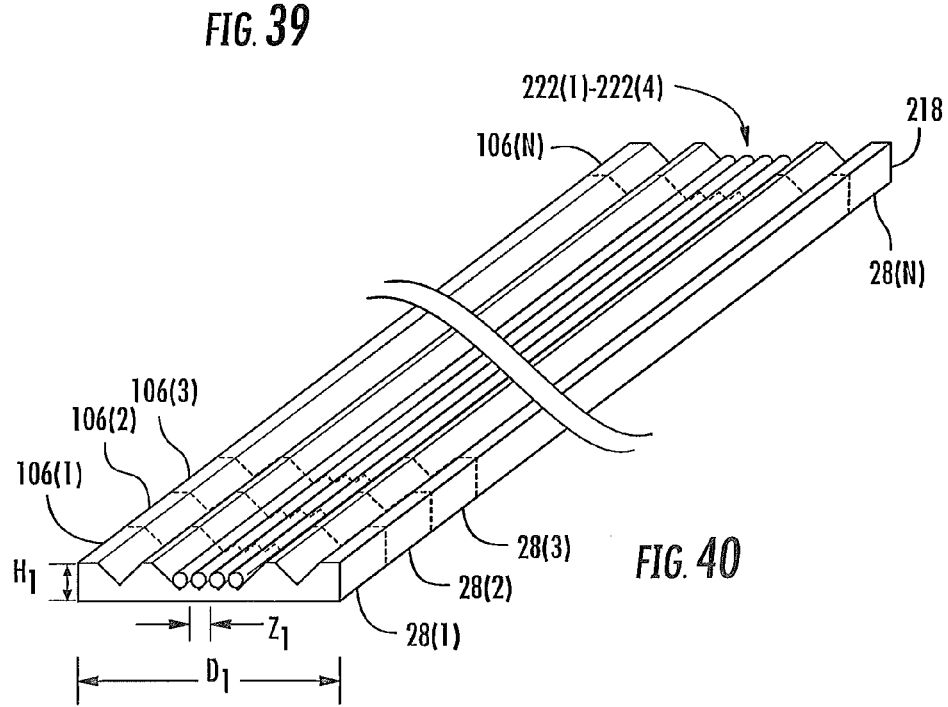
FIG. 40 is a perspective view of the redraw blank of FIG. 39 and at least one GRIN lens rod completing the drawing process of FIG. 39 to create a shaped substrate.

In this manner, the redraw blank 250 and the GRIN lens rods 222(1)-222(N) may be drawn together by applying a drawing force $F_D$ as depicted in FIG. 38. As shown in FIG. 40, the redraw blank 250 and the GRIN lens rods 222(1)-222(N) may be drawn to reduce the interim latitudinal groove dimension $Z_O$ to the final latitudinal groove dimension $Z_1$ of each of the GRIN grooves 180(1)-180(4) (block 276 in FIG. 18). It is noted that once the final latitudinal groove dimension $Z_1$ of each of the GRIN grooves 180(1)-180(4) may be formed, the redraw blank 250 may be considered a shaped substrate 218 as shown in FIG. 40. In this manner, the shaped substrate 218 may be fused with the GRIN lens rods 222(1)-222(N) and together include the GRIN lens chips 28(1)-28(N) that may be ready to be freed as discussed earlier as part of block 260 of FIG. 18.

With reference back to FIGS. 36-40, it is also noted that during the drawing process an interim height $H_O$ of the redraw blank 250 prior to drawing and an interim width $D_O$ of the redraw blank 250 prior to drawing may also be reduced to a final height $H_1$ and a final width $D_1$, respectively. The interim latitudinal groove dimension $Z_O$, the interim height $H_1$, and/or the interim width $D_1$ may be measured and monitored during drawing to control the drawing force $F_D$ and thereby ensure precise dimensions are achieved.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning, Incorporated of Corning, N.Y. Suitable fibers of this type are disclosed, for example, in U.S. Patent Application Publication Nos. 2008/0166094 and 2009/0169163, the disclosures of which are incorporated herein by reference in their entireties.

The term "electrical coupling" is the transfer of electrical energy between electrical conductors as part of an electrical circuit. The electrical energy transfer may comprise electrical conduction between the electrical conductors and/or electromagnetic induction between the electrical conductors.

Many modifications and other embodiments of the embodiments disclosed herein will come to mind to one skilled in the art to which the embodiments pertain having the benefit of the teachings presented in the foregoing descriptions and the associated drawings. For example, the plug 10 and receptacle 12 in this disclosure were discussed with a quantity of four (4) of the optical fibers 18 and a quantity of four (4) of the GRIN lenses 68, but these may also include more than four or less than four. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A gradient index (GRIN) lens chip, comprising:
 a GRIN lens holder body comprising a fiber mating surface at a fiber end and a terminal mating surface at a terminal end opposite the fiber end, the fiber mating surface disposed a longitudinal distance away from the terminal mating surface, the longitudinal distance measured parallel to an optical axis, and the GRIN lens holder body includes at least one alignment groove configured to receive at least one alignment pin;
 at least one GRIN lens comprising a first end, a second end opposite the first end, a first end face disposed at the first end, and a second end face disposed at the second end; and
 at least one GRIN groove disposed between the fiber end and the terminal end of the GRIN lens holder body, the at least one GRIN groove receiving the at least one GRIN lens,
 wherein the first end face of the at least one GRIN lens is disposed adjacent the fiber mating surface, and the second end face of the at least one GRIN lens is disposed adjacent the terminal mating surface and
 a cover plate secured to the GRIN lens holder body, wherein the cover plate is configured to secure the at least one alignment pin within the at least one alignment groove.

2. The GRIN lens chip of claim 1, further comprising mirror symmetry across a geometric plane disposed orthogonal to the optical axis.

3. The GRIN lens chip of claim 1, wherein the fiber mating surface is disposed parallel to the terminal mating surface.

4. The GRIN lens chip of claim 1, wherein the first end face of the at least one GRIN lens is disposed planar or substantially planar with the fiber mating surface.

5. The GRIN lens chip of claim 4, wherein the second end face of the at least one GRIN lens is disposed planar or substantially planar with the terminal mating surface.

6. The GRIN lens chip of claim 1, further comprising a cover plate secured to the GRIN lens holder body, wherein the at least one GRIN lens is at least partially disposed between the cover plate and the GRIN lens holder body.

7. The GRIN lens chip of claim 1, wherein the at least one alignment groove is disposed parallel to the optical axis.

8. The GRIN lens chip of claim 1, wherein the at least one alignment groove and the fiber mating surface are configured to align the at least one GRIN lens to at least one optical fiber received by a ferrule assembly.

9. The GRIN lens chip of claim 1, wherein the at least one GRIN lens is configured to include a pitch greater than 0.22 and less than 0.29.

10. The GRIN lens chip of claim 1, wherein an outside diameter of the at least one GRIN lens is approximately equal to a center-to-center distance between adjacent ones of the at least one GRIN grooves.

11. The GRIN lens chip of claim 1, wherein the at least one GRIN lens includes a cladding with a cladding thickness from zero to one-hundred fifty microns.

12. The GRIN lens chip of claim 1, wherein a maximum outer diameter of the at least one GRIN lens measured orthogonal to the optical axis is less than or equal to 1.5 millimeters.

13. The GRIN lens chip of claim 1, wherein the GRIN lens holder body includes at least one contoured engagement surface which connects the fiber mating surface to the terminal mating surface, and at least a portion of the at least one contoured engagement surface forms the at least one GRIN groove.

14. An optical sub-system for establishing an optical connection, comprising:
 a ferrule assembly, comprising:
  a ferrule body comprising a forward end, a rearward end opposite the forward end, a ferrule mating surface disposed at the forward end, and a rearward ferrule surface disposed at the rearward end, the ferrule mating surface disposed a longitudinal distance away from the rearward ferrule surface, the longitudinal distance measured parallel to an optical axis,
  at least one alignment pin protruding from the ferrule mating surface and received by the at least one alignment orifice,
  at least one fiber groove disposed between the forward end and the rearward end,
  at least one optical fiber received within the at least one fiber groove; and a gradient index (GRIN) lens chip, comprising:
  a GRIN lens holder body comprising a fiber mating surface at a fiber end and a terminal mating surface at a terminal end opposite the fiber end, the fiber mating surface disposed a second longitudinal distance away from the terminal mating surface, the second longitudinal distance measured parallel to an optical axis,
  at least one alignment orifice extending from the fiber mating surface to the terminal mating surface of the GRIN lens holder body; and
  at least one GRIN lens optically connected with the at least one optical fiber, each of the at least one GRIN lens comprising a first end, a second end opposite the first end, a first end face disposed at the first end, and a second end face disposed at the second end, and
  at least one GRIN groove disposed between the fiber end and the terminal end of the GRIN lens holder body, the at least one GRIN groove receiving the at least one GRIN lens,
  wherein the first end face of the at least one GRIN lens disposed adjacent the fiber mating surface, and the second end face of the at least one GRIN lens disposed adjacent the terminal mating surface and the at least one alignment pin restricts the GRIN lens holder body to a movement along the optical axis relative to the ferrule assembly.

15. The optical sub-system of claim 14, wherein the ferrule mating surface of the ferrule body abuts against the fiber mating surface of the GRIN lens chip.

16. The optical sub-system of claim 14, wherein each of the at least one fiber groove and the at least one GRIN groove are a same size or substantially the same size.

17. The optical sub-system of claim 14, further including at least one capillary tube, the at least one capillary tube is disposed between the at least one optical fiber and the at least one fiber groove.

18. The optical sub-system of claim 17, wherein a maximum outer width of the at least one capillary tube is a same size or substantially the same size as an outer width of the at least one GRIN lens.

19. The optical sub-system of claim 14, wherein the ferrule assembly includes a ferrule cover plate secured to the ferrule body, and the at least one optical fiber is disposed between the ferrule cover plate and the ferrule body.

20. The optical sub-system of claim 14, wherein the at least one alignment orifice is formed by an alignment groove of the GRIN lens holder body and a cover plate attached to the GRIN lens holder body.

21. The optical sub-system of claim 14, further comprising at least one interlocking electrode mounted to at least one of the GRIN lens holder body and the ferrule body, the at least one interlocking electrode extends parallel to the optical axis and beyond the terminal mating surface of the GRIN lens chip.

22. The optical sub-system of claim 21, wherein the at least one interlocking electrode extends beyond the at least one alignment pin.

23. The optical sub-system of claim 14, further comprising an outer housing configured to at least partially surround the ferrule body, wherein the outer housing includes at least one protrusion extending parallel to the optical axis and beyond the at least one alignment pin.

24. The optical sub-system of claim 14, wherein the at least one GRIN lens is secured to the at least one optical fiber with an adhesive.

25. An optical connection, comprising:
  a plug, the plug comprising at least one alignment pin extending away from the ferrule body of the plug and parallel to the optical axis, and a receptacle optically connected to the plug, each of the plug and the receptacle includes one of a plurality of optical sub-systems, wherein each of the plurality of optical sub-systems comprise:
  a ferrule assembly including
    a ferrule body including a ferrule mating surface at a forward end and a rearward ferrule surface at a rearward end opposite the forward end along an optical axis,
    at least one fiber groove disposed between the forward end and the rearward end,
    at least one optical fiber received within the at least one fiber groove; and
  a gradient index (GRIN) lens chip including
    a GRIN lens holder body including a fiber mating surface at a fiber end and a terminal mating surface at a terminal end opposite the fiber end along the optical axis, and
    at least one GRIN lens optically connected with the at least one optical fiber, each of the at least one GRIN lens having a first end face disposed at a first end of the at least one GRIN lens and a second end face disposed at a second end of the at least one GRIN lens, and
    at least one GRIN groove disposed between the fiber end and the terminal end of the GRIN lens holder body, the at least one GRIN groove receiving the at least one GRIN lens,
  wherein the first end face of the at least one GRIN lens is disposed adjacent the fiber mating surface and the second end face of the at least one GRIN lens is disposed adjacent the terminal mating surface, and
  wherein the second end face of the at least one GRIN lens of the plug is optically connected to the second end face of the at least one GRIN lens of the receptacle, and each of the GRIN lens holder body of the plug and the GRIN lens holder of the receptacle include at least one alignment groove configured to communicate with the at least one alignment pin to align the at least one GRIN lens of the plug with the at least one GRIN lens of the receptacle.

26. The optical connection of claim 25, wherein the plug and the receptacle each further comprise at least one interlocking electrode extending away from the ferrule body and parallel to the optical axis to at least one chamfer of at least one end portion of the at least one interlocking electrode,
  wherein the at least one chamfer of the plug and the at least one chamfer of the receptacle are configured to provide coarse alignment between the plug and the receptacle.

27. The optical connection of claim 25, wherein the receptacle is secured on a circuit board.

28. The optical connection of claim 25, wherein the terminal mating surface of the GRIN lens chip of the plug abuts against the terminal mating surface of the GRIN lens chip of the receptacle.

29. The optical connection of claim 28, wherein the fiber mating surface of the GRIN lens chip of the plug abuts against the ferrule mating surface of the ferrule body of the plug, and
  the fiber mating surface of the GRIN lens chip of the receptacle abuts against the ferrule mating surface of the ferrule body of the receptacle.

30. The optical connection of claim 25, wherein the GRIN lens holder body comprises either plastic, glass, ceramic, or metal.

31. The optical connection of claim 25, wherein the plug includes a plug outer housing and the receptacle includes a receptacle housing, the outer housing of the plug includes at least one protrusion configured to communicate with the receptacle housing of the receptacle before the at least one alignment pin communicates with the at least one alignment groove of the receptacle while the plug is being engaged with the receptacle to form the optical connection.

32. The optical connection of claim 25, wherein the plug comprises at least one alignment pin and at least one spring, and the optical sub-system of the plug is movable along the at least one alignment pin and spring-loaded with respect to the at least one spring.

33. The optical connection of claim 25, wherein the receptacle comprises at least one alignment pin and at least one built-in lateral spring, and at least a portion of the optical sub-system of the plug is receivable within the receptacle and aligned to the at least one alignment pin by the at least one built-in lateral spring.

* * * * *